(12) United States Patent
Bai et al.

(10) Patent No.: US 12,046,129 B2
(45) Date of Patent: Jul. 23, 2024

(54) COMPUTER-BASED SYSTEMS CONFIGURED FOR SPACE OBJECT ORBITAL TRAJECTORY PREDICTIONS AND METHODS THEREOF

(71) Applicant: Rutgers, The State University of New Jersey, New Brunswick, NJ (US)

(72) Inventors: Xiaoli Bai, Belle Mead, NJ (US); Hao Peng, Edison, NJ (US)

(73) Assignee: Rutgers, The State University of New Jersey, New Brunswick, NJ (US)

(*) Notice: Subject to any disclaimer, the term of this patent is extended or adjusted under 35 U.S.C. 154(b) by 498 days.

(21) Appl. No.: 17/406,917

(22) Filed: Aug. 19, 2021

(65) Prior Publication Data
US 2022/0058922 A1     Feb. 24, 2022

Related U.S. Application Data

(60) Provisional application No. 63/068,013, filed on Aug. 20, 2020.

(51) Int. Cl.
| | |
|---|---|
| *G08B 5/00* | (2006.01) |
| *G01C 21/24* | (2006.01) |
| *G06N 20/00* | (2019.01) |
| *G08B 5/22* | (2006.01) |
| *G08B 21/18* | (2006.01) |

(52) U.S. Cl.
CPC .............. *G08B 5/22* (2013.01); *G01C 21/24* (2013.01); *G06N 20/00* (2019.01); *G08B 21/18* (2013.01)

(58) Field of Classification Search
None
See application file for complete search history.

(56) References Cited

U.S. PATENT DOCUMENTS

| | | | |
|---|---|---|---|
| 2013/0181086 A1* | 7/2013 | Bielas | G01C 25/005 701/1 |
| 2015/0207562 A1* | 7/2015 | Brumley | G06N 20/00 398/125 |
| 2019/0353800 A1* | 11/2019 | Nirula | G01S 19/254 |

OTHER PUBLICATIONS

Peng et al., "Fusion of a machine learning approach and classical orbit predictions", Acta Astronautica, Apr. 12, 2021, <https://doi.org/10.1016/j.actaastro.2021.04.017>.

(Continued)

*Primary Examiner* — Truc M Do
(74) *Attorney, Agent, or Firm* — Greenberg Traurig, LLP

(57) ABSTRACT

Systems and methods of the present disclosure enable machine learning-based refinement of trajectory predictions using a processor to determine a future trajectory associated with an object state using an iterative physics algorithm. The processor utilizes a trajectory error prediction machine learning model to predict a trajectory error for the future trajectory determined for the object state. The processor determines a pseudo-measurement representative of the trajectory error based at least in part on the trajectory error for the future trajectory and determines a pseudo-measurement noise based at least in part on the pseudo-measurement. The processor determines an updated future trajectory for the future trajectory based on the pseudo-measurement and the pseudo-measurement noise of the trajectory error for the future trajectory, and causes to display a trajectory notification associated with future trajectory on a screen of a user computing device associated with a user.

20 Claims, 78 Drawing Sheets
(31 of 78 Drawing Sheet(s) Filed in Color)

(56) References Cited

OTHER PUBLICATIONS

Peng et al., "Markov Chain Monte Carlo Extensions to Gaussian Processes Approach on Orbit Predictions", presented Jan. 2020 at the AIAA SciTech conference.

Bai, "Fusion of the ML approach with classical orbit predictions based on Extended Kalman Filters (EKF)", PowerPoint Slides for University of Michigan and Georgia Institute of Technology, 2020, 3 pages.

\* cited by examiner (a) $e_x$ (b) $e_y$ (c) $e_z$ (d) $e_{vx}$

All State Fusion (a) All State Fusion (b) Position-only Fusion

*(b) $e_y$-Only Fusion*

(c) $e_z$-Only Fusion (a) $e_x$-Only Fusion

*(b) $e_y$-Only Fusion*

(a) Example Trajectory #1

(b) Example Trajectory #2

(a) One Example Trajectory with Negative $e_y$ (b) One Example Trajectory with Positive $e_y$ (a) $e_x$ is Along the Lower Edge of $3\sigma_{EKF}$-boundaries.

(b) $e_x$ is Outside of $3\sigma_{EKF}$-boundaries and $e_y$ is Negative.

(c) $e_x$ is outside of $3\sigma_{EKF}$-boundaries and $e_y$ is positive.

(a) Training Data (Day 0-186)

(a) $e_x$ (a) $e_x$ (b) $e_y$ (c) ML Models Trained on Day-240.

(a) RSO-11

(b) RSO-12

(c) RSO-13

(d) RSO-14

(e) RSO-15

(f) RSO-16

COMPUTER-BASED SYSTEMS CONFIGURED FOR SPACE OBJECT ORBITAL TRAJECTORY PREDICTIONS AND METHODS THEREOF

CROSS-REFERENCE TO RELATED APPLICATIONS

This application claims priority to U.S. Provisional Application 63/068,013 entitled "COMPUTER-BASED SYSTEMS CONFIGURED FOR SPACE OBJECT ORBITAL TRAJECTORY PREDICTIONS AND METHODS THEREOF" and filed on Aug. 20, 2020, which is incorporated herein in its entirety.

FIELD OF TECHNOLOGY

The present disclosure generally relates to computer-based systems configured for space object orbital trajectory prediction and error reduction for collision avoidance and other applications.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs), among a wide range of users.

Efficient, high precision orbit prediction is increasingly crucial for improved Space Situational Awareness (SSA). Current orbit predictions that are solely grounded on physics-based models are not effective and robust enough to achieve required accuracy.

SUMMARY OF DESCRIBED SUBJECT MATTER

In some embodiments, the present disclosure provides a computer-based method that includes at least the following steps of receiving, by at least one processor, an object state dataset including at least one object state data item representing a trajectory state associated with the object. Determining, by the at least one processor, a future epoch trajectory with the corresponding uncertainty associated with each object state data item in the object state dataset using an iterative physics algorithm. Utilizing, by the at least one processor, a trajectory error prediction machine learning model to predict a respective trajectory error for each respective future epoch trajectory determined for each respective object state data item in the object state dataset, where the trajectory error prediction machine learning model is trained by predicting a training trajectory error for each at least one historical object state data in a historical epoch object state dataset to learn correlations between state and trajectory error based on trajectory parameters. Determining, by the at least one processor, a respective updated future epoch trajectory for each respective future epoch trajectory based on the associated respective trajectory error, and causing to display, by the at least one processor, at least one trajectory notification associated with at least one future epoch trajectory on a screen of a user computing device associated with a user.

In some embodiments, the present disclosure provides a computer-based system that includes at least the following components of an object state database to collect an object state dataset including at least one object state data item representing a trajectory state associated with the object, and a Monitored Machine Learning (MML) database including at least one processor, where the at least one processor is configured to execute instructions stored in a non-tangible storage medium. The instructions include receiving the object state dataset from the object state database, determining a future epoch trajectory with the corresponding uncertainty associated with each object state data item in the object state dataset using an iterative physics algorithm, utilizing a trajectory error prediction machine learning model to predict a respective trajectory error for each respective future epoch trajectory determined for each respective object state data item in the object state dataset, where the trajectory error prediction machine learning model is trained by predicting a training trajectory error for each at least one historical object state data in a historical epoch object state dataset to learn correlations between state and trajectory error based on trajectory parameters, determining a respective updated future epoch trajectory for each respective future epoch trajectory based on the associated respective trajectory error, and causing to display at least one trajectory notification associated with at least one future epoch trajectory on a screen of a user computing device associated with a user.

In some embodiments, the present disclosure provides a computer-based method that includes at least the following steps of receiving, by at least one processor, an object state dataset comprising at least one object state data item representing at least one object state associated with the object; wherein the at least one object state comprises at least one trajectory of the object; determining, by the at least one processor, a future trajectory associated with each object state data item in the object state dataset using an iterative physics-based algorithm; utilizing, by the at least one processor, a trajectory error prediction machine learning model to predict a respective trajectory error for each respective future trajectory determined for each respective object state data item in the object state dataset; wherein the trajectory error prediction machine learning model is trained by predicting a training trajectory error for each at least one historical object state data in a historical epoch object state dataset to learn correlations between state and trajectory error based on trajectory parameters; determining, by the at least one processor, a respective pseudo-measurement associated with the respective trajectory error for each respective future trajectory based at least in part on the respective trajectory error for each respective future trajectory; determining, by the at least one processor, a respective pseudo-measurement noise associated with a trajectory error covariance based at least in part on the respective pseudo-measurement representative of the respective trajectory error for each respective future trajectory; determining, by the at least one processor, a respective modification to each respective future trajectory for each respective future trajectory based on the respective pseudo-measurement and the respective pseudo-measurement noise of the respective trajectory error for each respective future trajectory; and causing to display, by the at least one processor, at least one trajectory notification associated with at least one future trajectory on a screen of a user computing device associated with a user.

In some embodiments, the present disclosure provides a computer-based system that includes at least the following components an object state database to collect an object state dataset comprising at least one object state data item representing at least one object state associated with the object; wherein the at least one object state comprises at least one trajectory of the object; and a Monitored Machine Learning (MML) database comprising at least one processor. The at least one processor is configured to execute instructions stored in a non-tangible storage medium, the instructions comprising: receiving the object state dataset from the object state database; determining a future trajectory associated with each object state data item in the object state dataset using an iterative physics-based algorithm; utilizing a trajectory error prediction machine learning model to predict a respective trajectory error for each respective future trajectory determined for each respective object state data item in the object state dataset; wherein the trajectory error prediction machine learning model is trained by predicting a training trajectory error for each at least one historical object state data in a historical epoch object state dataset to learn correlations between state and trajectory error based on trajectory parameters; determining a respective pseudo-measurement associated with the respective trajectory error for each respective future trajectory based at least in part on the respective trajectory error for each respective future trajectory; determining a respective pseudo-measurement noise associated with a respective trajectory error covariance based at least in part on the respective pseudo-measurement representative of the respective trajectory error for each respective future trajectory; determining a respective modification to each respective future trajectory for each respective future trajectory based on the respective pseudo-measurement and the respective pseudo-measurement noise of the respective trajectory error for each respective future trajectory; and causing to display at least one trajectory notification associated with at least one future trajectory on a screen of a user computing device associated with a user.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
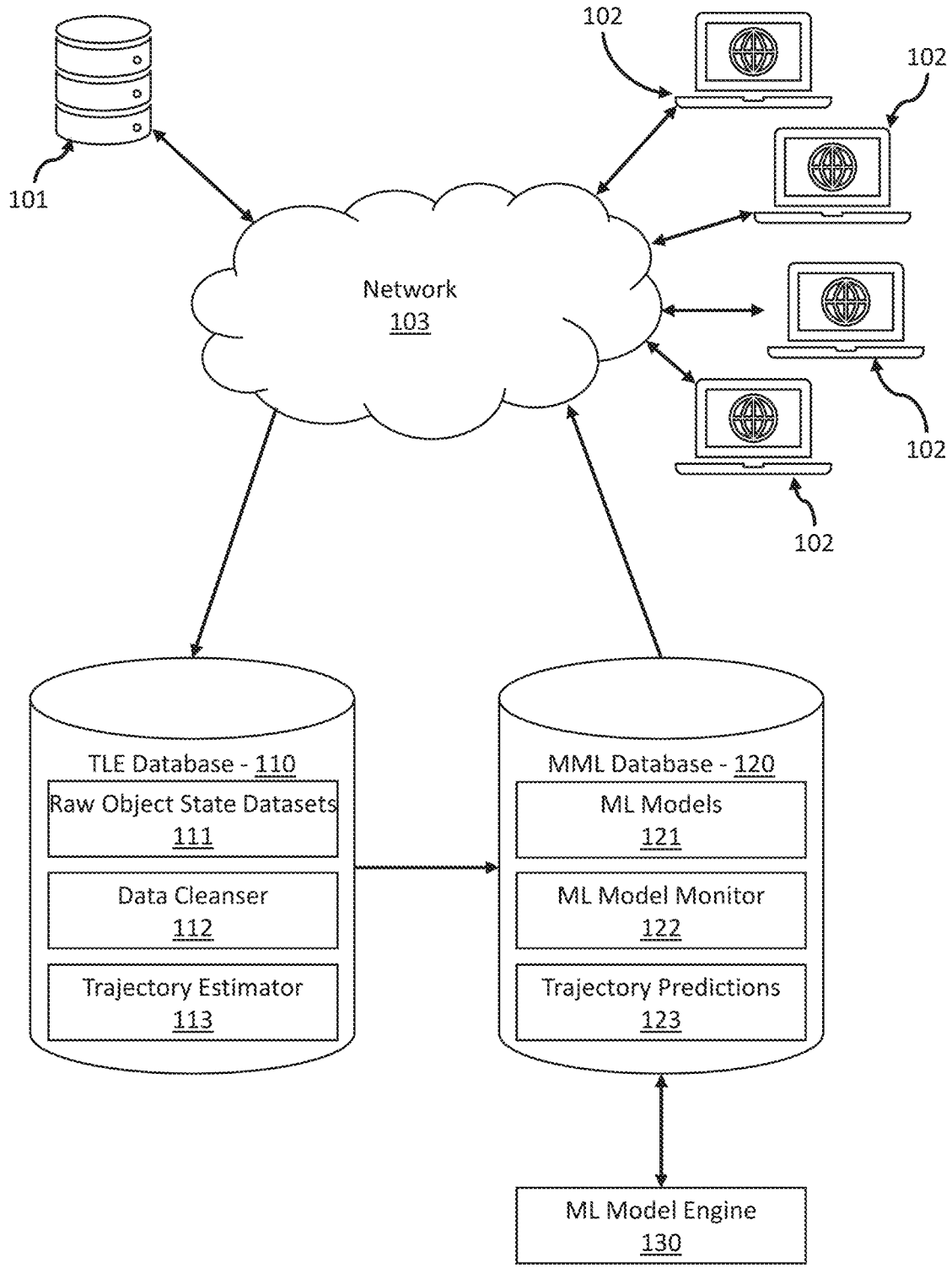
FIGS. 1-33 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIGS. 1 through 33 illustrate systems and methods of space object detection, state estimation, trajectory prediction and collision avoidance using database communication and interoperability. The following embodiments provide technical solutions and/or technical improvements that overcome technical problems, drawbacks and/or deficiencies in the technical fields involving collision avoidance via trajectory prediction, interoperability of prediction enhancement systems with external trajectory estimation systems, database and processing architectures for efficient and accurate trajectory prediction and error reduction, among others. As explained in more detail, below, technical solutions and/or technical improvements herein include aspects of improved an information distribution and database communication for enhancing a database of trajectory predictions for error reduction through interoperability with shared learned ML models, which provide corrections to the predictions. Based on such technical features, further technical benefits become available to users and operators of these systems and methods. Moreover, various practical applications of the disclosed technology are also described, which provide further practical benefits to users and operators that are also new and useful improvements in the art.

Figure 2A:
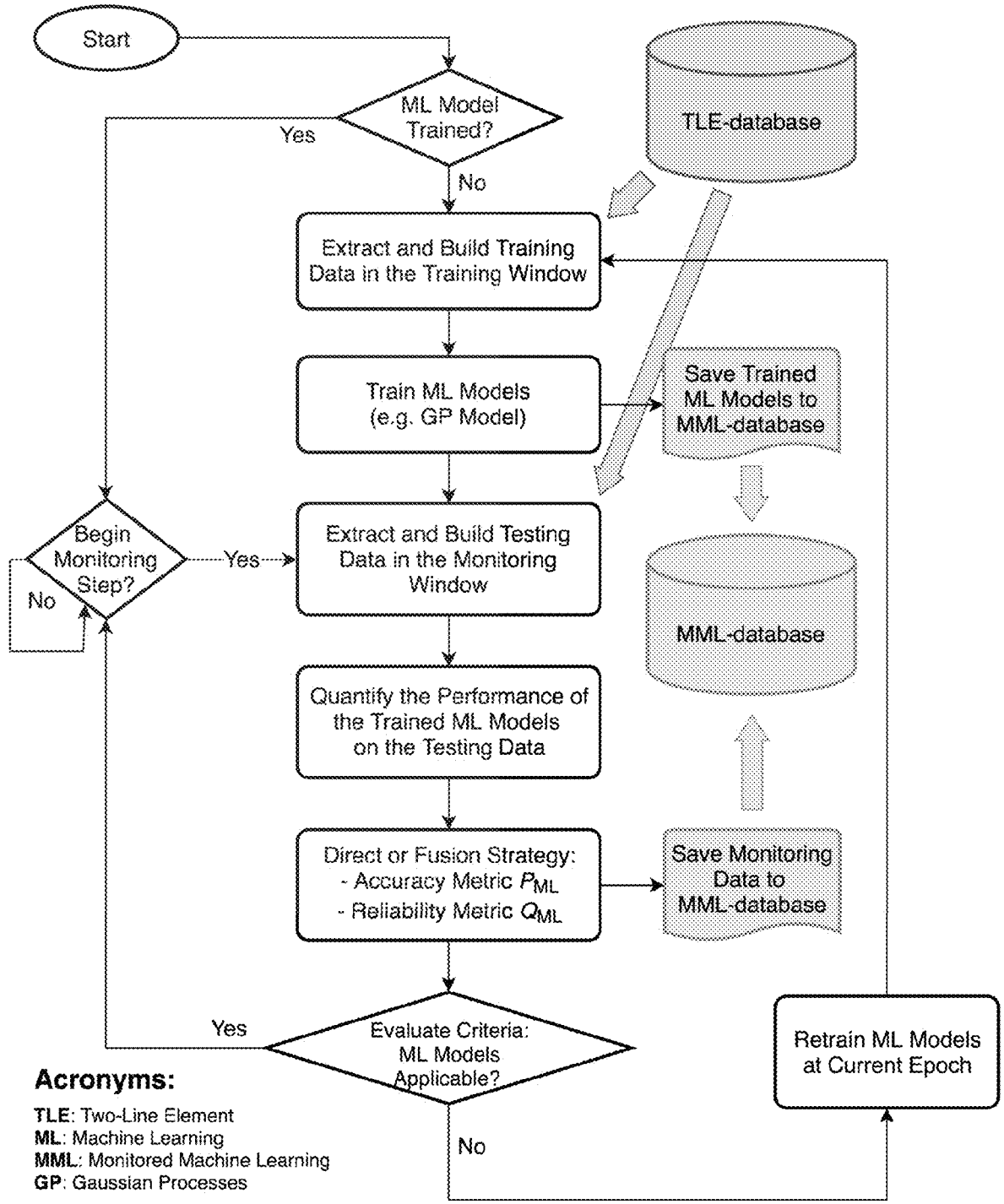
Figure 2B:
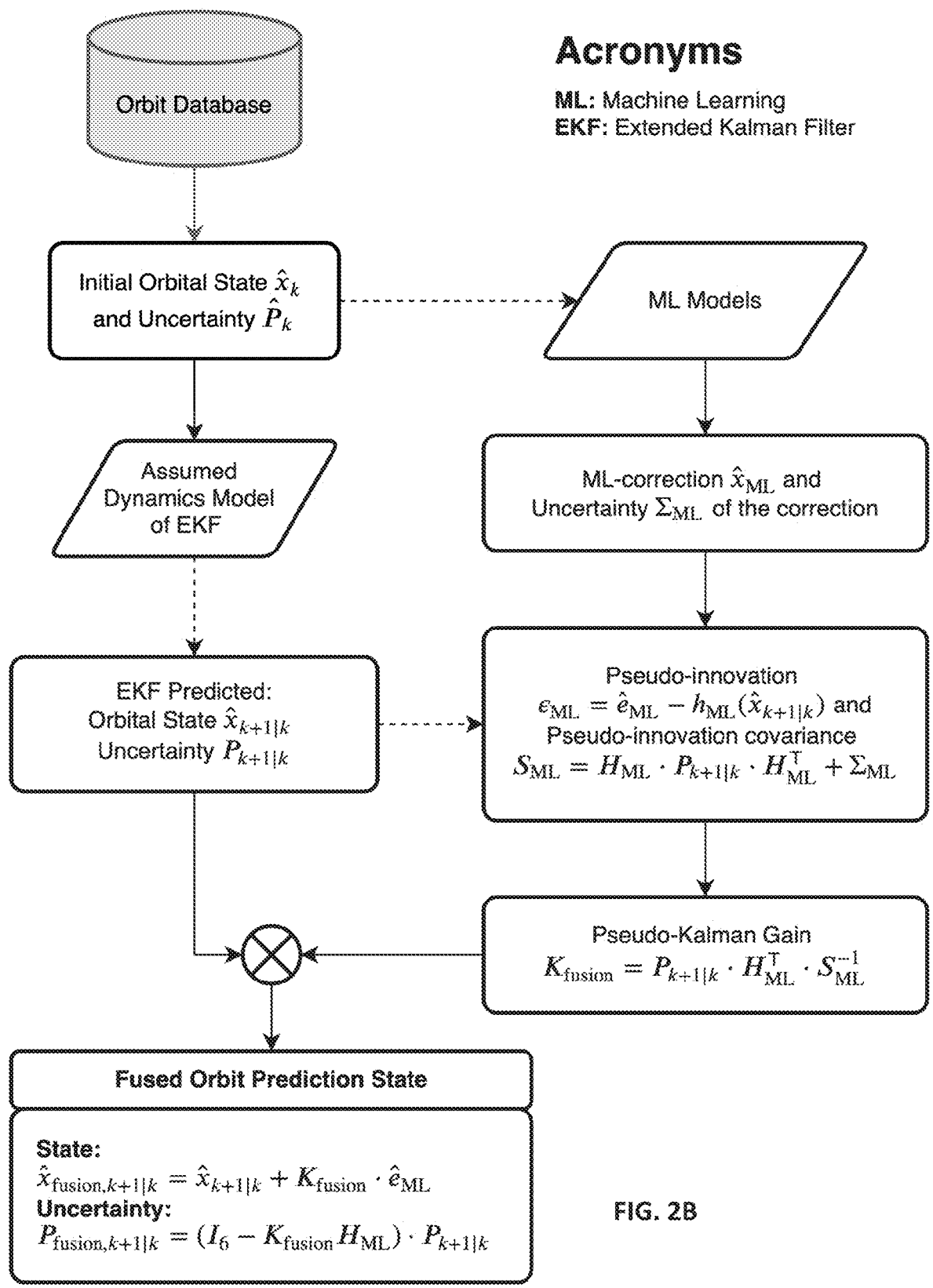

FIG. 1 is a block diagram of an illustrative computer-based system for orbital prediction error and uncertainty reduction in accordance with one or more embodiments of the present disclosure. FIG. 2A and FIG. 2B illustrate flowcharts of illustrative methodologies implemented by the system for orbital prediction error and uncertainty reduction in accordance with one or more embodiments of the present disclosure.

In some embodiments, orbital prediction with error and uncertainty reduction may involve many data operations during the whole monitoring and correction process. In some embodiments, a system for performing the space object monitoring and machine learning (ML) prediction error reduction may involve two databases. The first database is an object state database 110 that records published raw object state datasets 111 and generates some additional information.

In some embodiments, the object state database 110 may include the object state datasets 111 including data indicative of an object state representative of a position and/or trajectory of each recorded object. In some embodiments, the object state may include, e.g., positional coordinates according to a suitable coordinate system, such as, e.g., RSW, Earth-centered inertial (ECI) frame, Cartesian coordinates, or other suitable reference frame and/or coordinate frame. In some embodiments, the object states may be represented in any suitable form, such as, e.g., as Two-Line Element (TLE) or other suitable data format for representing trajectories of objects in three-dimensional space.

In some embodiments, the additional information may include, e.g., the Unique_Index that refers to specific TLE set and its other values, TLE_line1+line2 of the original TLE sets, A status as, e.g., a Boolean value to indicate the quality of the set and whether it should be used for the ML approach, Initial_Covariance approximated by analyzing the historical TLE sets using piece-wise difference, among other possible information.

In some embodiments, the second database is the Monitored Machine Learning database (MML-database) 120 that stores trained ML models 121 as well as the monitoring information. The monitoring information will be used to determine whether the ML models should be retrained or not. In some embodiments, the ML models may be retrained every time a new TLE comes into the object state database 110. However, due to the non-negligible computational cost of machine learning training process, it is more efficient to set up a ML model monitor 122 to evaluate of the performance of the model on the data in an M-window as described below. Indeed, the MML database 120 may maintain information including, e.g., A Unique_Index that refers to specific trained ML models, Models including six trained models, including model parameters, Models_Status, including, e.g., a Boolean value of 1×6 dimension where each element corresponds to one component of the orbit prediction error, Models_Monitoring representing the evaluation of the performance on the data in the M-window, including, e.g., Monitor_Index equal to TLE_UniqueIndex (i.e. update when new TLE is available), Monitor_Metrics including performance metrics, including $P_{ML}$, $Q_{ML,3}$, etc., Monitor_Criteria including a Boolean value of $1 \times N_{crite}$. Dimension that indicates the result of each criterion, Models_Other_Algorithm, Models_Other_Algorithm_Monitoring, Models_Status_Status, Training_Data, including TLE_Sets representing all the TLE sets falling inside a time (T)-window, Excluding bad TLE sets which is identified as an outlier in the machine learning training dataset, Training_Data_Parameters, Training_Data_Size representing a size of the training dataset, Maximum_Prediction_Duration, as well as other possible data.

In some embodiments, the two databases will be maintained regularly along with the publication of the object state datasets 111. They can be published to end-users so that the trained ML models 121 could be used to enhance the orbit predictions using object state datasets 111.

In some embodiments, combining the object state database 110 with the MML database 120 facilitates enhancing the orbit prediction accuracy. The TLE-database may facilitate a community validating the ML models and further improving the ML models 121.

In some embodiments, the raw object state datasets 111 is collected by the object state database 110 from, e.g., a data source 101, such as one or more databases of resident space object (RSO) measurements, or measurements of other moving bodies. In some embodiments, the data source 101 may be a repository of measurements, the measurement device or devices themselves, or other source of data. In some embodiments, the data source 101 may communicate the raw object state datasets 111 across a network 103 to the object state database 110, such as, e.g., via the internet, via an intranet, via local area network (LAN), of by some other network.

For example, the data source 101 may be a simulated environment or a ground based radar station. In some embodiments, the data source 101 may provide the object state of one or more moving objects, such as, RSOs using a dynamic model in the Earth-centered inertial (ECI) frame, according to Eq. (1) below:

$$\dot{x} = f(x, \text{coeff.}),\qquad\text{Equation (1)}$$

where x=[x, y, z, $v_x$, $v_y$, $v_z$]$^T$, denotes the Cartesian orbital state where r=[x, y, z]$^T$ represent a position vector and v=[$v_x$, $v_y$, $v_z$]$^T$ represents a velocity vector. Accordingly, Eq. (1) can be modified as follows:

$$\dot{x} = \begin{bmatrix} \dot{r} \\ \dot{v} \end{bmatrix} = f(x) = \begin{bmatrix} v \\ a \end{bmatrix}\qquad\text{Equation (1b)}$$

In some embodiments, a satellite's acceleration, a, is defined according to Eq. (2) below:

$$a(x,\text{coeff.}) = a_{Newton}(x) + a_{harmonic}(x) + a_{drag}(x,\text{coeff.}_{drag}) + a_{SRP}(x,\text{coeff.}_{SRP}) + a_{3\text{-}body}(x),\qquad\text{Equation (2)}$$

where the $a_\xi(\cdot)$ denotes the acceleration due to various external forces acting on the RSO in the ECI frame and coeff.$_\xi$ denotes the corresponding coefficients. In some embodiments, the true model of the simulation environment includes a high-accuracy model may be employed as the base fact. Then, in some embodiments, assumed dynamic modes may be employed during the orbit determination and prediction procedures. This assumed model may be intentionally altered to have a lower accuracy than the true dynamics, reflecting the practical situation where the physical model is just an approximation to the world. In some embodiments, parameters of these two models may include the parameters summarized in Table 1 for replication.

TABLE 1

Setups of the truth and assumed models.

| Parameters | True model | Assumed model |
|---|---|---|
| Earth Shape | WGS84 | WGS84 |
| Harmonics Gravity Field | 40 × 40 | 4 × 4 |
| Third-Body Perturbation | Sun + Solar Planets | Sun + the Moon |
| Atmosphere Model | DTM2000 | NRLMSISE-00 |
| Solar Activity | MSAFE | $(F_{10.7}, K_p) = (150.0, 3.0)$ |

The ground radar station is model as a topocentric frame located at the WGS84 surface. In some embodiments, only one radar station is simulated, however, additional radar stations may be simulated in any combination. The latitude of the simulated station is 30:57, the longitude −86:21, and the altitude 34.7 m. In some embodiments, the visibility is limited by a minimum elevation of 20 and a maximum range of 13210 km. In some embodiments, the measurement type is the azimuth-elevation angle direction and the measurement noise standard deviations are 0:0154 and 0:0147 respectively. In some embodiments, the following results may not explicitly depend on the number or location of the station, so it can be extended to more complicated situations with some modifications.

In some embodiments, the object state database 110 may further include a data cleanser 112 to pre-process the raw object state datasets 111. In some embodiments, the data cleanser 112 may be configured to, e.g., normalize the raw object state datasets 111, remove redundancies, merge redundant records, among other pre-processing techniques.

In some embodiments, upon cleansing the object state datasets 111, the object state database 110 may configured to generate trajectory predictions with a trajectory estimator 113. In some embodiments, the trajectory estimator 113 utilizes iterative physics-based algorithms to predict a future trajectory based on a measured object state of each object (e.g., from the raw object state dataset 111), such as, e.g., Bayesian inferencing, Monte-Carlo Modelling, Extended Kalman Filtering (EKF), or other suitable iterative approach. In some embodiments, the iterative physics-based algorithm, such as an EKF estimator, may generate sequential predictions of both the object state and its uncertainty. Meanwhile, due to the fact that the EKF is an approximate Bayesian inferencing method, fusion of additional information to EKF may be performed in an efficient and accurate manner.

For example, for the low Earth orbit (LEO) objects, the drag coefficient $C_d$ may also be estimated along the orbit because the atmosphere drag perturbation has a great impact on the dynamics but cannot be precisely modeled. Accordingly, in some embodiments, a full estimation state $x \in \mathbb{R}^7$ may be used to denote all the variables that are be processed by the filter, $$x = [x^T C_d]^T, \qquad \text{Equation (3)}$$

where $x = [r^T, v^T]^T$ is the orbital state vector and $r = [x, y, z]^T$ and $r = [vx, vy, zv]^T$ respectively. Hereinafter, the sans serif symbols are used to denote the full estimation state including $C_d$ as well as functions or matrices operating the full state, while normal italic symbols are used to denote the orbital state and the related functions or matrices. In some embodiments, making this distinguishing may help keep the following description clear. The propagation dynamics and measurement equations are then given as:

$$\begin{cases} \dot{x}(t) = f(x, t) + w(t) \\ z_k = h(x_k) + v_k \end{cases}, \qquad \text{Equation (4)}$$

where $\tilde{z}_k$ is the measurement, $h(\cdot)$ is the measurement function, $w(t)$ is process noise according to a zero-mean Gaussian noise process with covariance given by $E\{w(t), w(t')\} = Q(t) \delta(t-t')$, and $v_k$ is the measurement noise following the Gaussian distribution $\mathcal{N}(0, R_k)$. The power spectral matrix $Q(t)$ is statistically determined for the simulation environment and for particular RSOs. The covariance matrix $R_k$ is the measurement noise determined by the measurement system and may be related to the specific equipment. Notice that $\dot{C}_d = 0$ and it will only be updated at each estimation step, so $\dot{C}_d$ may be dropped from the equation for clarity and assume the process noise for $\dot{C}_d$ is zero. Therefore, in some embodiments, in the time interval $[t_{k-1}, t_k]$, a continuous-time dynamic system may be used to propagate orbit and use a discrete-measurement system to generate measurements, formulated as:

$$\dot{x} = \begin{bmatrix} \dot{x} \\ C_d \end{bmatrix} = f\left(\begin{bmatrix} x \\ C_d \end{bmatrix}\right) = \begin{bmatrix} f(x, C_{d,k-1}) \\ 0 \end{bmatrix}, \qquad \text{Equation (5)}$$

$$y_k = h(\hat{x}_{k|k-1}) + v_k,$$

where the subscript k indicates the value is taken at the epoch $t_k$. The drag coefficient $C_d$ is only a propagation parameter updated at $t_{k-1}$ and kept unchanged during $[t_{k-1}, t_k]$. In such a case, the predicted orbital state $\hat{x}_{k|k-1}$ is obtained by propagating the dynamic equation from $t_{k-1}$ to $t_k$. The uncertainty propagation is formulated as:

$$P_{k|k-1} = F_{k|k-1} P_{k-1|k-1} F^T_{k|k-1} + Q_{k|k-1}, \qquad \text{Equation (6)}$$

where $F_{k|k-1}$ is the state transition matrix of $f(x)$ from $t_{k-1}$ to $t_k$ and $Q_{k|k-1}$ is the process noise covariance at $t_k$ which starts from $t_{k-1}$.

In some embodiments, when the measurement $\tilde{z}_k$ is available at $t_k$, the innovation $\tilde{y}_k$ and its covariance $S_k$ may include, e.g.:

$$\tilde{y}_k = \tilde{z}_k - h(\hat{x}_{k|k-1}),$$

$$S_k = H_k P_{k|k-1} H_k^T + R_k, \qquad \text{Equation (7)}$$

where $H_k = \partial h/\partial x_{k|\hat{k}-1}$ is the measurement Jacobian matrix. Then, in some embodiments, the optimal Kalman gain $K_k$ is obtained as:

$$K_k = P_{k|k-1} H_k^T S_k^{-1}.\qquad \text{Equation (8)}$$

In some embodiments, the updated estimate $\hat{x}_{k|k}$ and its covariance $P_{k|k}$ are:

$$\hat{x}_{k|k} = \hat{x}_{k|k-1} + K_k \tilde{y}_k,$$

$$P_{k|k} = (I_7 - K_k H_k) P_{k|k-1},\qquad \text{Equation (9)}$$

In the simulation environment, one tracklet may include of a series of sequential measurements fed to the above EKF estimator. In some embodiments, at each measurement epoch of the tracklet, an estimate of the orbital state and uncertainty may be generated where only the last estimate of the tracklet is recorded as the output of the tracking result of the EKF estimator.

In some embodiments, using this setup, the updating frequency may include any suitable updating frequency to balance accuracy with computational resource use, such as, e.g., about two estimates per day, three estimates per day, five estimates per day, or other suitable frequency. In some embodiments, two estimates per day may be employed in order for the EKF estimates to match the data of the TLE catalog for most LEO objects.

In some embodiments, although the true orbital state $x_{True}(t_j)$ is used to collect the training data, in practice, it can be replaced by any higher-accuracy data. In some embodiments, the only adjustment is that the theoretical residual error will not be zero as this alternative source will have its own bias and uncertainty with respect to the true state. For example, the ML approach may be validated to work with a series of RSOs in the TLE catalog, using higher-accuracy ILRS (International laser ranging services) catalog as the true data source. In some embodiments, only the TLE catalog is employed, however additional catalogues may be used and combinations thereof. In some embodiments, a newer TLE set may be believed to have a higher accuracy than the corresponding prediction based on an older TLE set, so this newer data can serve as the truth for the older prediction. Briefly speaking, $x_{True}$ is replaced by $\hat{x}_{TLE}$ for because the TLE estimates are taken as the true prediction.

In some embodiments, the current estimated state $\hat{x}_{TLE}(t_i)$ is backwardly propagated to its past epochs $t_{i-1}$ and $t_{i-2}$ to generate the states $\hat{x}_{TLE}(t_{i-1}; t_i)$ and $\hat{x}_{TLE}(t_{i-2}; t_i)$. At $t_{i-1}$, each of the propagated states are compared with the true state to obtain the consistency error $e_C(t_{i-1}; t_i) = \hat{x}_{TLE}(t_{i-1}) - \hat{x}_{TLE}(t_{i-1}; t_i)$. The consistency error is expressed in the RSW frame using as Cartesian coordinates. In some embodiments, the estimated drag coefficient should also be included as a learning variable with its direct impact on the orbit propagation. As a summary, the set of learning variables $\lambda$ for the ML approach at the epoch $t_i$ consists of:

Prediction duration $\Delta t = t_j - t_i$ to the future epoch $t_j$;

Eight pairs of consistency errors $e_C(t_j; t_i)$ and the backward propagation duration $\delta t = t_i - t_j$;

where the backward propagation duration $\delta t_l$ satisfies:

$$t_0 - t_{-1} > 0.25 \text{ day},$$

$$t_{-1} - t_{-2} > 0.5 \text{ day},$$

$$t_{-2} - t_{-3} > 1 \text{ day},$$

$$t_{-l+1} - t_{-l} > 2 \text{ days, where } l = 4, \ldots, 8,\qquad \text{Equation (10)}$$

where $t_0$ denotes the current epoch and $t_{-l}$ ($l = 1, \ldots, 8$) denotes the epoch of the l-th previous estimate. These durations are designed with the consideration of the longest prediction duration as well as that the more recent data has larger effect on the performance. For example, the above constraints may chosen such that the resulting $\delta t$ for pairs of consistency errors are a predetermined or automatically selected duration, e.g., in hours, days, weeks, months or any combination thereof. For example, in some embodiments, the consistency errors may include, e.g., one, two, three, four, five, six, seven, eight, nine, ten or more pairs of consistency errors for durations spanning between, e.g., 0 and 2 days, 0 and 4 days, 0 and 5 days, 0 and 10 days, 0 and 12 days, 0 and 14 days, 0 and 15 days, 0 and 20 days, 0 and 21 days, 0 and 25 days, 0 and 30 days, 0 and 31 days, 0 and 1 month, 0 and 2 months, 0 and 3 months, 0 and 4 months, 0 and 5 months, 0 and 6 months, 0 and 7 months, 0 and 8 months, 0 and 9 months, 0 and 10 months, 0 and 11 months, 0 and 12 months, or more, 1 and 2 days, 1 and 4 days, 1 and 5 days, 1 and 11 days, 1 and 12 days, 1 and 14 days, 1 and 15 days, 1 and 21 days, 1 and 21 days, 1 and 25 days, 1 and 31 days, 1 and 31 days, 1 and 1 month, 1 and 2 months, 1 and 3 months, 1 and 4 months, 1 and 5 months, 1 and 6 months, 1 and 7 months, 1 and 8 months, 1 and 9 months, 1 and 11 months, 1 and 11 months, 1 and 12 months, or more, 2 and 2 days, 2 and 4 days, 2 and 5 days, 2 and 12 days, 2 and 12 days, 2 and 14 days, 2 and 15 days, 2 and 22 days, 2 and 21 days, 2 and 25 days, 2 and 32 days, 2 and 31 days, 2 and 1 month, 2 and 2 months, 2 and 3 months, 2 and 4 months, 2 and 5 months, 2 and 6 months, 2 and 7 months, 2 and 8 months, 2 and 9 months, 2 and 12 months, 2 and 11 months, 2 and 12 months, or more or any combination thereof. In some examples, there may be eight pairs of consistency errors at durations of roughly $\{0.5, 1.5, 3, 5, 7, 10, 12, 14\}$ days, covering a maximum range of past 14 days.

In some embodiments, the target orbit prediction error $e_T$ at the prediction epoch $t_j$, expressed in the RSW frame using Cartesian coordinates, may be calculated as the difference between the TLE-prediction $\hat{x}_T(t_j; t_i)$ and the most updated TLE $x_T(t_j)$, $$e_T(t_j; t_i) = A_{I2R}(t_j) \cdot [x_{TLE}(t_j) - \hat{x}_{TLE}(t_j; t_i)],\qquad \text{Equation (11)}$$

where $x_T(t_j)$ denotes the true orbital state and $A_{I2R}(t_j)$ is the direction cosine matrix that rotates the ECI frame to the RSW orientation at $t_j$. Herein, the term $e_T$ refers to error within the RSW frame. In some embodiments, the TLE estimates may then be sent to the MML database 120 for correction using the ML models 121. In some embodiments, the ML models 121 may one or more trajectory error prediction machine learning models to predict an error of future trajectory predictions $\hat{x}_T(t_j; t_i)$ and may be trained against updated TLEs based on errors predicted for the updated TLE.

In some embodiments, at a current epoch $t_i$, ML models 121 are trained by the model engine 130 to map the learning variables $\Lambda(t_i)$ to the orbit prediction error $\hat{e}_{ML}(t_j; t_i)$, which approximates the true orbit prediction error $e_T(t_j, t_i)$. Thus, in some embodiments, the machine learning prediction of orbit prediction error $\hat{e}_{ML}(t_j; t_i)$ by the trajectory error prediction machine learning model(s) may be fused with the conventional orbit prediction $\hat{x}_T(t_j; t_i)$ based on the current estimate $\hat{x}_T(t_i)$. In some embodiments, this process is designed to not involve propagation and not interference with the existing orbit estimation process. In some embodiments, the orbit prediction errors can be largely due to systematic errors, including the measurement system and the assumed model, or the estimation algorithm could identify consistent patterns in the historical data, which could be learned and mitigated.

Accordingly, in some embodiments, a residual orbit prediction error $e_{res}(t_j; t_i)$ may also be calculated. In some embodiments, the residual orbit prediction error $e_{res}(t_j; t_i)$ may be defined as the approximate error, as expressed in Equation 12 below:

$$\begin{aligned} e_{res}(t_j; t_i) &= e_T(t_j, t_i) - e_{ML}(t_j; t_i) \quad \text{Equation (12)} \\ &= A_{I2R}(t_j) \cdot [x_T(t_j) - \hat{x}_T(t_j; t_i)] - \hat{e}_{ML}(t_j; t_i) \\ &= A_{I2R}(t_j) \cdot [x_T(t_j) - \hat{x}_T(t_j; t_i)] - \\ &\quad A_{I2R}^{-1}(t_j) \cdot \hat{e}_{ML}(t_j; t_i) \end{aligned}$$

In some embodiments, the last two terms in the square bracket as the ML-modified orbit prediction state may be defined as per Eq. (13) below:

$$\hat{x}_{ML}(t_j, t_i) = \hat{x}_T(t_j; t_i) + A_{I2R}^{-1}(t_j) \cdot \hat{e}_{ML}(t_j; t_i), \quad \text{Equation (13)}$$

In some embodiments, given Eq. (12) and Eq. (13), a residual error may be defined according to Eq. (14) below:

$$e_{res}(t_j, t_i) = A_{I2R}(t_j) \cdot [x_T(t_j) - \hat{x}_{ML}(t_j; t_i)]. \quad \text{Equation (14)}$$

In some embodiments, Eq. (14) reveals that the difference between $e_T$ and $\hat{e}_{ML}$ is actually the orbit prediction error of the ML-modified state $\hat{x}_{ML}$ with respect to the true state $x_T$ at the same epoch. Therefore, a result showing that $\hat{e}_{ML}$ closely approximates $e_T$ is equivalent to the result showing that the ML-modified prediction $\hat{x}_{ML}$ is accurately approximates the true state $x_T$. Moreover, in some embodiments, Eq. (13) assumes that $\hat{e}_{ML}$ is directly applied onto the orbit prediction $\hat{x}$, which is different from the fusion strategy using Gaussian processes, as described below. Furthermore, the residual error $e_{res}$ may be a vector expressed in a local orbital frame which is centered at the ML-modified state $\hat{x}_{ML}$ but has an orientation parallel to that of the RSW frame which is centered at the original prediction $\hat{x}$.

In some embodiments, the above ML approach using the trajectory error prediction machine learning model(s) uses true orbital prediction error $e_T(t_j, t_i)$, which depends on the availability of the true state $x_T(t_j)$ and may not be available in reality. However, in some embodiments, a deeper understanding of the trajectory error prediction machine learning model(s) indicates that the "true state" can be replaced by any data source which has a higher accuracy than the orbit predictions. This is because the purpose of the true state is to provide higher accuracy information to the trajectory error prediction machine learning model(s) as a training target. The trade-off is that the replaced "true state" provides less information. Additionally, in some embodiments, only the true states at the epoch of estimates are utilized to generate the training data, rather than the whole true trajectory. In some embodiments, this ML approach may be effective with the TLE catalog where the higher-accuracy International laser ranging services (ILRS) catalog may be used as the "true data" source. Another possible high accuracy data source is the GPS auto-navigation data available for many modern satellites.

In some embodiments, even without an external data source, a newer estimate in an orbit determination system is usually more accurate than a prediction based on an older estimate. Therefore, the estimates themselves can serve as a "true state" substitution. For example, a new set of the TLE data often has a higher accuracy than the prediction based on an old set, therefore the ML approach can be applied to the TLE catalog.

In some embodiments, the ML models 121 are supplementary to the physics-based orbit estimation and prediction procedures, such as the object state estimate from the trajectory estimator 113. Thus, in some embodiments, available information is collected to infer the orbit prediction error in the current system. In turn, the inferred error can be subtracted from the original prediction.

In some embodiments, simply correcting the error may be difficult to monitor for degradation. Thus, the ML models 121 may include suitable trajectory error prediction machine learning model(s) for detecting, e.g., consistency errors, such as, e.g., models that may track uncertainty, such as, via covariances. For example, some embodiments utilize ML models 121 based on Bayes Inference, such as, e.g., models constructed of Gaussian Processes (GP), such as heteroscedastic GP methods, sparse GP methods (e.g., the SGP4 model, etc.) or any other suitable GP method or any combination thereof.

In some embodiments, at the current epoch $t_i$, GP models may be trained to map the learning variables $\Lambda(t_i)$ to the orbit prediction error $\hat{e}_{ML}(t_j, t_i)$, which can be fused with the conventional orbit prediction $\hat{x}(t_j, t_i)$ based on the current estimate $(t_i)$ to improve the accuracy. In some embodiments, the orbit prediction error due to system errors which might emerge from the measurement system, the assumed model, or the estimation algorithm could conceive consistent patterns in the timeline, therefore these pattern-consistent errors could be alleviated based on experience.

Another advantage of the current ML approach is that it is a separated process to existing operations. In either conjuncture analysis or observation scheduling, the ML-modified predictions can be either applied or not, without altering any running procedure. In other words, the ML approach could work like a plug-in or patch to the existing system, which can be easily monitored, evaluated, and controlled.

In some embodiments, the model engine 130 may train the ML models 121, such as GP models as described above. In some embodiments, using the trained models, the model engine 130 may then determine the ML-prediction $\hat{e}_{ML}(t_j; t_i)$ as an approximation of the real orbit prediction $e_T(t_j; t_i)$. Therefore, if $\hat{e}_{ML}(t_j; t_i)$ is directly applied onto the orbit prediction $\hat{x}_{TLE}(t_j; t_i)$, the ML-modified orbit prediction state may be determined as:

$$\hat{x}_{ML}(t_j; t_i) = \hat{x}(t_j; t_i) - \hat{e}_{ML}(t_j; t_i), \quad \text{Equation (15)}$$

Then, the residual (orbit prediction) error $\hat{e}_{res}(t_j; t_i)$ is:

$$\begin{aligned} \hat{e}_{res}(t_j; t_i) &= x_T(t_j) - \hat{x}_{ML}(t_j; t_i), \quad \text{Equation (16)} \\ &= [x_T(t_j) - \hat{x}(t_j; t_i)] - [\hat{x}_{ML}(t_j; t_i) - \hat{x}(t_j; t_i)], \\ &= e_T(t_j; t_i) - \hat{e}_{ML}(t_j; t_i). \end{aligned}$$

This means that the residual error between $e_T$ and $\hat{e}_{ML}$ is actually the residual orbit prediction error of the ML-modified state $\hat{x}_{ML}$ expressed in the RSW frame centered at $\hat{x}$. If $\hat{e}_{ML}$ can approximate $e_T$ precisely, the ML-modified prediction $\hat{x}_{ML}$ will be identical to the true state $x_T$, meaning that the orbit prediction error is zero after the ML-modification.

In some embodiments, the ML models 121 are heteroscedastic GP algorithm employed in, which is a sparse GP method capable of learning input-dependent observation noise. The learning variables in the training data are collected as a matrix:

$$\Lambda = [\lambda_1 \ldots \lambda_k \ldots \lambda_n] \in \mathbb{R}^{d \times n}, \quad \text{Equation (17)}$$

where d is the number of the learning variables and n is the number of data points in the training data. Similarly, the target true errors $e_{T,k} \triangleq e_T(t_k)$, are also collected as a matrix. In some embodiments, the state of an object may be represented as above according to the three positional dimensions and three velocity dimensions, thus resulting 6-dimensional states and 6-dimensional errors including the 6-dimensional target true errors as represented in Eq. (18) below:

$$E = [e_{T,1} \ldots e_{T,k} \ldots e_{T,n}] \in \mathbb{R}^{6 \times n}. \quad \text{Equation (18)}$$

A set of radial basis functions $\Phi$ may then be used to map the learning variable matrix $\Lambda$ into a m-dimensional feature space as:

$$\Phi = \phi(\Lambda) = [\phi(\lambda_1) \ldots \phi(\lambda_k) \ldots \phi(\lambda_n)] = \begin{bmatrix} \phi_1(\lambda_1) & \ldots & \phi_1(\lambda_n) \\ \vdots & \ddots & \vdots \\ \phi_m(\lambda_1) & \ldots & \phi_m(\lambda_n) \end{bmatrix}_{m \times n}, \quad \text{Equation (19)}$$

where each basis function $\phi_j$ may be specified as $$\phi_j(\lambda_k) = \exp\left[-\frac{1}{2}(\lambda_k - p_j)^T \Gamma_j^T \Gamma_j (\lambda_k - p_j)\right], \quad \text{Equation (20)}$$

with $p_j \in \mathbb{R}^d$ is center vector and $\Gamma_j = \text{diag}(\{\gamma_{j,k}\}) \in \mathbb{R}^{d \times d}$ is the precision matrix. Finally, each component of $e_T$ (corresponding to each row of E), denoted as $\tau$ for simplicity, may be modeled as a linear combination of $\phi_i$ in the feature space as:

$$\tau = \phi(\lambda)^T \omega + \varepsilon(\lambda), \quad \text{Equation (21)}$$

with $\omega \in \mathbb{R}^m$ weight vector and $\varepsilon$ as the heteroscedastic noise for each training data. The heteroscedastic noise $\varepsilon_k \triangleq \varepsilon(\lambda_k)$ is assumed to obey the normal distribution $\mathcal{N}(0, \beta_k^{-1})$ with:

$$\beta_k = \exp[\phi(\lambda_k)^T u + b + \text{poly}_q(\Delta t)], \quad \text{Equation (22)}$$

which is the exponential of a linear function and a q-th order polynomial of $\Delta t$. In some embodiments, the object has freedom of movement in three dimensions. In such embodiments, six GP models in total may be trained for each component of $e_T$ respectively. In some embodiments, to take into account an increase in the orbit prediction uncertainty with respect to $\Delta t$, the polynomial term, k, in has been included in Eq. (19). In some embodiments, the inclusion of a polynomial term in Eq. (22) explicitly includes physics knowledge that the orbit prediction uncertainty will increase with respect to $\Delta t$. In some embodiments, this design may enable improving the GP's performance by employing the polynomial term combine physics-based formulations that affect the orbit prediction uncertainty with the basis function.

In some embodiments, to train the ML models 121, first Gaussian priors are applied to all the unknown parameters and the marginal likelihood function is derived as well as its differentials with respect to all the variables. Then, in some embodiments, the model engine 130 may determine the parameter values of $p_j$, $\Gamma_j$, $\omega$, u, b and all the other parameters by maximizing, e.g., a marginal likelihood function.

Given the well-trained GP models and a new learning variable set $\lambda_*$, the GP-predicted $\tau_*$ may follow a Gaussian posterior distribution with a mean of $\mu_*$ and variance of $\sigma_*^2$, which is:

$$p(\tau_* | \phi(\lambda_*), \Lambda, \tau, \theta) = \mathcal{N}(\mu_*, \sigma_*^2), \quad \text{Equation (23)}$$

where, $$\mu_* = \phi(\lambda_*)^T \Sigma^{-1} \phi^T B \tau, \quad \text{Equation (24)}$$

$$\sigma_*^2 = \upsilon_* + \beta_*^{-1}, \quad \text{Equation (25)}$$

with $\upsilon_* = \phi(\lambda_*)^T \Sigma^{-1} \phi(\lambda_*)$ and $\beta_* = \exp[\phi(\lambda_*)^T u + b + \text{poly}_q(\Delta t)]$.

In some embodiments, as described above, the EKF uncertainty information represented in Eq. (6) may be obtained using the assumed dynamics model. Thus, the EKF uncertainty information has a straightforward physical meaning. On the other hand, the covariance of the ML-prediction by the trajectory error prediction machine learning model(s) predicting a trajectory error represented in Eq. (25) may be obtained from a data-driven process without a direct physical meaning. Accordingly, in some embodiments, a fusion strategy may be employed which combines the information from the model-based uncertainty propagation and the data-driven ML-covariance by interpreting the trajectory error and the trajectory error covariance as the pseudo-measurement and its corresponding pseudo-measurement noise.

In some embodiments, the trained ML models 121 are invoked and implemented by the model engine 130 to generate an ML-prediction of the true orbit prediction error in the RSW frame centered at the predicted state $\hat{x}_{k|k-1}$, denoted as $\hat{e}_{ML}(t_j; t_i) = [e_x, e_y, e_z, e_{vx}, e_{vy}, e_{vz}]^T$. In some embodiments, this ML-prediction, which is indeed a state vector in the RSW frame, can also be treated as a measurement in the RSW frame. To distinguish from the measurement generated by the ground station, used in EKF, the predicted future state may be considered a pseudo-measurement $\tilde{y}_{ML,j}^{RSW}$ at $t_j$ that represents the trajectory error determined by the trajectory error prediction machine learning model(s) as a physical measurement, whose measurement equation is given by equation (23) below (superscripts indicate the frame in which the orbital state vector is calculated and full estimation states are always in inertial frame):

$$\tilde{y}_{ML,j}^{RSW} = \hat{e}_{ML}(t_j; t_i) = h_{ML}(\hat{x}_T), \quad \text{Equation (26)}$$

The pseudo-measurement function $h_{ML}(x)$ transforms the inertial full state $x = [x^T, C_d]^T$ to the RSW frame centered at $\hat{x}_{j|i}$, formulated as:

$$h_{ML}(x) = [A_{I2R} O_{6 \times 1}] \left( \begin{bmatrix} x \\ C_d \end{bmatrix} - \begin{bmatrix} \hat{x}_{j|t} \\ C_{d,t} \end{bmatrix} \right) = A_{I2R} \cdot (x - \hat{x}_{j|i}), \quad \text{Equation (27)}$$

where $A_{I2R}$ stands for the Jacobian matrix that rotates an inertial vector to be aligned with the RSW frame. In some embodiments, the ML-modifications of the trajectory error predicted by the trajectory error prediction machine learning model(s) include a covariance as described above. Similar to the ML-modifications, the covariance may be interpreted in a physical representation for fusion with the physics-based EKF covariance, e.g., by treating the covariance of the ML-modifications as a pseudo-measurement noise. In some embodiments, the pseudo-measurement noise $v_{ML,j}$ in Eq. (23) is assumed to the obey normal distribution $\mathcal{N}(0, \hat{e}_{ML,j})$ with the covariance specified by the ML-covariance as:

$$\Sigma_{ML,j} = \text{diag}([\sigma_{ML,x}, \sigma_{ML,y}, \sigma_{ML,z}, \sigma_{ML,vx}, \sigma_{ML,vy}, \sigma_{ML,vz}]_{t_j}), \quad \text{Equation (28)}$$

where the ML-modifications of the trajectory error predicted by the trajectory error prediction machine learning model(s) are assumed to be uncorrelated as they are generated by different GP models. In some embodiments, the pseudo-measurement in Eq. (27) shows a correlation with the EKF-prediction, but Eq. (27) may not generate the actual $\hat{e}_{ML}(t_j; t_i)$ and $\Sigma_{ML,j}$. In fact, the trained GP models are used to generate pseudo-measurement and pseudo-covariance without involving the current EKF-covariance. Therefore, in some embodiments, the pseudo-measurement is not correlated with the EKF estimates or predictions. In this way, the results generated by the GP models could be fused in the EKF fashion. The pseudo-innovation $\in_{ML,j}$ of the ML-correction can be expressed in the RSW frame as:

$$\in_{ML,j}^{RSW} = \tilde{y}_{ML,j}^{RSW} - h_{ML}(\hat{x}_{j|i}) = \hat{e}_{ML,j}. \quad \text{Equation (29)}$$

In some embodiments, $h_{ML}(\hat{x}_{j|i}) = 0$ may be assumed to be constant according to the definition of $h_{ML}(\cdot)$ in Eq. (27). Thus, the ML-predicted error may be considered the pseudo-innovation. Then, its corresponding pseudo-innovation covariance may be:

$$S_{ML,j} = H_{ML,j} P_{j|i} H_{ML,j}^T + \Sigma_{ML,j}, \quad \text{Equation (30)}$$

where the pseudo-measurement matrix may be:

$$H_{ML,j} = \frac{\partial h_{ML}(x)}{\partial x} = [A_{I2R} O_{6 \times 1}]. \quad \text{Equation (31)}$$

Then, the corresponding Kalman gain for the fusion is:

$$K_{fusion,j} = P_{j|i} H_{ML,j}^T S_{ML,j}^{-1}. \quad \text{Equation (32)}$$

The final fusion results, the orbit prediction and its covariance, are expressed as:

$$\hat{x}_{fusion,j|j} = \hat{x}_{j|i} + K_{fusion,j} \cdot \hat{e}_{ML,j},$$

$$P_{fusion,j|j} = (I_7 - K_{fusion,j} H_{ML,j}) P_{j|i}. \quad \text{Equation (33)}$$

In some embodiments, in the RSW frame, both the EKF prediction and the ML-correction may be accompanied by an uncertainty ellipsoid. The final fused-state is different from both the EKF-prediction and the ML-correction, but can take advantage of both their information and provides a more condensed uncertainty ellipsoid.

Although the trained ML models 121 generate corrections to all the components in the RSW frame, in some embodiments, only a subset of the components are selected to be modify. If only a few components of the prediction are to be modified, the fusion process can be slightly changed as follows.

In some embodiments, where only the position components are desired to be corrected, i.e., the pseudo-measurement in Eq. (26) is $\tilde{y}_{ML,j}^{RSW} = B \cdot \hat{e}_{ML,j} = [e_x, e_y, e_z]^T$ where $B = [I_3 O_3]^T$ simply extracts the desired components. As the measurement has been changed, the new pseudo-innovation in Eq. (29) changes to:

$$\in_{ML,j}^{RSW} = B \cdot (\hat{e}_{ML,j} - h_{ML}(\hat{x}_{j|i})) = B \cdot \hat{e}_{ML,j}. \quad \text{Equation (34)}$$

In some embodiments, the form of the pseudo-innovation covariance in Eq. (30) is unchanged, except that the pseudo-measurement matrix is changed to:

$$H_{ML,j} = B \cdot [A_{I2R}(t_j) O_{6 \times 1}]. \quad \text{Equation (35)}$$

Hereafter, the correction and resulting trajectory predictions 123 follow the same process as if all components are being considered.

In some embodiments, the data fusion framework for the ML approach described above provides great flexibility. For example, by redefining $B = [0,1,0, O_{1 \times 3}]$, e.g., $B = [0,1,0,0,0,0]$, the ML-correction is only applied to the dominant along-track component $e_y$.

In some embodiments, the ML approach is intentionally designed to be a direct modification to the orbit prediction results, rather than a modification to each propagation step to be applied iteratively. All the supervised ML models are data-driven and data-sensitive, so each individual output from a trained ML model will possess some intrinsic random error. This additional error from ML may be added to the uncertainty propagation process if the ML-modification is fused at each integration step. It is more advantageous that the ML-modification is independent of the orbit propagation process and serves as a parallel process.

With this consideration, the proposed fusion strategy may update each prediction with its corresponding pseudo-measurement at the specific instances. Explicitly, starting from $\{\hat{x}(t_0), P(t_0)\}$, supposing that the predictions include $\{\hat{x}(t_1), \Sigma(t_1)\}(t_0 < t_1)$ and its corresponding ML-modifications $\{\hat{x}_{ML}(t_1), \Sigma_{ML}(t_1)\}$, the fusion result may be $\{\hat{x}_{fusion}(t_1), \Sigma_{fusion}(t_1)\}$. For the next prediction at the epoch $t_2(t_0 < t_1)$, the fusion strategy performs on $\{\hat{x}(t_2), \Sigma(t_2)\}$ and $\{\hat{x}_{ML}(t_2), \Sigma_{ML}(t_2)\}$, rather than conducting a new propagation using the resulting $\{\hat{x}_{fusion}(t_1), \Sigma_{fusion}(t_1)\}$ from the last step. In this way, the ML approach with the developed fusion strategy becomes an independent, complimentary system.

Another possible design to the above fusion strategy is to model the pseudo-measurement directly in the ECI frame. This alternative is equivalent to the current design for a full-state fusion case. However, for component-specific fusion case, in order to convert $\hat{e}_{ML,j}$ RSW to an ECI vector with only the selected component, all the other components should be set first to zero and their corresponding covariances are set to $+\infty$. For example, for $e_y$-only fusion, the resulting inertial pseudo-measurement and noise may be $$\tilde{y}_j^{ECI} = A_{I2R}^{-1}(t_j) \cdot [0, \hat{e}_{ML,y}(t_j;t_i), 0,0,0,0]^T + \hat{x}(t_j;t_i), \quad \text{Equation (36)}$$

$$\Sigma_{ML,j}^{ECI} = A_{I2R}^{-1}(t_j) \cdot \Sigma'_{ML,j} \cdot A_{I2R}^{-T}(t_j), \quad \text{Equation (37)}$$

where:

$$\Sigma'_{ML,j} = \text{diag}([+\infty, \sigma_{ML,y}(t_j;t_i), +\infty, +\infty, +\infty, +\infty]). \quad \text{Equation (38)}$$

Since it is numerically difficult to deal with infinite values, the RSW frame based fusion strategy is preferred to easily fuse any desired combination of error components.

In some embodiments, upon predicting the trajectory predictions 123, the model engine 130 may test and validate the trained ML models 121. In some embodiments, the performance of the trained GP model is evaluated by two metrics. For convenience, the difference between $e_T$ and $\hat{e}_{ML}$ may be defined as the residual error:

$$\hat{e}_{res} = e_T - \hat{e}_{ML}. \quad \text{Equation (39)}$$

In some embodiments, the first metric may be the percentage of the average absolute residual error, defined as:

$$P_{ML}(e_\xi) = \frac{\sum |\hat{e}_{res,\xi}|}{\sum |e_{T,\xi}|} \times 100\%, \quad \text{Equation (40)}$$

where the summation is taken over the whole input data and is taken from {x, y, z, vx, vy, vz}. In some embodiments, the second metric may be used to quantify the percentage of the data points whose true error $e_{T,\xi}$ falls within the boundary of $\hat{e}_{ML,\xi} + k\sigma_{ML,\xi}$, defined as:

$$Q_{ML,k}(e_\xi) = 100\% \cdot \frac{1}{2n} \sum_{i=1}^{n} (1 + \text{sgn}(k\sigma_{ML,\xi} - |\hat{e}_{res,\xi}|)), \quad \text{Equation (41)}$$

where k>0 is the multiple of the uncertainty $\sigma_\xi$, n is the size of the input dataset, and sgn(·) is the sign function.

In some embodiments, the lower boundary value of $P_{ML}$ is 0, meaning all the errors are eliminated, while it has no upper boundary. The nominal value of $Q_{ML,3}$ is 99.7% if the output obeys exactly a normal distribution. The lower boundary value of $Q_{ML,3}$ is zero, meaning all true values are outside of the predicted $3\sigma_{ML}$-boundary, while its upper boundary value is 100%, meaning all the errors are captured by the boundary.

In some embodiments, the model engine 130 may determine process noise in the trajectory predictions 123. Determining process noise may facilitate ensuring a reliable performance of the filter. Accordingly, in some embodiments, process noise is chosen for determination to facilitate determining many features of the EKF.

In some embodiments, for a chosen RSO, its initial state is propagated to collect a set of, e.g., 30 testing points, each separated by 3600 seconds, Then, each testing point may be propagated in both the true and the assumed models for, e.g., 14 days, during which the states are collected in a fixed step of, e.g., 5 minutes.

After then, the propagation error is decomposed and analyzed in the RSW frame because the along-track error is known to be dominant for LEO objects. The covariance of the process noise of the orbital state (see Eq. (4)) is modeled by a diagonal matrix in the RSW frame, where the diagonal elements are linear functions of the prediction duration $\Delta t$, as shown by the red regions in FIG. 3. In some embodiments, at each integration step, the covariance matrix is first constructed as:

$$Q_{k|k-1}^{RSW} = \text{diag}\left(\begin{bmatrix} 6.5271 \times 10^{-4} \\ 4.2255 \times 10^{-0} \\ 3.8072 \times 10^{-4} \\ 6.2074 \times 10^{-7} \\ 1.2337 \times 10^{-6} \\ 39711 \times 10^{-7} \end{bmatrix} \Delta t\right), \quad \text{Equation (42)}$$

with $\Delta t = t_k - t_{k-1}$ expressed in seconds, and then may be converted back to the inertial frame to form the process noise for the full estimation state as:

$$Q_{k|k-1} = \begin{bmatrix} A_{12R}^{-1} \cdot Q_{k|k-1}^{RSW} & 0_{6\times 1} \\ 0_{6\times 1} & 0 \end{bmatrix}. \quad \text{Equation (43)}$$

Notice that the zero at the lower-right corner indicates not process noise for the drag coefficient parameter as it is constant during each step of the propagation.

In some embodiments, there are two model parameters that should be designed manually. The first one is the number of basis functions m which affects the regression capability of the GP models but is also limited by the number of available training data. The second one is the order q of the polynomial of $\Delta t$ in Eq. (19) which may take into account that the orbit prediction uncertainty that may increase as time goes by.

In some embodiments, the parameters are chosen as m=20 and q=5, which generates both a good performance and an acceptable coverage.

Additionally, in some embodiments, only the $3\sigma_{ML}$-boundary is considered, corresponding to a confidence level of 99.7%, i.e., only $Q_{ML,3}(e_\xi)$ is analyzed in the following, however, in other embodiments, the 1, 2, $3\sigma_{ML}$-boundary among others are considered. The coverage metric $Q_{ML,3}(e_\xi)$ for the six components are 99.8%, 98.5%, 100%, 98.8%, 99.9%, 98.7% respectively, so the ML-predicted error boundaries can cover the true errors, which means the ML-modification will be reliable.

In some embodiments, these two metrics are introduced to evaluate the performance of the ML approach on approximating the orbit prediction errors, rather than the fusion performance. Indeed, the residual orbital state error $\hat{e}_{res}$ can be equivalently defined as the difference between the ML-modified orbital state $\hat{x}_{ML}$ and the true state $x_T$, which is:

$$\hat{e}_{res}(t_j; t_i) = x_T(t_j) - \hat{x}_{ML}(t_j; t_i). \quad \text{Equation (44)}$$

However, this definition may imply an implicit assumption that the ML-modified orbit prediction state is given by:

$$\hat{x}_{ML}(t_j; t_i) = \hat{x}(t_j; t_i) + A \cdot \hat{e}_{ML}(t_j; t_i), \quad \text{Equation (44)}$$

which is different from the fusion result in Eq. (30). Considering that the metric $P_{ML}$ and $Q_3$ are defined using $\hat{e}_{res}$, they are only valid to quantify solely the performance of the trained GP models, but not necessarily valid for the following fusion results. However, in some embodiments, the assumption in Eq. (39) may provide for less efficient fusion. Thus, in some embodiments, the fusion may be formulated to evaluate fusion results rather than simply residual error.

In some embodiments, to facilitate evaluation to fusion performance of the ML models 121, the model engine 130 may utilize ML-covariance used for fusion can be amplified to $a_{ML}$ times of $\sigma_{ML}$ for the fusion process, leading to:

$$\Sigma_{ML,j} = \text{diag}(\kappa_{ML} \cdot \{\sigma_{ML,\xi,j}\}). \quad \text{Equation (45)}$$

In some embodiments, the model engine 130 may utilize $\kappa_{ML} = 3$ as it corresponds to $Q_{ML,3} \approx 100\%$, which may facilitate a conservative design.

The mean and covariance output of trained GP models are used to modify the EKF orbital predictions according to the fusion equation Eq. (30). Due to the nature of the fusion equation, the resulting fused covariance tends to be more confident than both the covariance sources. The coverage metrics $Q_{ML,3}(e_\xi)$ are all close to 100% as discussed in the last subsection, but it is observed that the $1\sigma_{ML}$-boundary coverage metrics $Q_{ML,1}(e_\xi)$ are only 46.1%, 62.3%, 38.4%, 59.8%, 41.7%, 61.5% respectively, meaning that many true values are not included in the boundaries. Therefore, it is feasible but too risky to fuse the GP covariance directly using Eq. (25).

As explained in the above, in order to show the fusion performance with the uncertainty boundary, a single trajectory is displayed consisting of the predictions. In some embodiments, all the states and covariances are presented in the RSW frame centered at the EKF-predicted state $\hat{x}_{EKF}(t_j;t_i)$, so that they can be compared directly. For example, see FIG. 9 below, where In some embodiments, because most ML regression techniques could suffer from overfitting the training data, more emphasis may be placed on the EKF predictions based on physics, while relatively less emphasis on the ML-modifications based on the data.

The previous all-state fusion example shows that the fusion results can be very good at improving the accuracy of both the state and uncertainty prediction.

In some embodiments, upon testing and validating the trajectory predictions 123, the model engine 130 may conduct monitoring to determine when to re-train the ML models 121 on new data such that accuracy may be maintained without overusing computational resources.

In some embodiments, a "training window" (T-window) is defined for the object state estimate from the trajectory estimator 113 received form the object state database 110. In some embodiments, the T-window may be a time interval between $t_{train} - \delta t_{val.} - \delta t_{train}$ and $t_{train}$, e.g., as shown by the red trapezoid region in FIG. 19 below. This is a time duration during which all the TLE sets are utilized to generate training data for the ML models. Notice that the beginning of the training window is an inclined line but the ending is a vertical line. This is because the propagation of the first TLE set will generate only the data point after that epoch. In some embodiments, during the training, a subset at the end part of the training window will be preserved as the validation data, as shown by the interval $(t_{train} - \delta t_{val.}, t_{train})$, where $\delta t_{val.}$ is the time length of the validation data. In some embodiments, the validation data may be used to trigger the early stop of training, which is a common technique to prevent ML models from overfitting. For simplicity, "training data" refers to both the real training data and the validation data. In some embodiments, due to an abundance of historical data, and also to facilitate avoiding overfitting, the T-window may extend a short time into the past, such as about, e.g., 1 day, 7 days, 14 days, 21 days, a month, or other time-frame.

In some embodiments, a "monitoring window" (M-window) may be defined as the time interval between $t_{current} - \delta t_{mon.}$ and $t_{current}$, where $\delta t_{mon.}$ is the width of the M-window. In some embodiments, the data points, pairs of learning and training variables which fall inside the monitoring window may be used as a testing data of the trained ML models 121 because where the trained ML models have good performance in some testing data, they are likely to sustain that performance on another set of nearby data. In other words, the performance of the trained ML models on the testing data is assumed to be smoothly decreasing as the testing data in the monitoring window is moving away from the training data. Therefore, the model engine 130 upon monitoring the ML models 121 may identify the epoch when the trained ML models become unreliable.

In some embodiments, the M-window may be updated in a smooth way, moving forward every time when a new TLE set is published. For example, when a new state $\hat{x}_{TLE}(t_i)$ is available, the M-window is updated as $(t_i - \delta t_{mon.}, t_i)$. In some embodiments, updating the T-window is designed in a more complicated leap-frog way. Depending on the historical performance of the currently trained ML models in the M-window, several criteria may be tested as described below, to determine when the performance is not reliable anymore. For example, once the trained ML models is determined to require re-training after a new state is available at $t_i$, the T-window is updated as $(t_i - \delta t_{val.} - \delta t_{train}, t_i)$, where $\delta t_{train}$ is the time length of the training data.

In some embodiments, the T-window and the M-window may overlap at a specific time duration. However, the actual training data may not be included in the testing data as long as $\delta t_{val.} > \delta t_{mon.}$ is used. For example, when the current epoch is $t_i$ and the T-window is just updated, the actual training data falls inside $(t_i - \delta t_{val.} - \delta t_{train}, t_i - \delta t_{val.})$ and the testing data falls inside $(t_i - \delta t_{mon.}, t_i)$, so they will not overlap with each other. Such a design may make additional use of the validation data right after the ML models are trained. Then, gradually as the M-window moves forward, the validation data will be replaced by the new testing data that has completely no relationship to the testing data.

As described above, the ML model 121 performance may be tested against multiple criteria. In some embodiments, since six ML models are trained for three position and three velocity components, the model reliability may be evaluated separately using one or more of the following criteria in any combination.

Criterion 1 (Hard limit on $P_{ML}$). Any component $e_\xi$ with $P_{ML}(e_\xi) > 105\%$ should not be used for enhancement as $P_{ML}$ represents the residual errors after the ML model is applied. In this case, the ML-modification is considered noneffective.

Criterion 2 (Hard limit on $Q_{ML,3}$). Any component with $Q_{ML,3} < 70\%$ should not be used for enhancement. In such a circumstance, it is difficult to distinguish which ML-modification will fall inside the uncertainty boundary. Therefore, a conservative choice is to abandon the trained ML model, assuming all ML-modifications are not reliable.

Criterion 3 (Relative limit on $P_{ML}$). The ML model should be re-trained when $P_{ML}(t_{current})$ has increased more than 50% of $P_{ML}(t_{train})$.

This criterion is a balance between the computational cost of the training and the performance of the trained ML models.

Criterion 4 (Relative limit on $Q_{ML,3}$). The ML model should be re-trained when $Q_{ML,3}(t_{current})$ has fallen below 90%.

The drop of $Q_{ML,3}$ may imply that the relationship captured by the trained ML models 121 is not applicable to the future data. Possible causes include the changes of force environment or the physical condition of the RSO.

In some embodiments, once tested against the criteria, the ML models 121 may be retrained by the model engine 130 using new TLE data and object state estimate from the trajectory estimator 113. Thus, the models 121 may be updated in the MML database 120

Moreover, in some embodiments, the trajectory predictions 123 based on the trained ML models 121 may be provided to users, e.g., via the network 103, to associated user computing device 102. In some embodiments, the trajectory predictions 123 may include a graphic of the predicted trajectory of an object, such as, e.g., an RSO, selected by a user at a respective user computing device 102. However, in some embodiments, the users may also be provided with automated alerts generated by the MML database 120 when a trajectory predictions 123 includes a collision with another object. In such a scenario, a user associated with one or both of the objects may be automatically sent an audible and/or visual alert to be reproduced by a speaker and/or display, respectively, at the user's user computing device 102. The associated user may then determine an evasive maneuver of one or both objects to avoid the collisions. In some embodiments, the user computing device 102 or the MML database 120 may automatically determine the evasive action such that the collision can be quickly and efficiently avoided.

Figure 3:
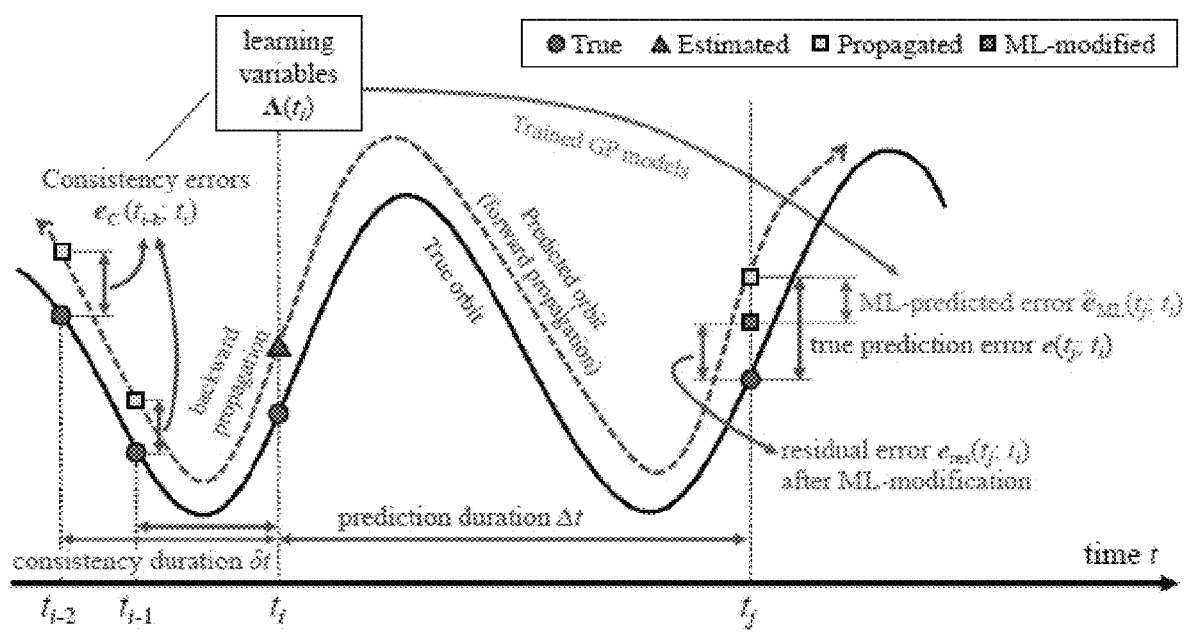

FIG. 3 illustrates an application of an illustrative methodology of orbital prediction error and uncertainty reduction in accordance with one or more embodiments of the present disclosure.

In some embodiments, FIG. 3 depicts a schematic diagram of the ML approach that demonstrates the fundamental concept of the ML approach as well as the data structure. In some embodiments, such a concept includes generating a physical algorithm-based estimate of a trajectory in a near future, and updating the estimate with a machine learning model based prediction of the error. The error may then be compensated for and a corrected trajectory produced.

Figure 4:
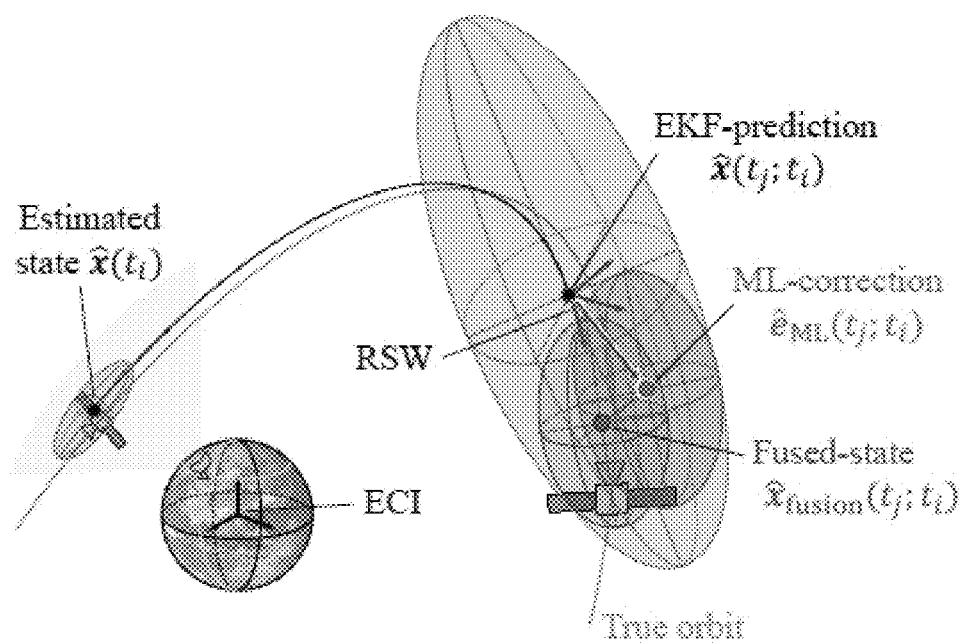

FIG. 4 illustrates an application of an illustrative methodology of orbital prediction error and uncertainty reduction in accordance with one or more embodiments of the present disclosure.

FIG. 4 provides a physical demonstration of the fusion process. As shown in FIG. 4, both the EKF prediction and the ML-correction are accompanied by an uncertainty ellipsoid. The final fused-state is different from both the EKF-prediction and the ML-correction, but can take advantage of both their information and provides a more condensed uncertainty ellipsoid.

Figure 5:
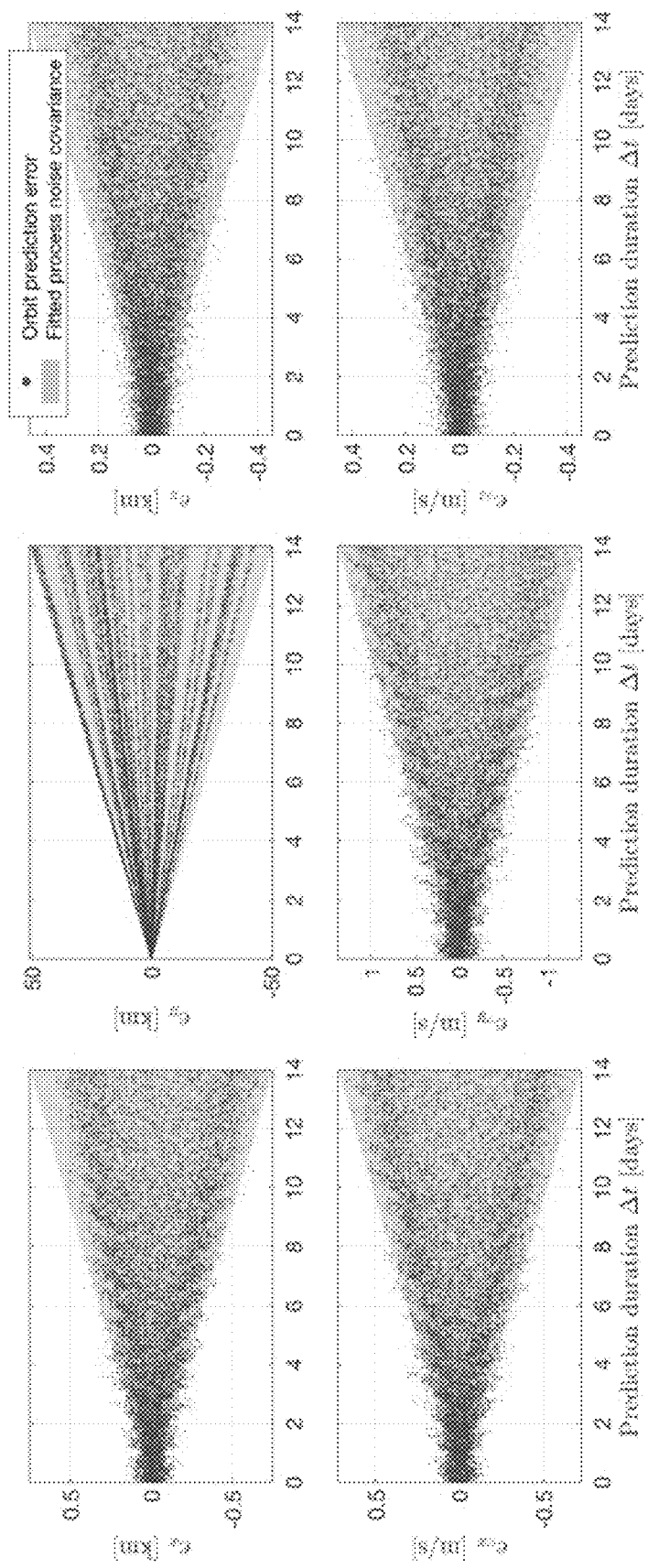

FIG. 5 illustrates an application of an illustrative methodology of orbital prediction error and uncertainty reduction in accordance with one or more embodiments of the present disclosure.

FIG. 5 depicts a model propagation error analysis to determine a proper process noise for the following simulation. In some embodiments, the propagation error is decomposed and analyzed in the RSW frame because the along-track error is known to be dominant for LEO objects, as presented in FIG. 5. The covariance of the process noise of the orbital state (see Eq. (4)) is modeled by a diagonal matrix in the RSW frame, where the diagonal elements are linear functions of the prediction duration $\Delta t$, as shown by the red regions in FIG. 5.

Figure 6:
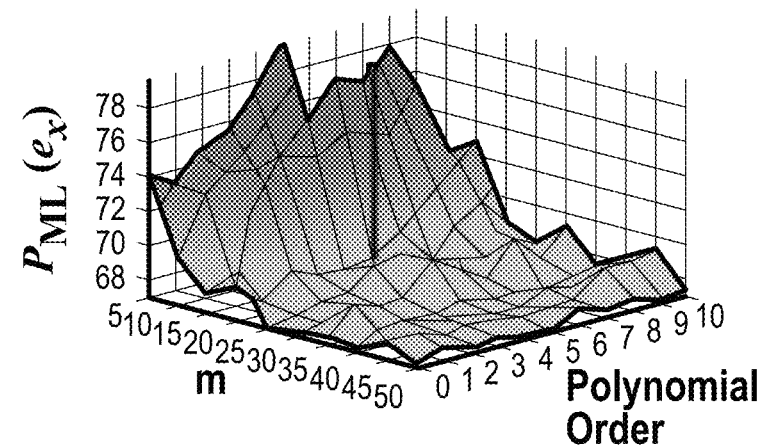
Figure 6:
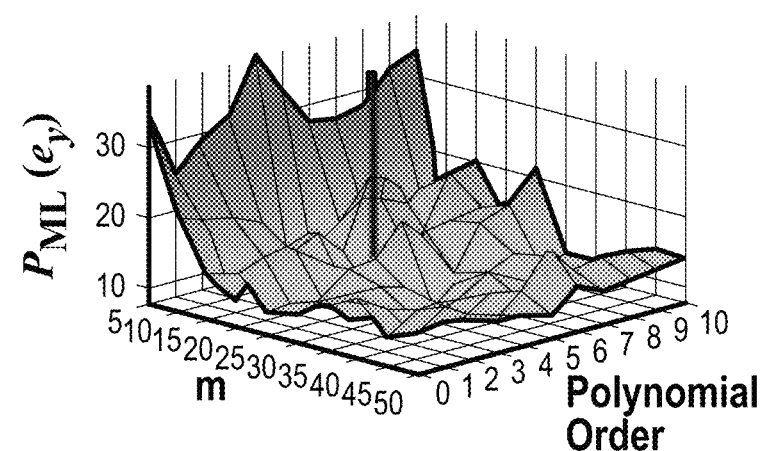
Figure 6:
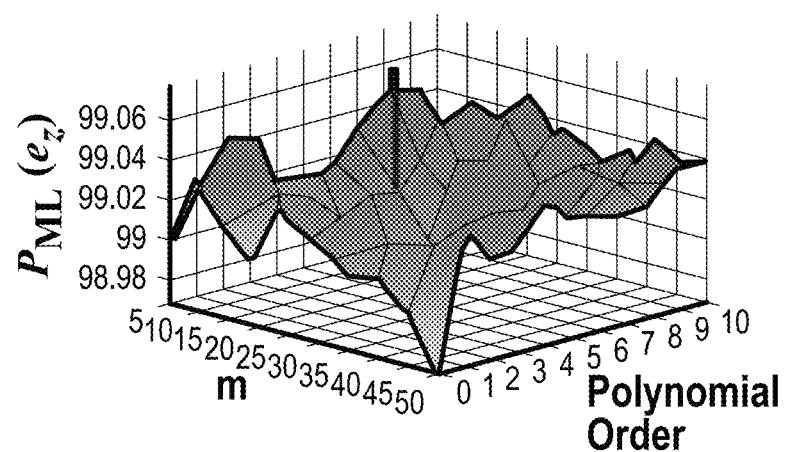
Figure 6:
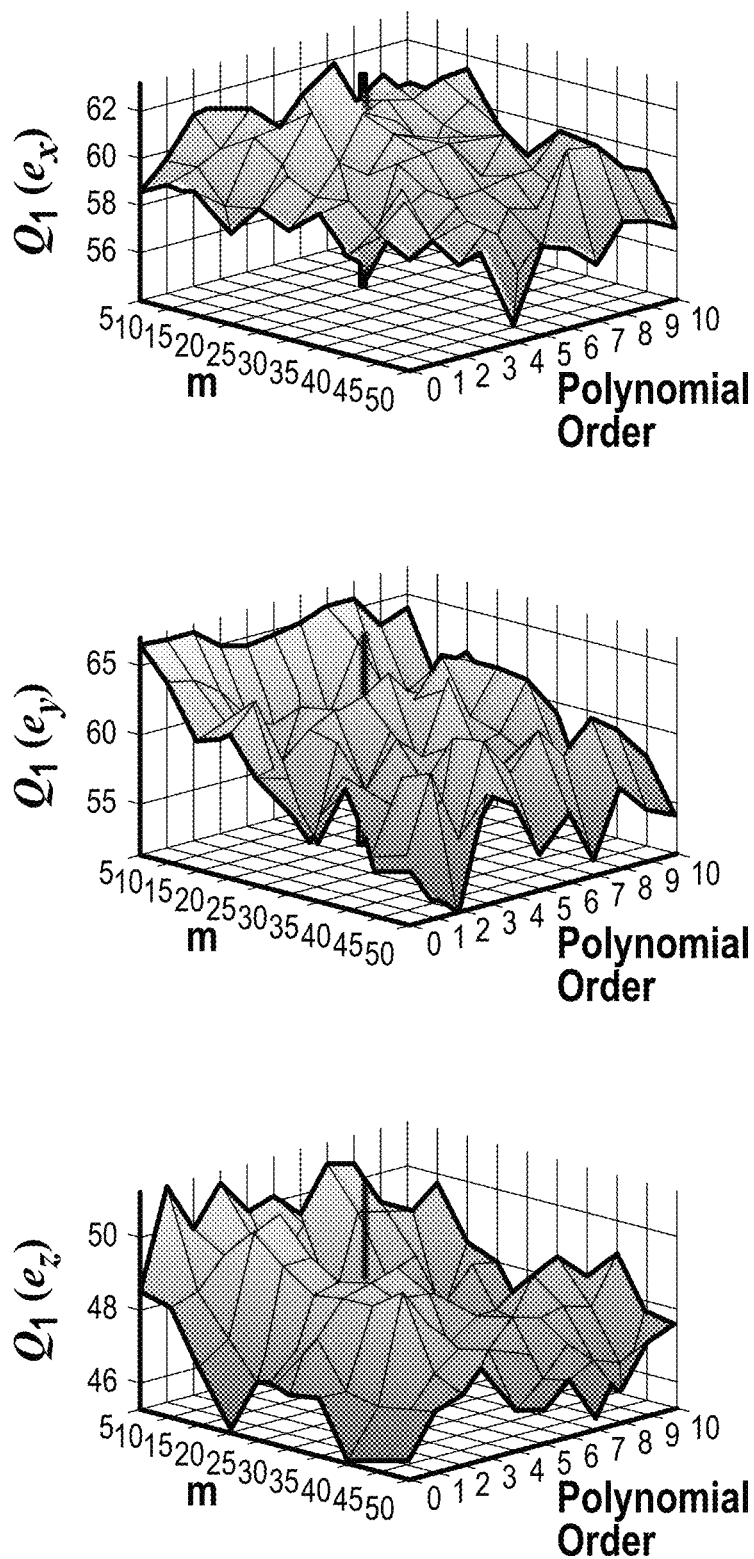
Figure 6:
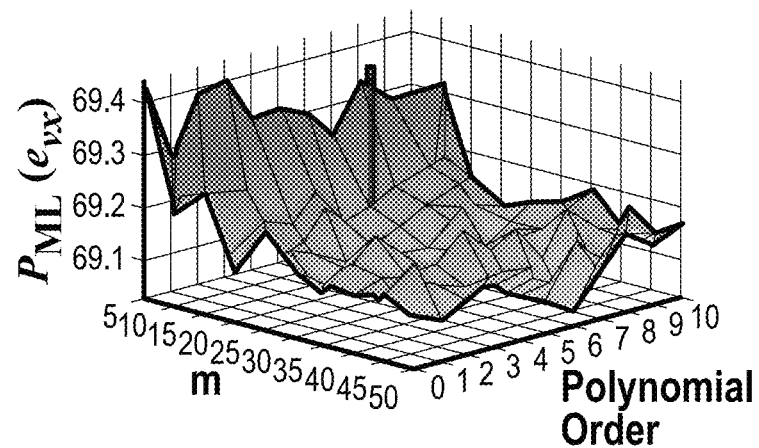
Figure 6:
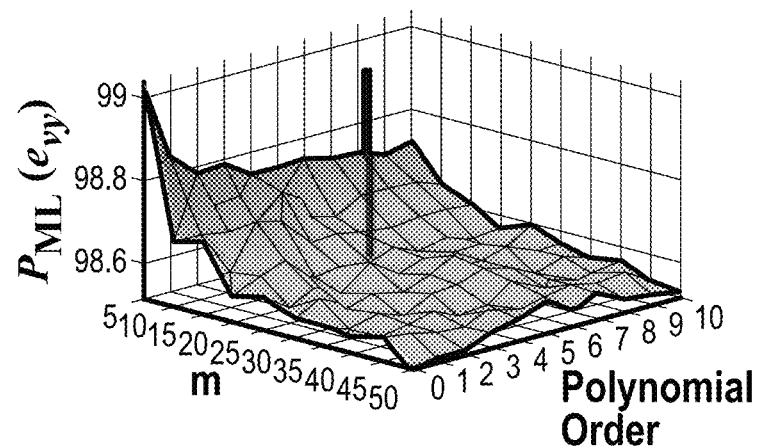
Figure 6:
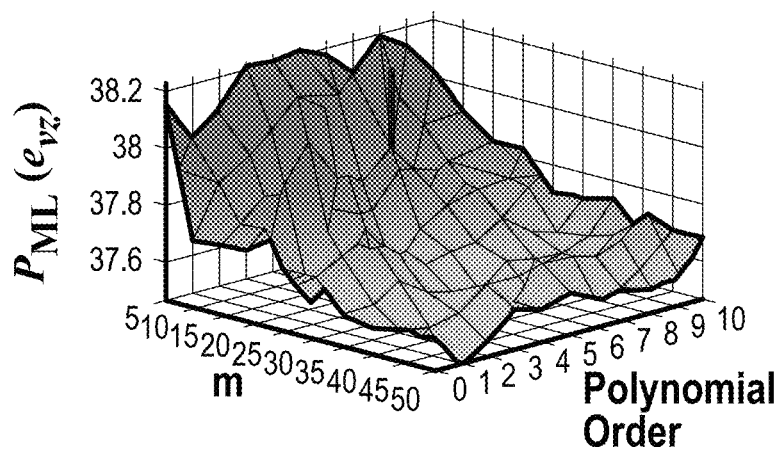
Figure 6:
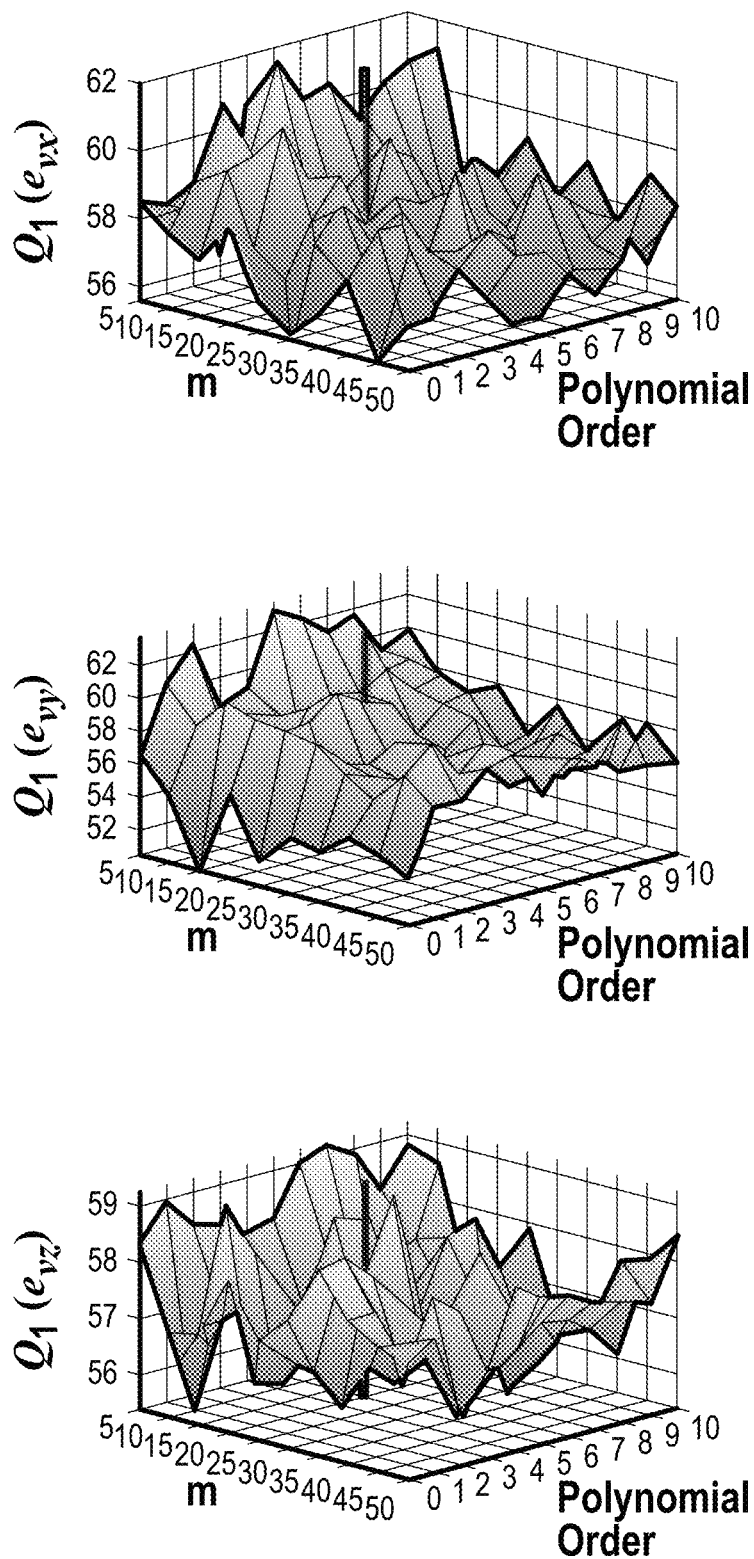

FIG. 6 illustrates an application of an illustrative methodology of orbital prediction error and uncertainty reduction in accordance with one or more embodiments of the present disclosure.

FIG. 6 depicts grid search results for different combinations of (m, q), each grid value is the average of 10 different evaluations of the performance on the same validation data, using different random seeds.

In some embodiments, a grid-searching is carried out to determine a proper set of these two parameters. For each combination of (m; q), the performance metrics $P_{ML}$ and $Q_{ML,1}$ of the trained GP models on the validation data are recorded for the later analysis. The tests are run for 10 times using 10 fixed random seeds {42; 194; 528; 611; 678; 683; 832; 878; 921; 944} (chosen randomly). The mean results for each set of parameters are summarized in FIG. 6. One general trend that can be observed is that $P_{ML}$ decreases as m and q increase, because larger parameters lead to more free variables therefore more flexibility for regression. Meanwhile, the coverage metric $Q_{ML,1}$ appears stable, fluctuating in a small range. However, this will not be always true due to the limited amount of training data. When too much flexibility is introduced, the trained ML model tends to overfit the training data, or in other words, the ML model simply memorizes all the training data. This phenomenon is observed for the along-track error component $e_y$, whose $Q_{ML,1}$ is slightly decreasing as m and q increase, meaning that the trained models are becoming overconfident and more data points are falling outside of the $3\sigma_{ML}$-boundaries.

Figure 7:
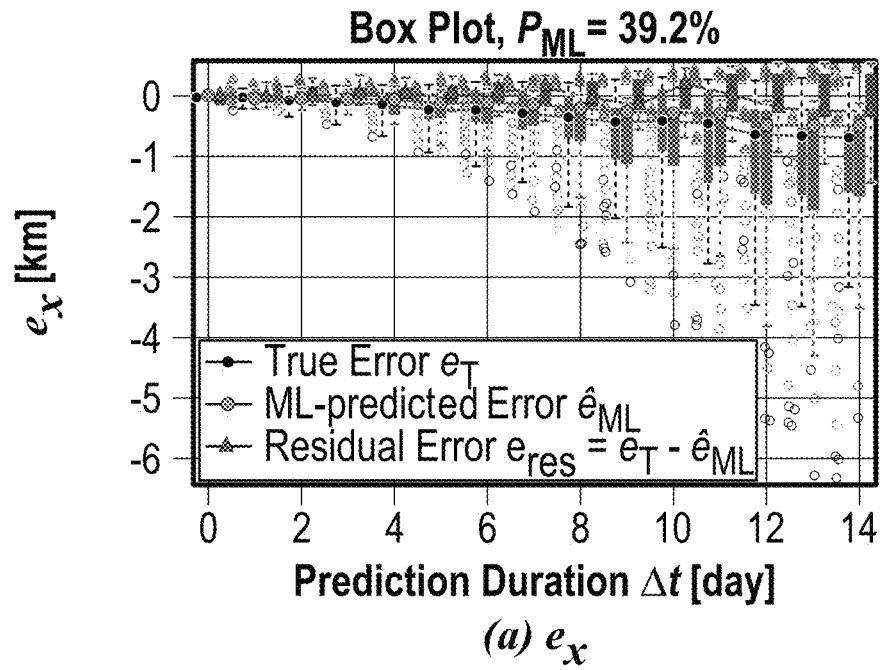
Figure 7:
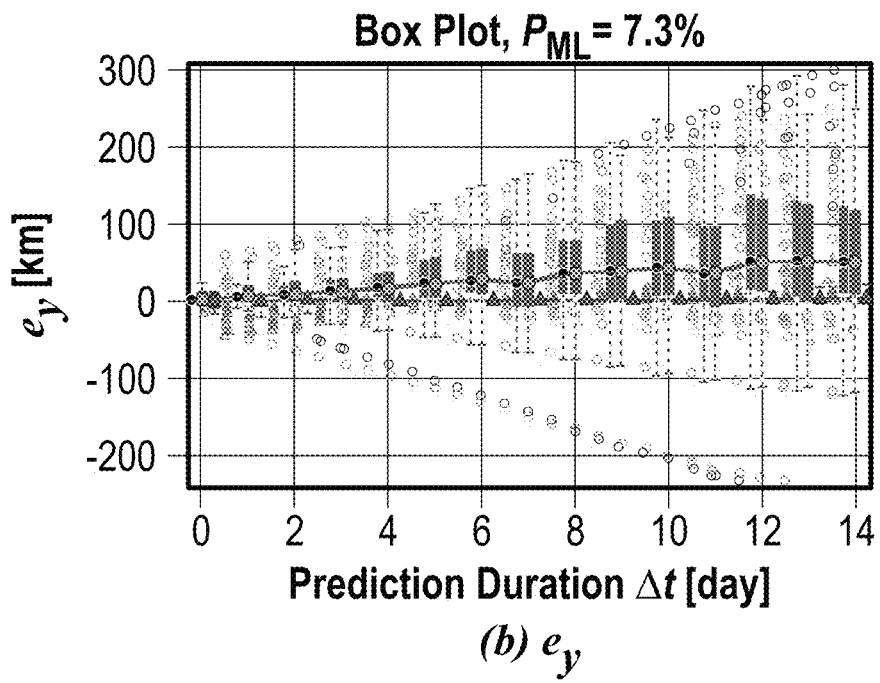
Figure 7:
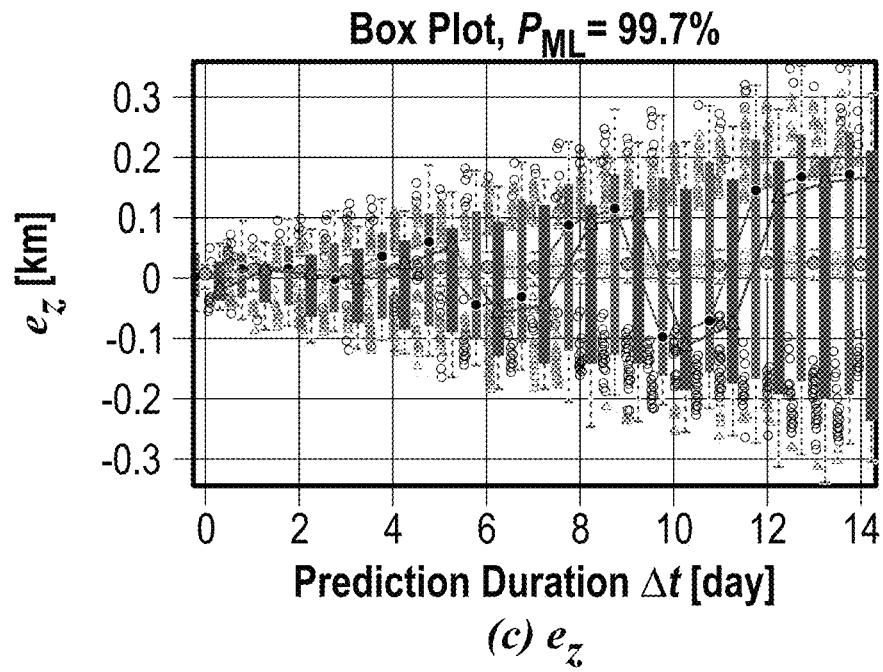
Figure 7:
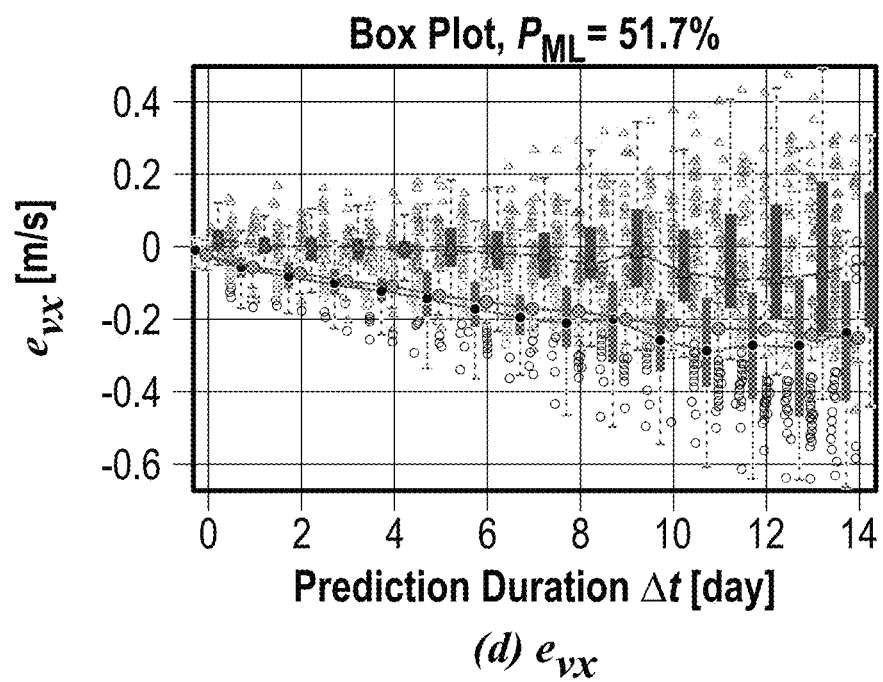
Figure 7:
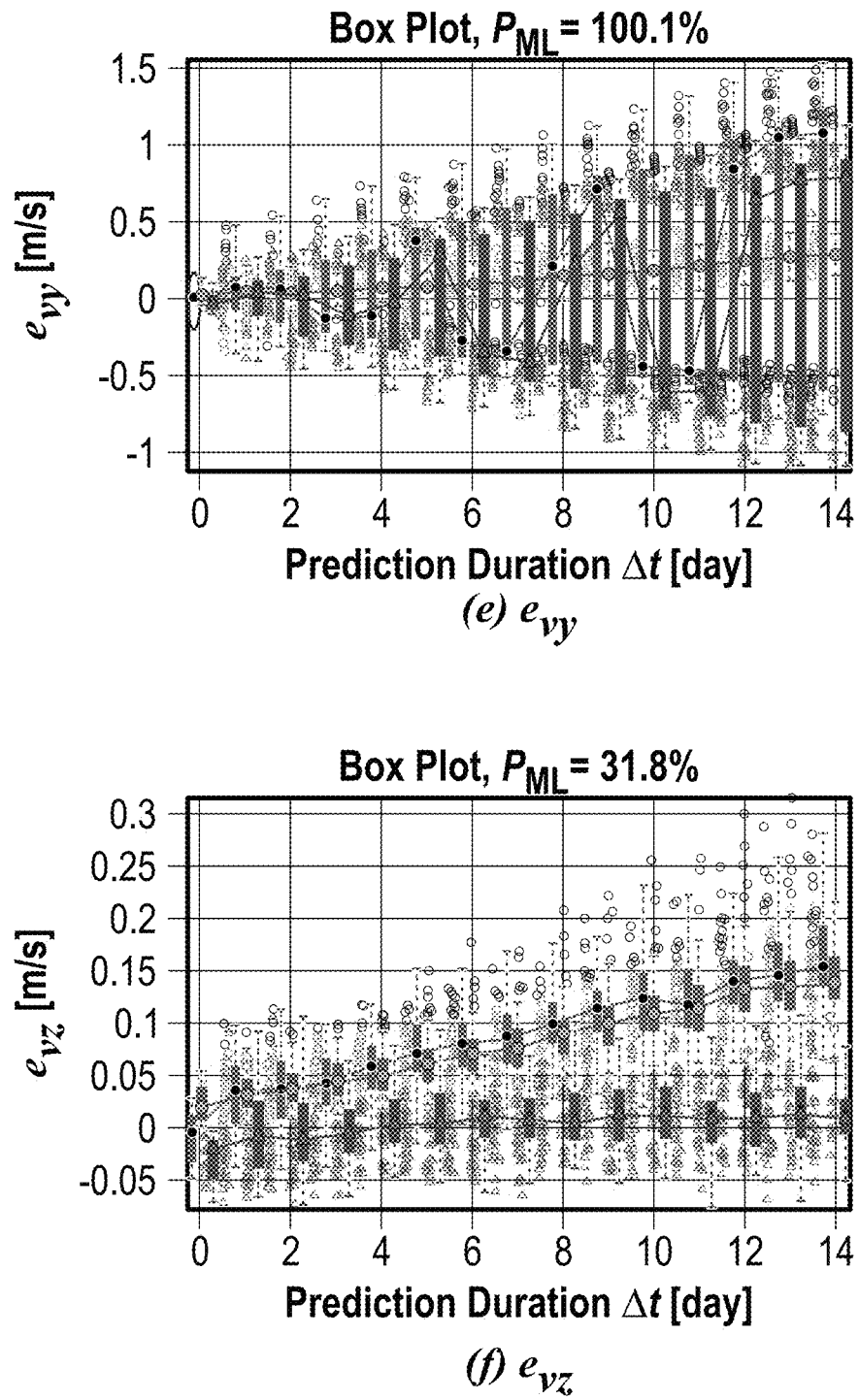

FIG. 7 illustrates an application of an illustrative methodology of orbital prediction error and uncertainty reduction in accordance with one or more embodiments of the present disclosure.

FIG. 7 depicts the performance of the trained GP models on the testing data according to the testing and validating described above.

The performance of the trained GP models on the training data is demonstrated in FIG. 7. At the front of each plot in FIG. 7, the black boxplots represent the true errors; the green boxplots represent the ML-predicted errors; and the red boxplots represent the resulting residual error. At the background, scattering of the data plots are depicted with lighter color. In embodiments where the trained GP models recovery all the orbit prediction errors, one could observe the green boxplots exactly overlap with the black ones, and then the red boxplots are concentrated at zero with a height of zero. In FIG. 7, it can be observed that for $e_x$, $e_y$, $e_{vx}$, $e_{vz}$, the metrics $P_{ML}$ reveals that about 7-50% remains, meaning that a lot of errors have been compensated for. Especially for the along-track error $e_y$, around 92:7% of errors have been eliminated. For the other two components, $e_z$ and $e_{vy}$, the trained GP models are less effective, which can be told from the green boxplots that almost concentrated at zero. Possible reasons are that the learning variables do not contain information related to these two error components. On the other hand, the ML-modification does not introducing more noise, because $P_{ML}$ is very close to 100%. These results are obtained using the random seed 42 and the other cases show the same pattern but with varied values of $P_{ML}$.

FIG. 7 further shows that, for the prediction duration less than three to four days, the residual error seems equal to or even greater than the true error. This phenomenon reveals features of the orbit determination process and the ML approach. In practice, although the assumed model is not identical to the true physics, it could be an effective approximation for quite a long duration. For example here, the ML approach can hardly further improve the short-term orbit predictions using the assumed model, indicating that the assumed model is accurate enough in this short period. While, Orbit Predictions and Covariances Reduced in Fusion Results after that period, the defect of the assumed model starts to emerge in the error pattern and the ML approach could capture that. This observation reminds us that the ML-modifications should be combined with the conventional prediction results.

Figure 8:
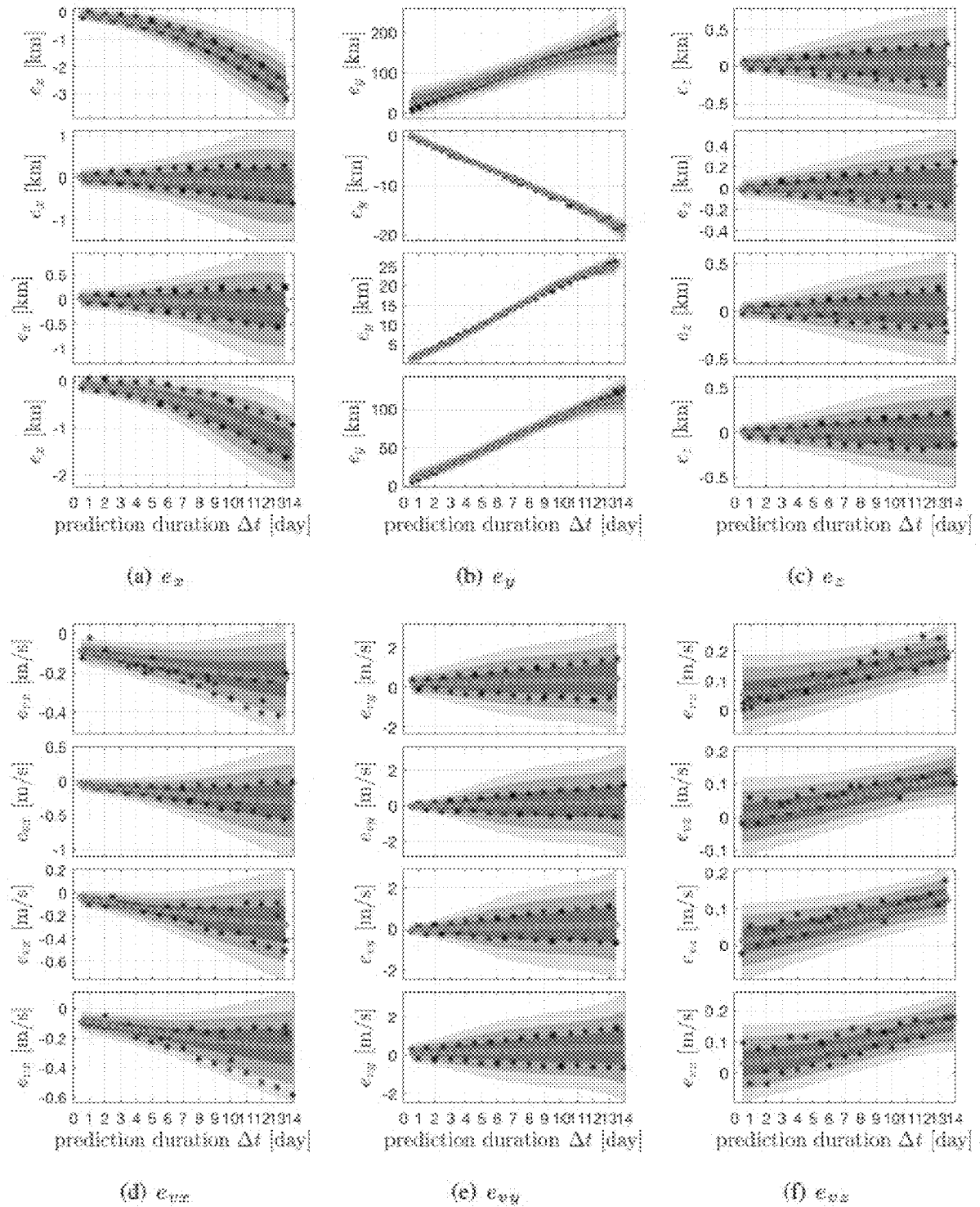

FIG. 8 illustrates an application of an illustrative methodology of orbital prediction error and uncertainty reduction in accordance with one or more embodiments of the present disclosure.

FIG. 8 depicts examples of the GP uncertainty boundaries for each components. In some embodiments, for each component, four trajectories with randomly selected starting estimates are demonstrated in FIG. 8. Each trajectory contains the prediction results in at most the next 14 days, based on the same estimate. In each panel, the black asterisks represent the true errors, the green dots represent the ML-predicted errors, and the blue regions are the 1, 2, $3\sigma_{ML}$-boundaries centered at the ML-predicted errors.

In some embodiments, the orbit predictions are based on estimates at different epochs t but are gathered to display with respect to the prediction duration $\Delta t$; while in FIG. 8 the orbit predictions in each panel are based on the same estimates in order to observe the variation of the ML-covariance generated by the trained GP models. It is clear that the uncertainty boundary is varying with respect to Δt and covering almost all the true errors. For all but $e_y$, it can be observed that the true errors (black asterisks) are located evenly at both sides of the ML-predicted errors (green dots), partially because the information include in the learning variables cannot capture such quick fluctuations.

In some embodiments, more emphases is placed on the performance on the along-track error $e_y$. The along-track motion is significantly affected by the accuracy of the non-conservative force models, for example the atmosphere density model for LEO objects. Meanwhile, it is also the most difficult task to improve models of these non-conservative force models. However, by assuming that there exists some relationships between the model error and the orbit prediction errors, the proposed ML approach may be shown to compensate a majority of the along-track error reliably. This could be practically appealing as it enables an automatic process to improve orbit prediction accuracy purely based on "experience", the historical data.

Figure 9:
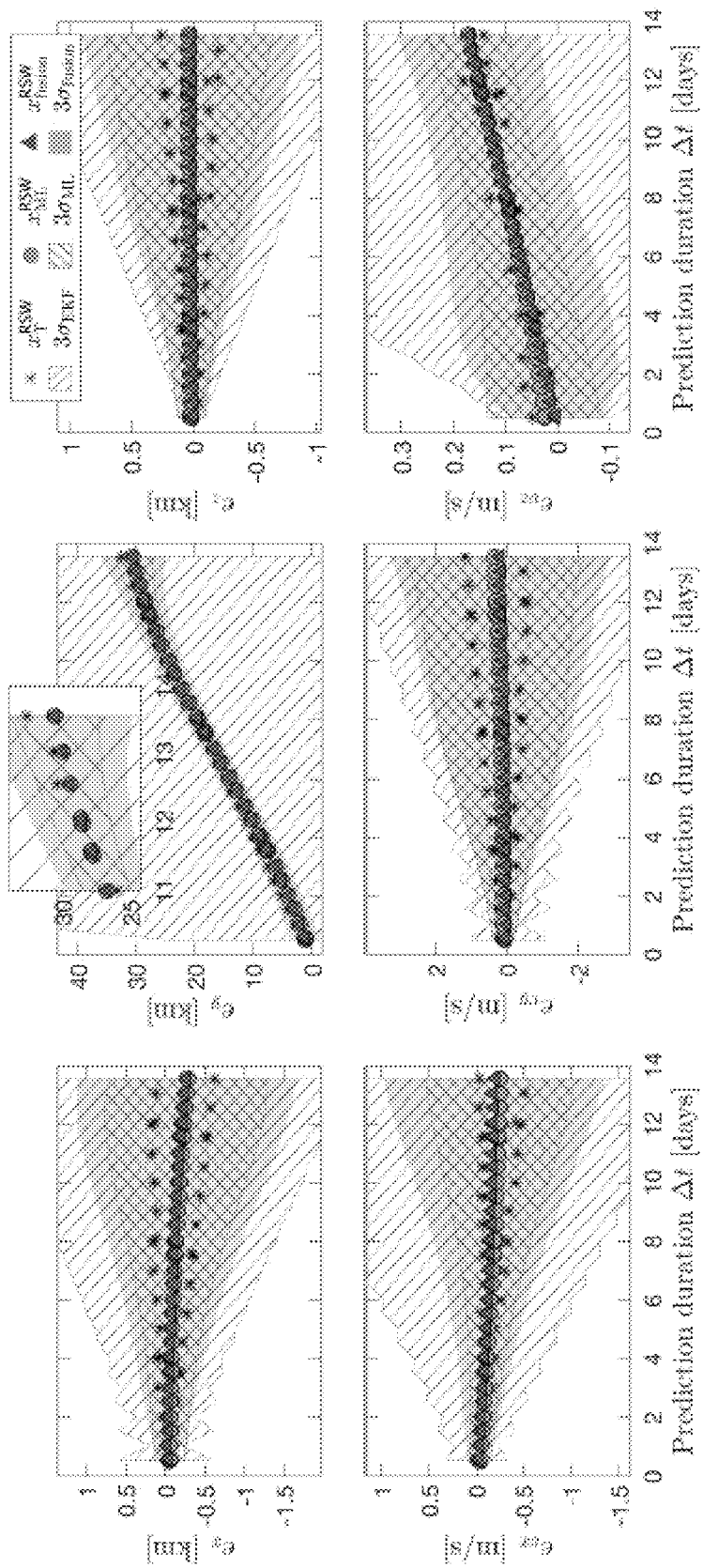

FIG. 9 illustrates an application of an illustrative methodology of orbital prediction error and uncertainty reduction in accordance with one or more embodiments of the present disclosure.

FIG. 9 depicts an example of fusion results for predictions within 14 days, based on a specific estimate. In some embodiments, the EKF-predicted states $\hat{x}_{EKF}(t_j; t_i)$ are at zero (thus not shown); the EKF predicted uncertainty region $3\sigma_{EKF}$ always center at $\hat{x}_{EKF}(t_j; t_i)$ (i.e. zero) and is represented by the gray hatching; the true state $x_T(t_j)$ is represented by asterisk and it has not corresponding uncertainty region; the GP-predicted state $\hat{x}_{ML}(t_j; t_i)$ is represented by the green triangle; the GP-predicted uncertainty region $3\sigma_{ML}$ is represented by the green hatching centered at $\hat{x}_{ML}(t_j; t_i)$; finally, the fused state $\hat{x}_{fusion}(t_j; t_i)$ and its uncertainty region $3\sigma_{fusion}$ are represented by the red circle and ribbon respectively.

In FIG. 9, in some embodiments, the fused states $\hat{x}_{fusion}$ (red dots) and $3\sigma_{fusion}$-boundaries (red ribbons), are assumed to be as close to the true states $x_T$ (black asterisks) as possible while cover all the true states at the same time. FIG. 9 shows that the fused orbit prediction state is close to the true state, and the uncertainty of each component has been reduced especially for $e_y$. A good effect of the conservative design (choose $\sigma_{ML}$ as 3) is that the resulting $3\sigma_{fusion}$-boundaries are smaller than $3\sigma_{EKF}$-boundaries but are larger than $3\sigma$ML-boundaries, as shown in the FIG. 7 that the red locates between the two hatchings.

Figure 10:
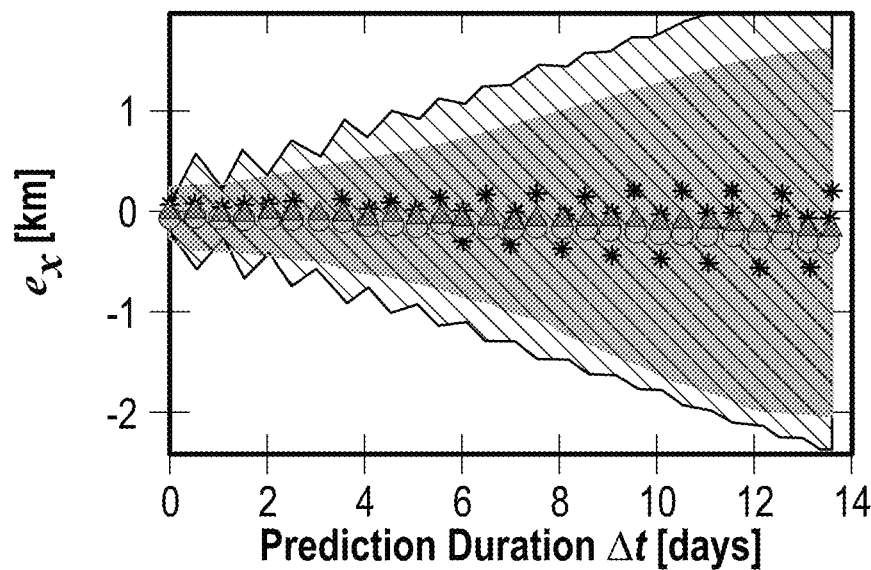
Figure 10:
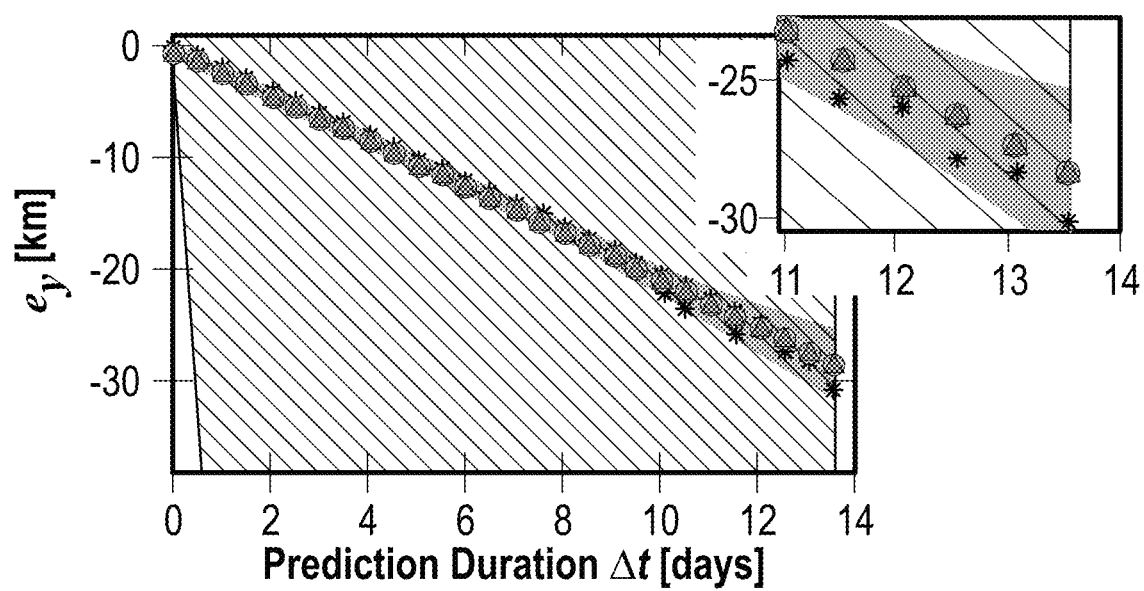
Figure 10:
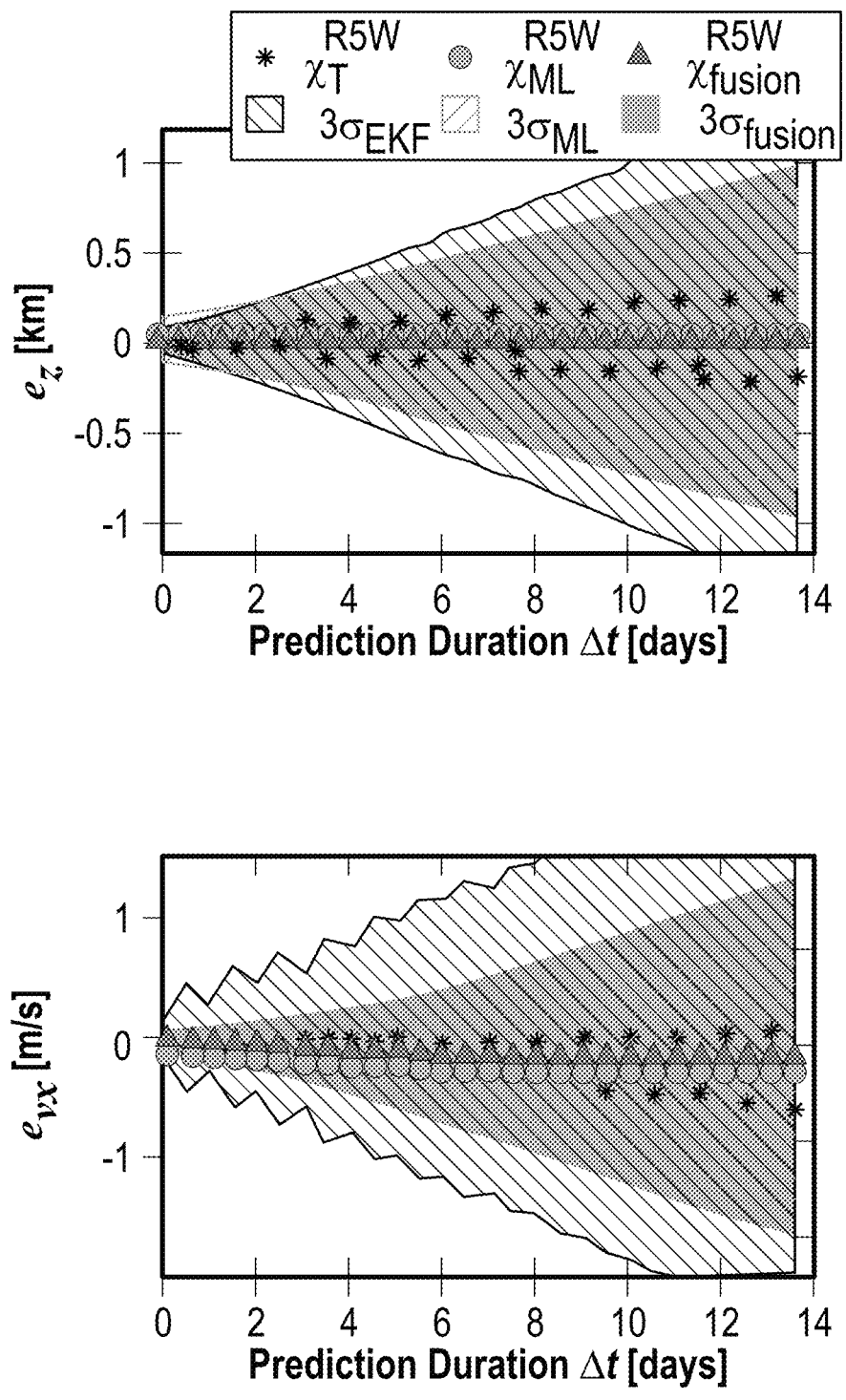
Figure 10:
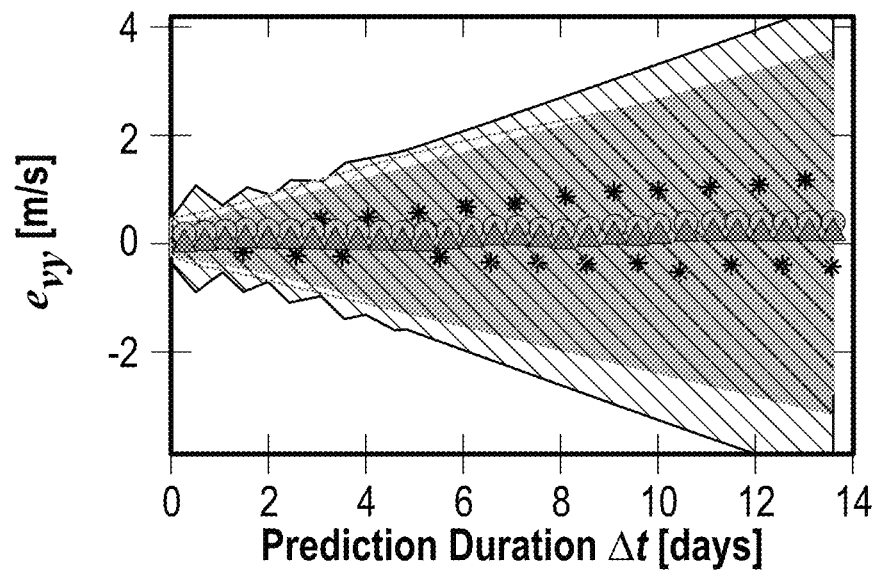
Figure 10:
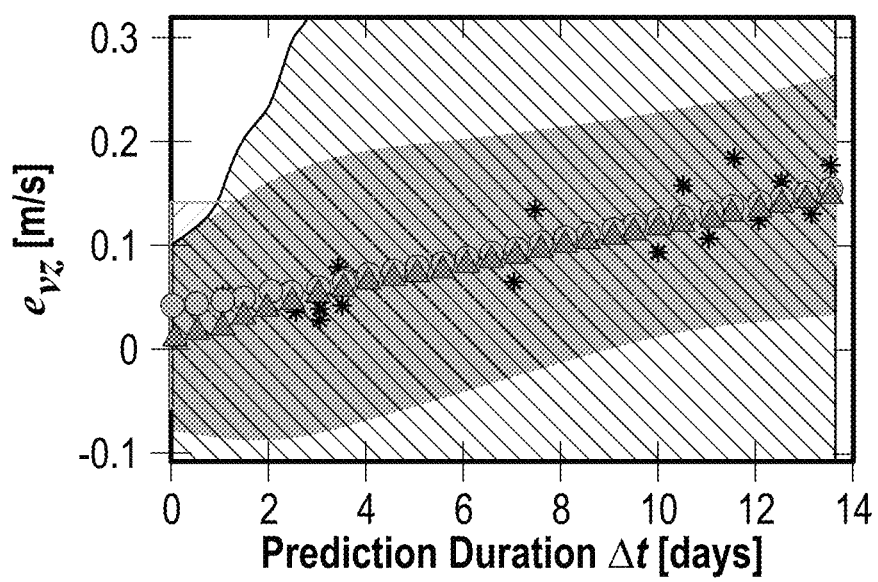
Figure 10:
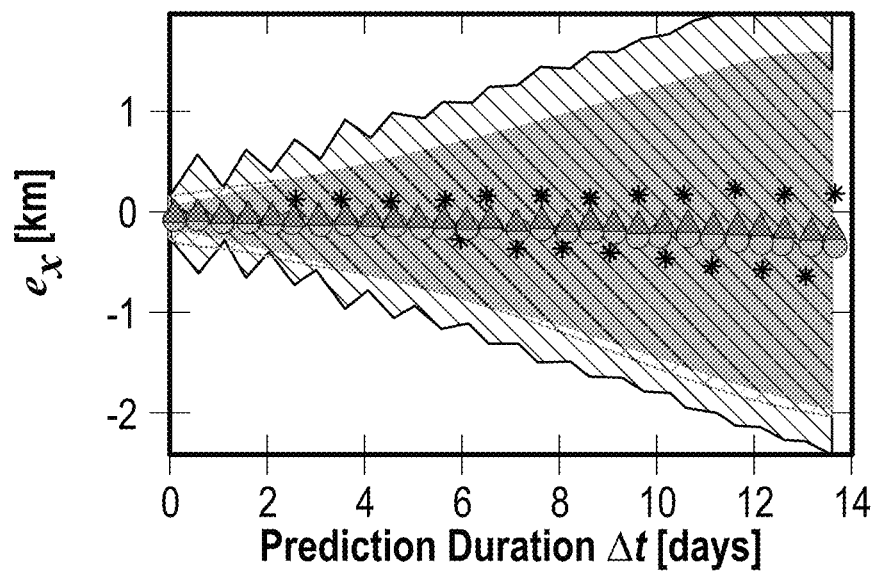
Figure 10:
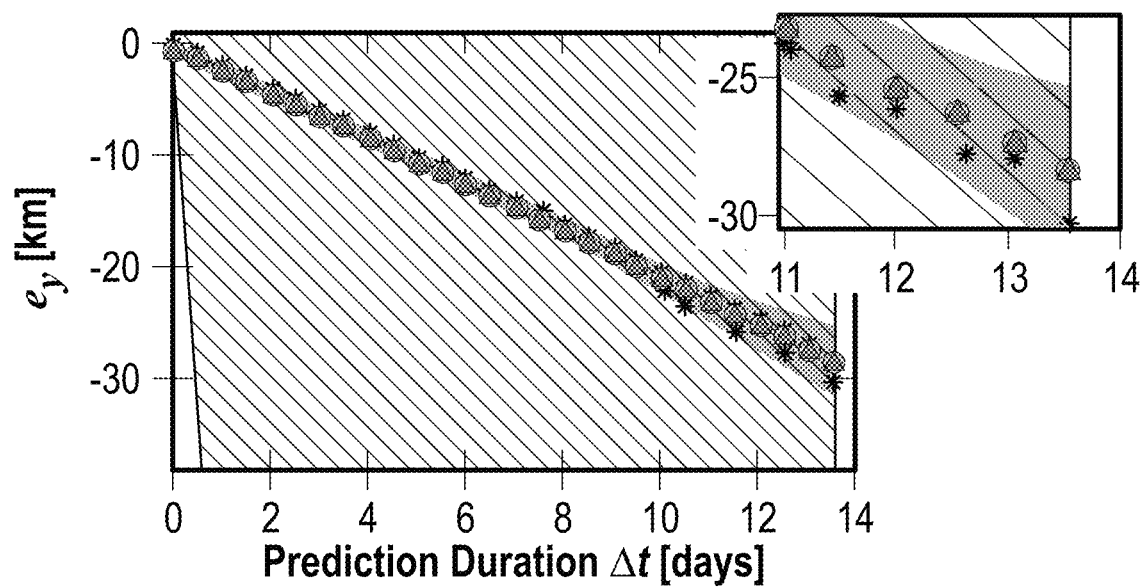
Figure 10:
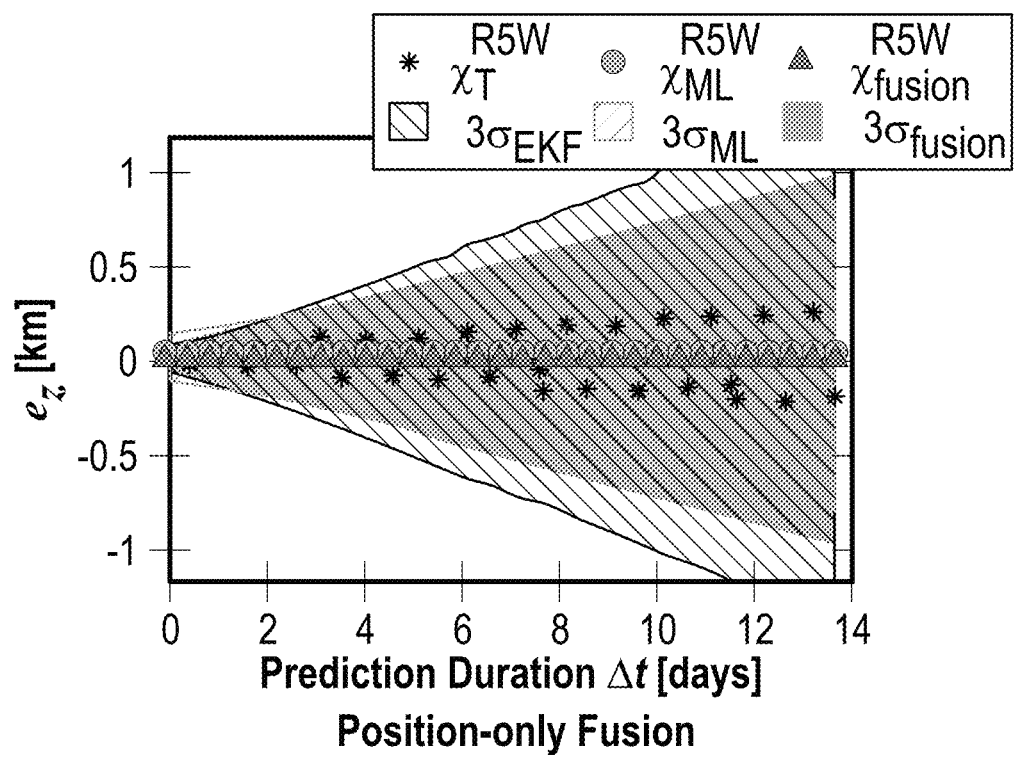
Figure 10:
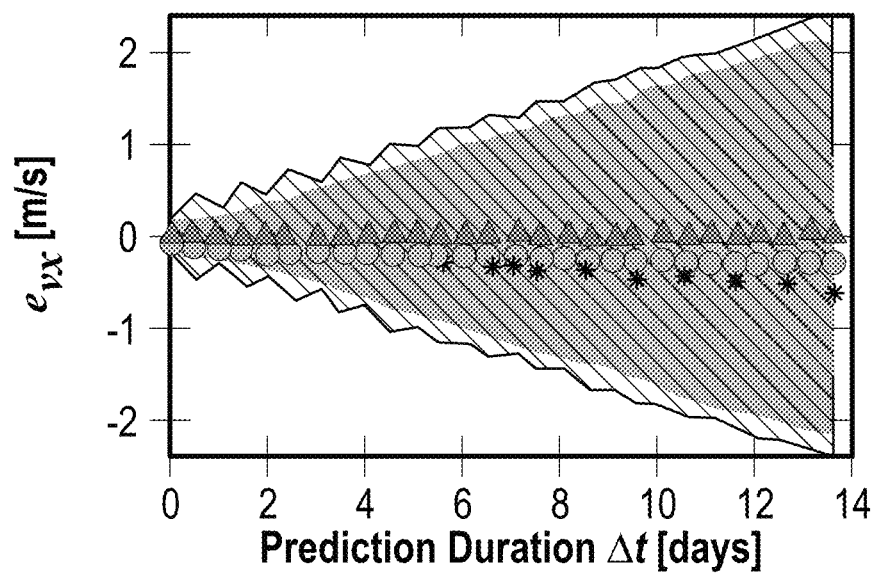
Figure 10:
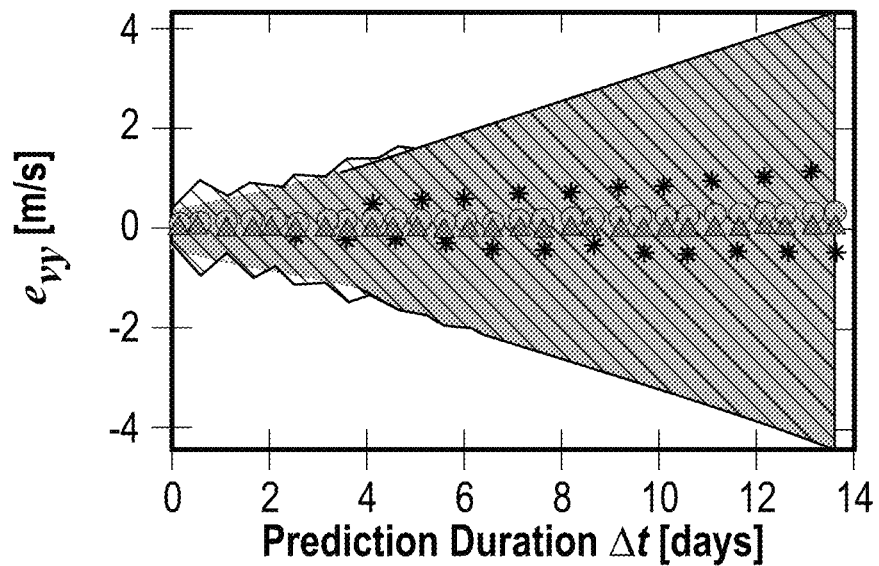
Figure 10:
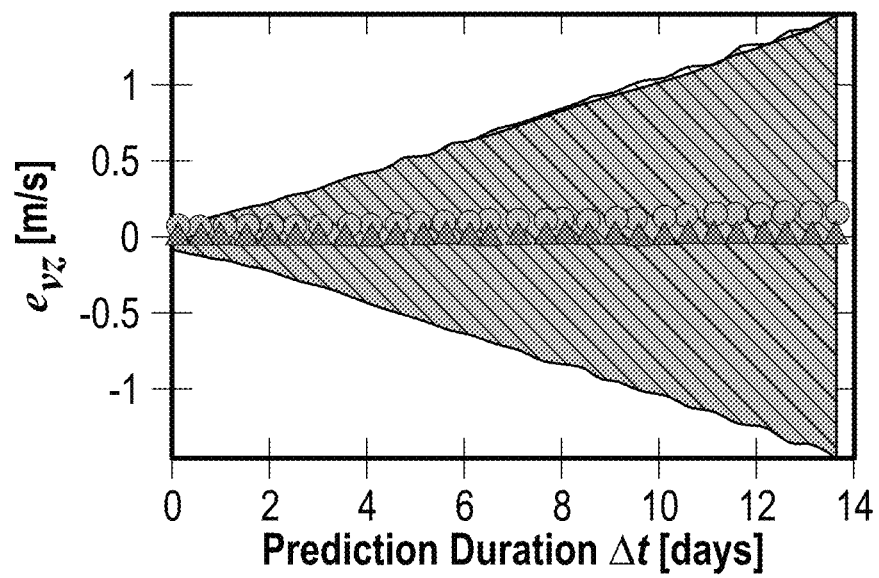

FIG. 10 illustrates an application of an illustrative methodology of orbital prediction error and uncertainty reduction in accordance with one or more embodiments of the present disclosure.

FIG. 10 depicts a comparison of the all-state and Position-only fusion results, using a starting estimate different from that in FIG. 7. FIG. 10 demonstrates a comparison of the two fusion results on the same trajectory. Through comparison, the fusion results for the position components are almost the same in the two cases, indicating that the ML-modification on the velocity components have only little effect on the position components, for both the state and uncertainty. On the other hand, as shown in FIG. 10(b), the state and uncertainty of the velocity components have been obviously varied due to the fusion of the position components but are still inside the $3\sigma_{fusion}$-boundaries.

This phenomenon is also observed for all the other testing data. Therefore, in some embodiments, the position-only fusion could be proceeded for application where velocity components are not explicitly required.

Figure 11:
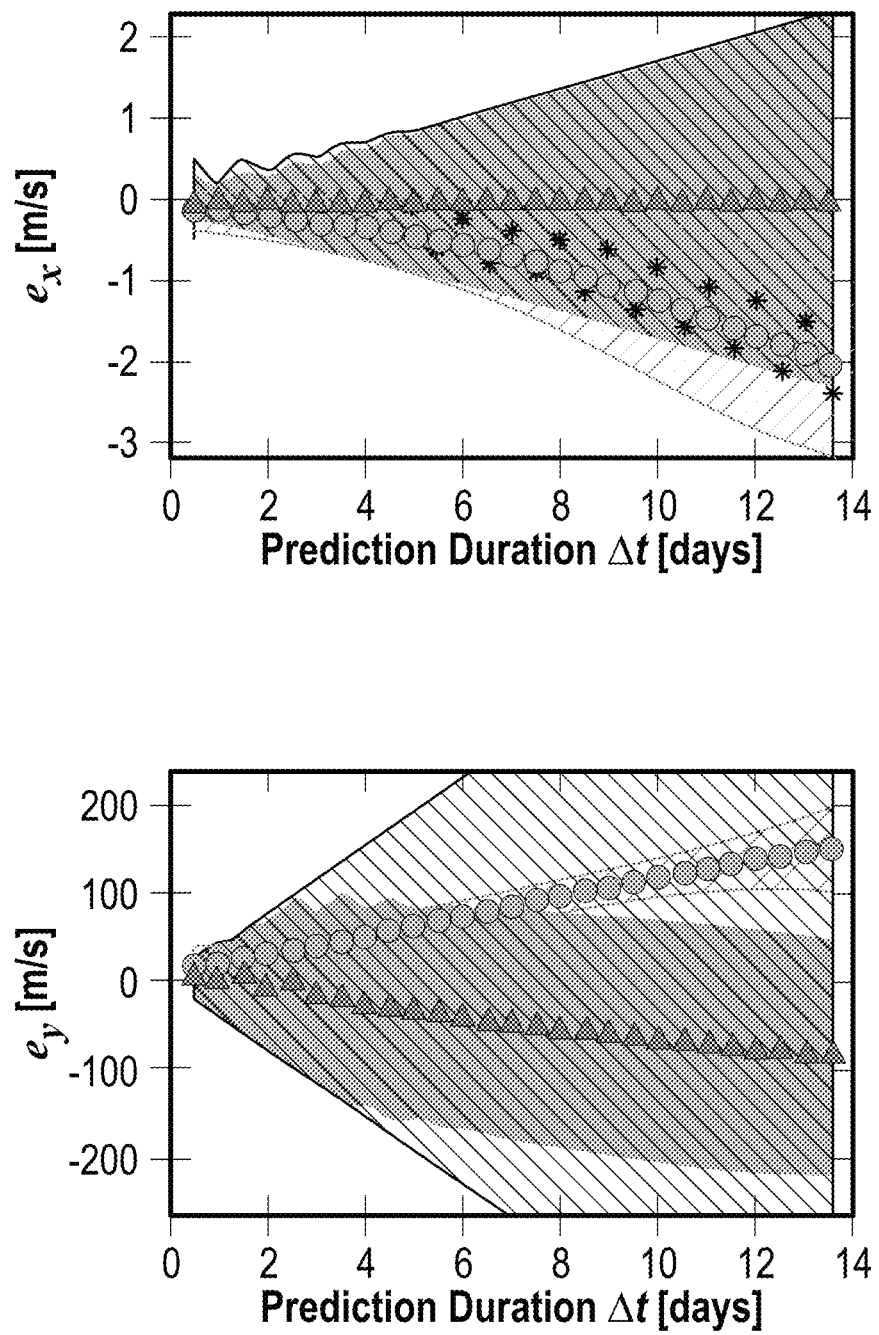
Figure 11:
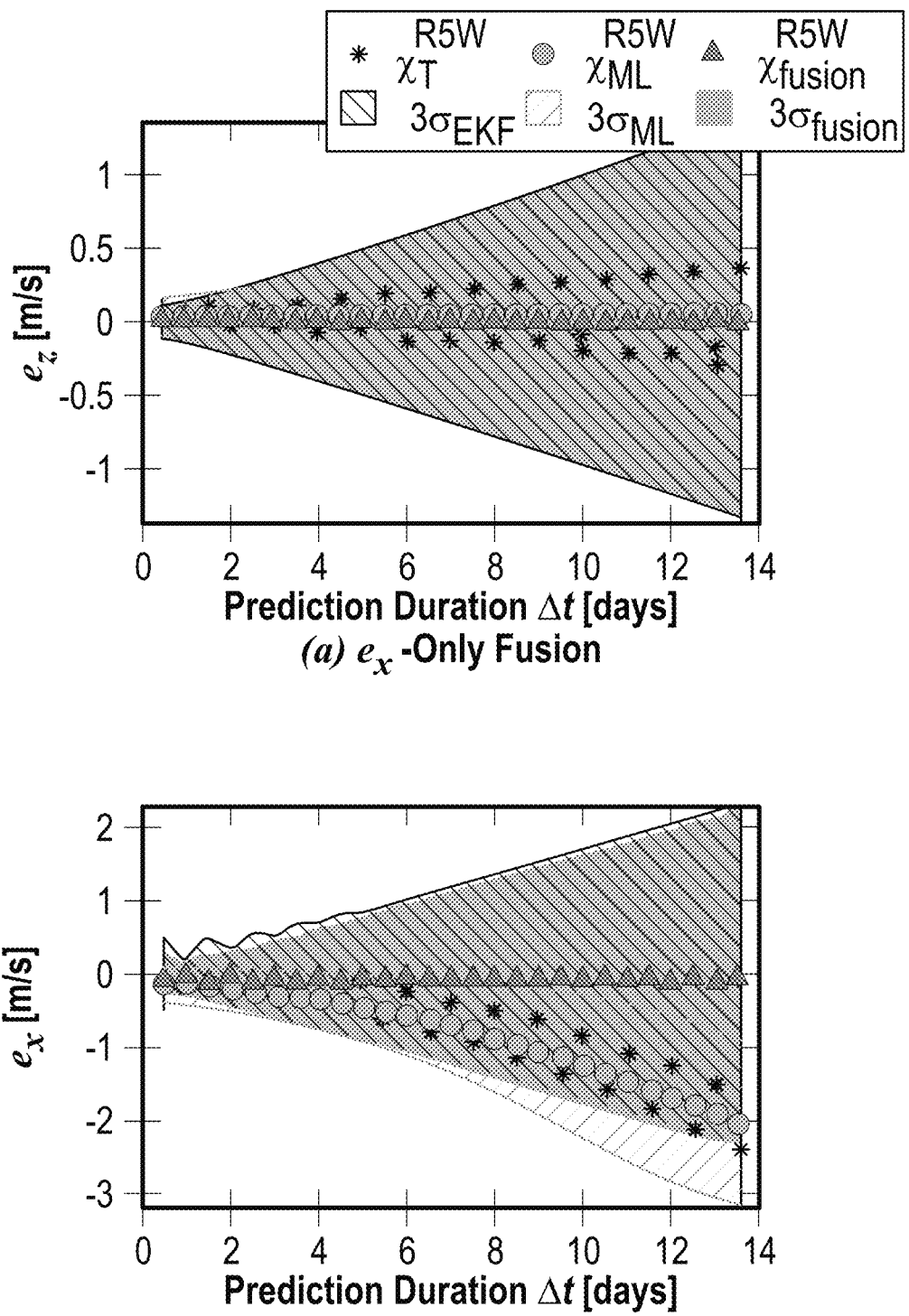
Figure 11:
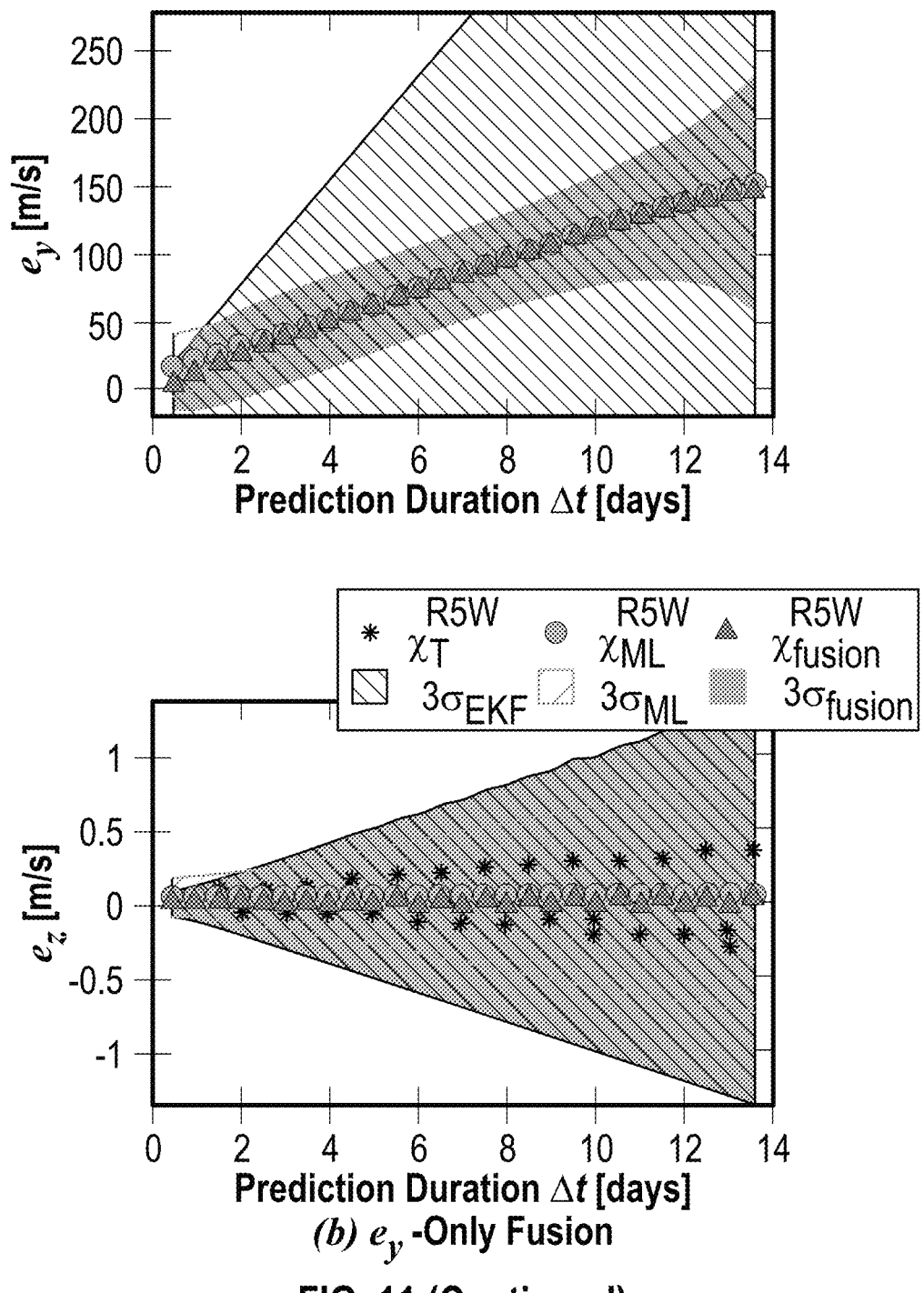
Figure 11:
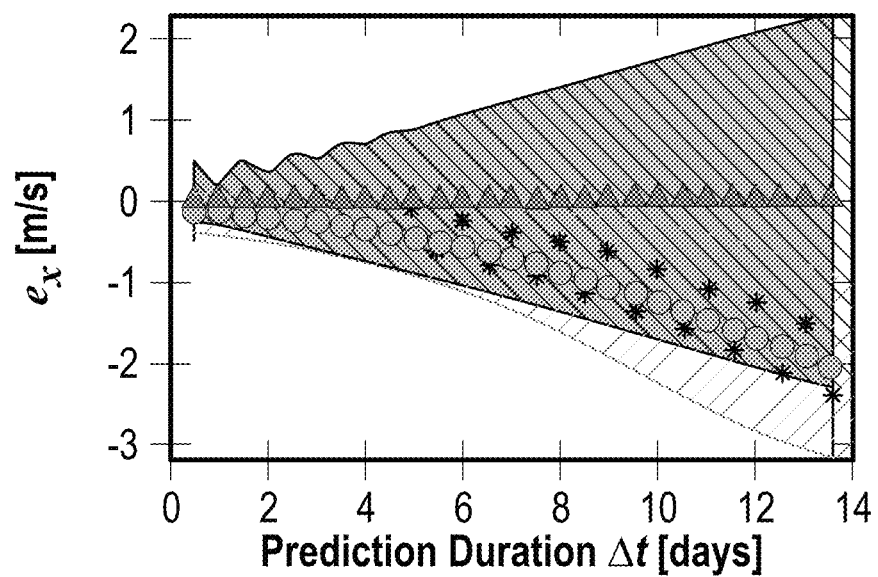
Figure 11:
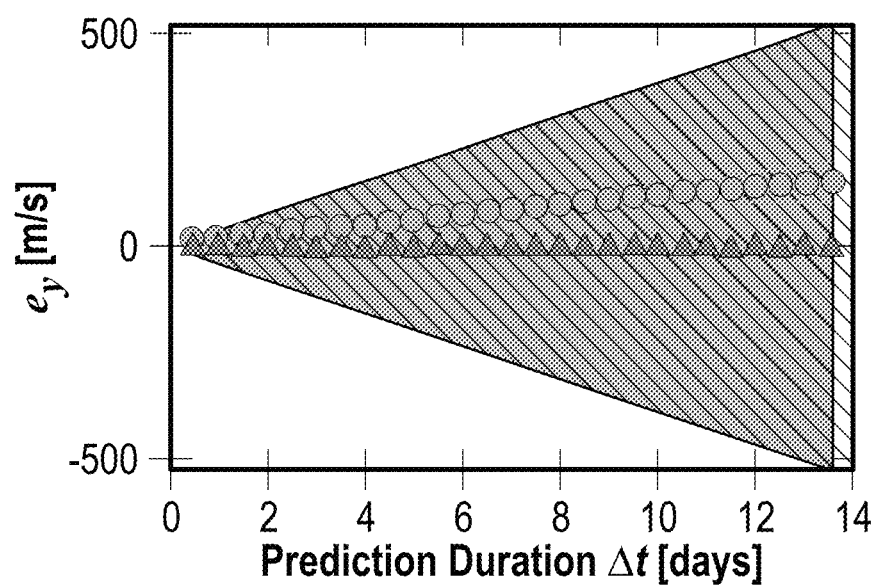
Figure 11:
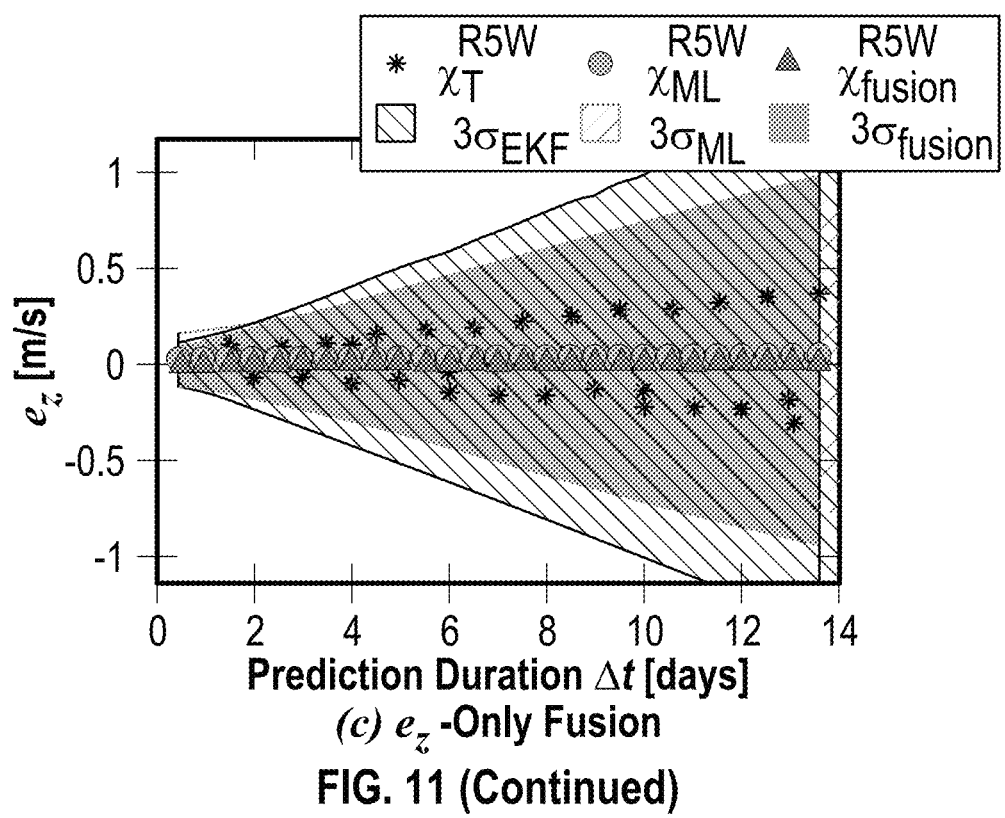

FIG. 11 illustrates an application of an illustrative methodology of orbital prediction error and uncertainty reduction in accordance with one or more embodiments of the present disclosure.

FIG. 11 depicts a comparison of the component-specified fusion results using a same starting estimate, where the testing trajectory is based a starting estimate different from those in previous subsections. A difference of this trajectory from the previous ones is that, here the true states $e_x$ (asterisks) lie close to the edge of the $3\sigma_{EKF,e}$-boundary (black hatching) and they have a larger magnitude. Specifically, the last prediction has exactly fallen outside of the $3\sigma_{EKF,x}$-boundary. A possible cause could be the bad estimate used to calculate the predictions, since, in some embodiments, the EKF estimator, or other estimator, used does not employ any advanced techniques such as a backward smoother.

FIG. 11(a) shows that the reduction of the uncertainty of $e_x$ has significant effect on $e_y$, but strangely only a little effect on itself. However, its effect on $e_y$ leads to bad performance. FIG. 11(b) shows that $e_y$-only fusion generates ideal results on itself meanwhile has little effect on $e_x$ or ez. FIG. 11(c) reveals that the reduction of the uncertainty of $e_z$ has nearly no effect on ex and $e_y$.

Figure 12:
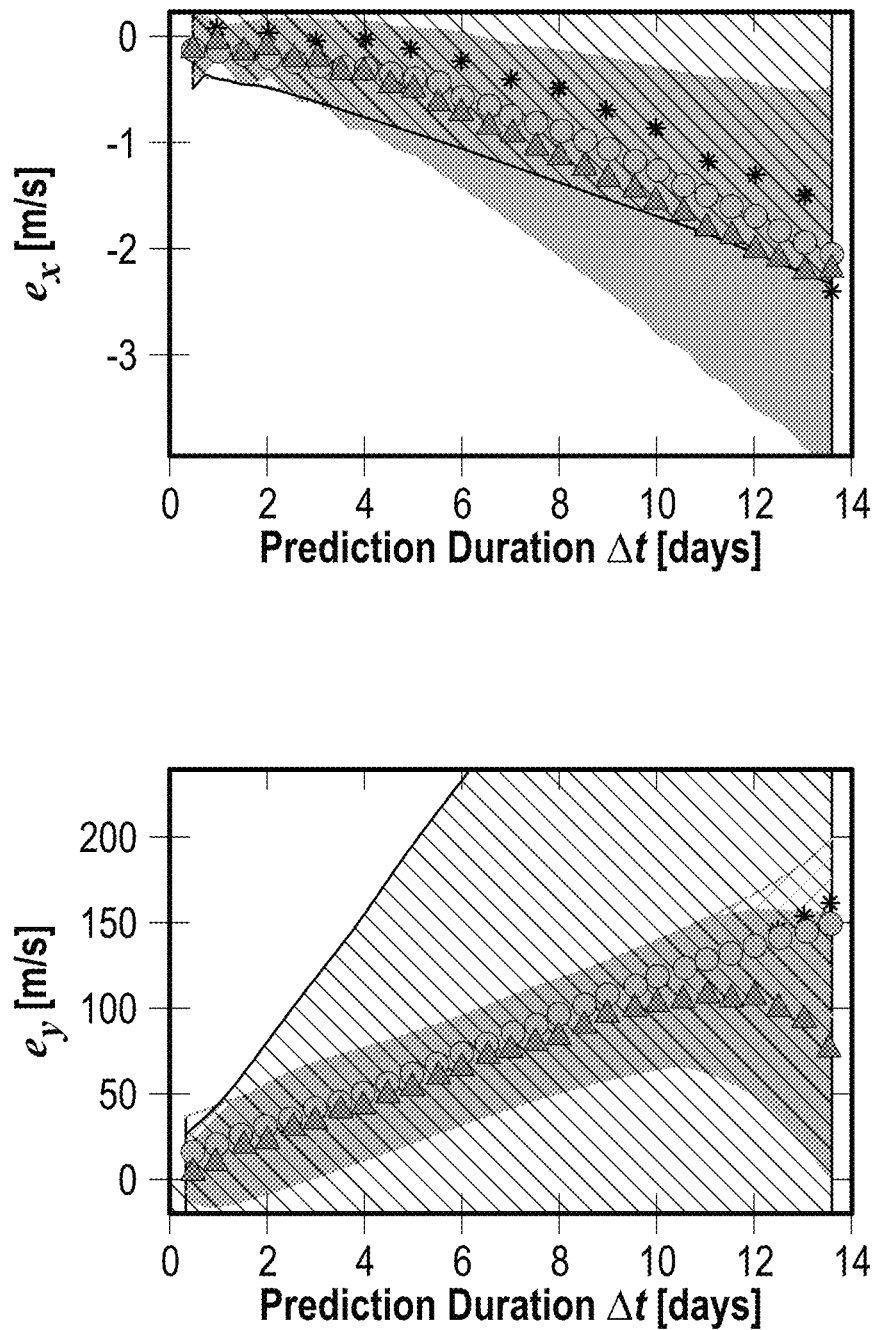
Figure 12:
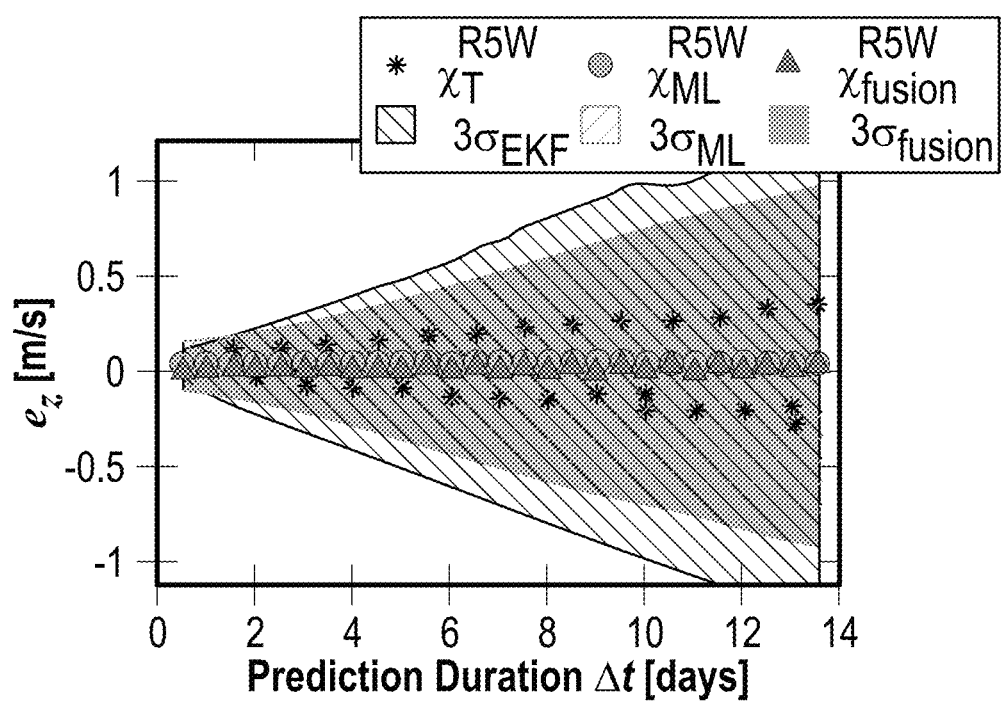

FIG. 12 illustrates an application of an illustrative methodology of orbital prediction error and uncertainty reduction in accordance with one or more embodiments of the present disclosure.

FIG. 12 depicts a position-only fusion results of the same trajectory in FIG. 11, and shows the result of fusing all the position components at the same time. The comparisons between FIG. 12 and FIGS. 11(a) and 11(b) reveals an interesting phenomenon that only if $e_x$ and $e_y$ are fused at the same time, the performance on $e_x$ can be improved significantly, where the $3\sigma_{fusion,x}$ could cover all the true errors. An intuitively physical explanation is that the orbit prediction error in the RSW frame cannot be approximated by the error along in this situation, so they have to been corrected at the same time.

We note that the examples in this subsection in fact corresponds to some inaccuracy or even wrong estimates of the EKF estimator, since the subsequent state and uncertainty predictions can be far from the true state. This phenomenon roots in the simulated system, so it occurs all in the training, validation, and testing data. Therefore, the ML approach could learn this phenomenon and compensate the imperfection of the EKF estimator.

Another worth noting is that the ML approach can both capture the bad EKF-prediction cases in this subsection and the good EKF-prediction cases in the previous subsections. This further proves the benefit of using the ML approach as complimentary to the existing analytical or empirical models.

Figure 13:
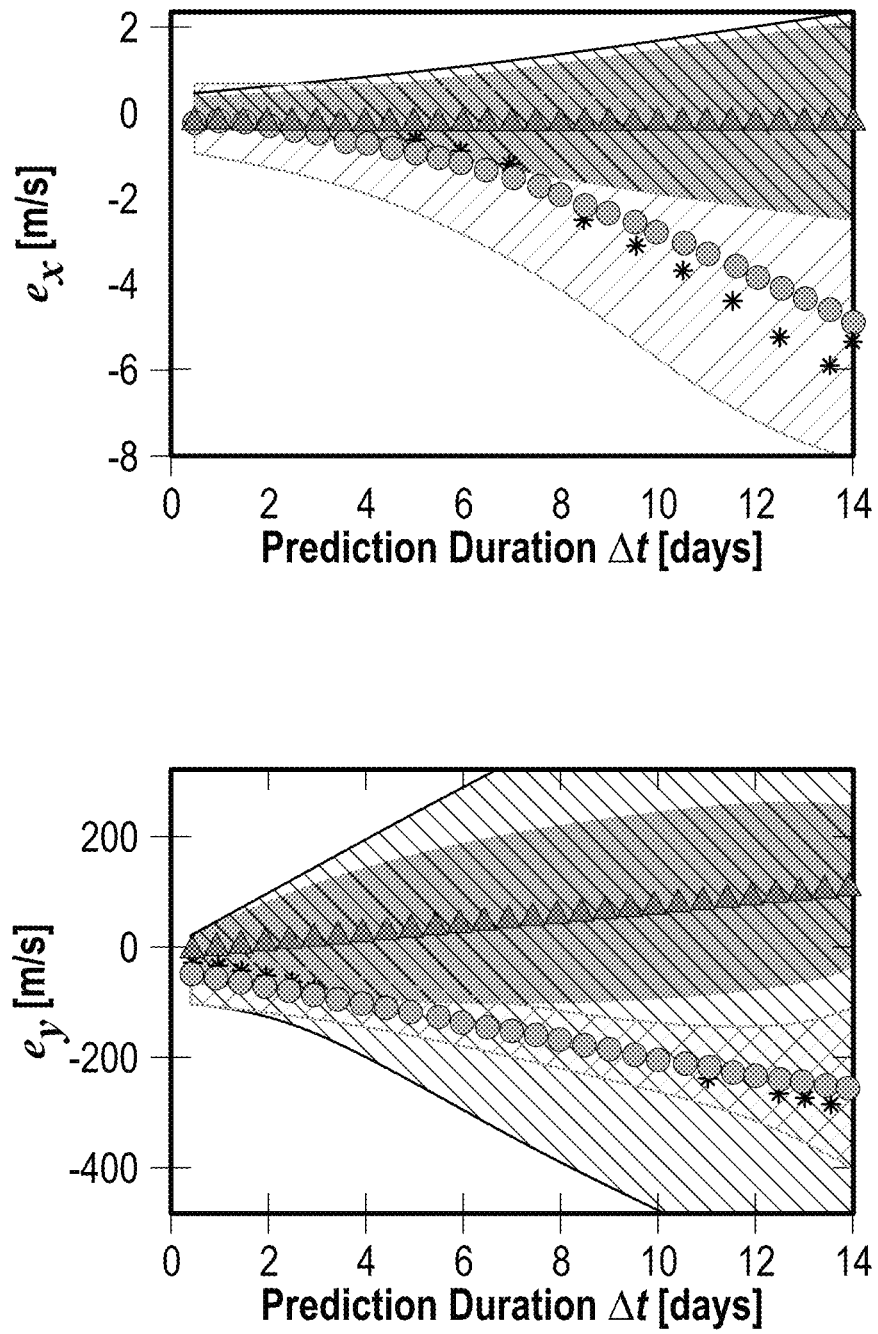
Figure 13:
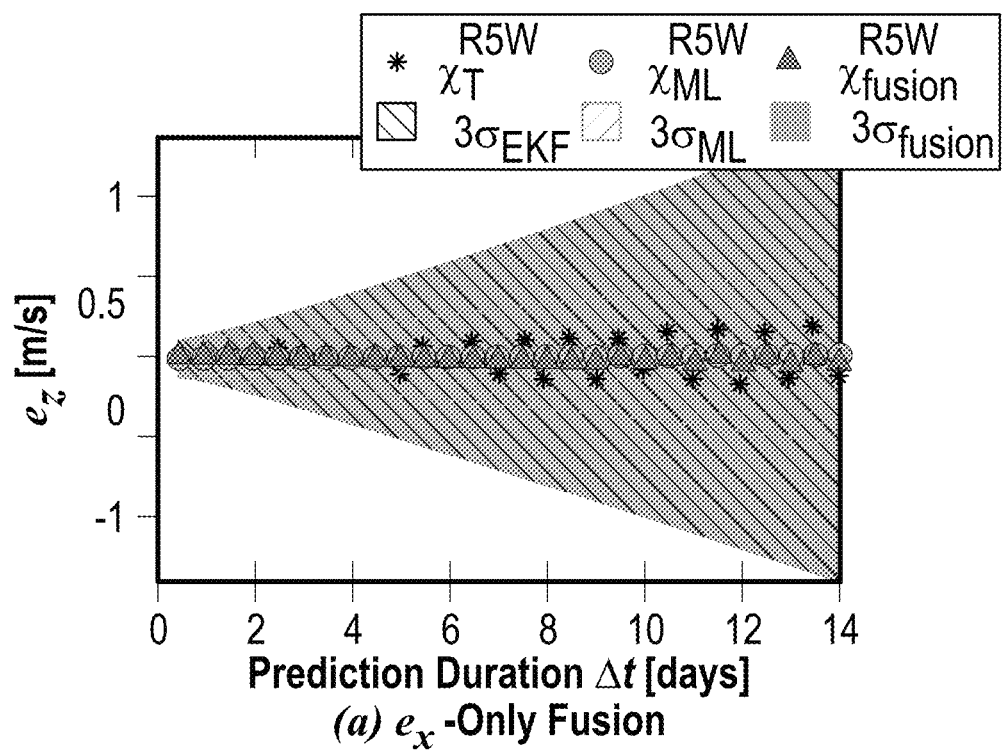
Figure 13:
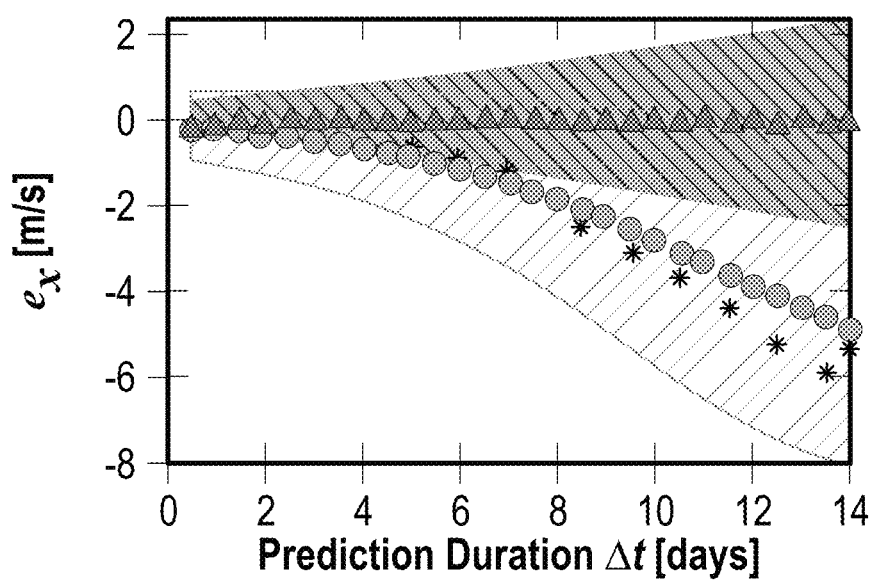
Figure 13:
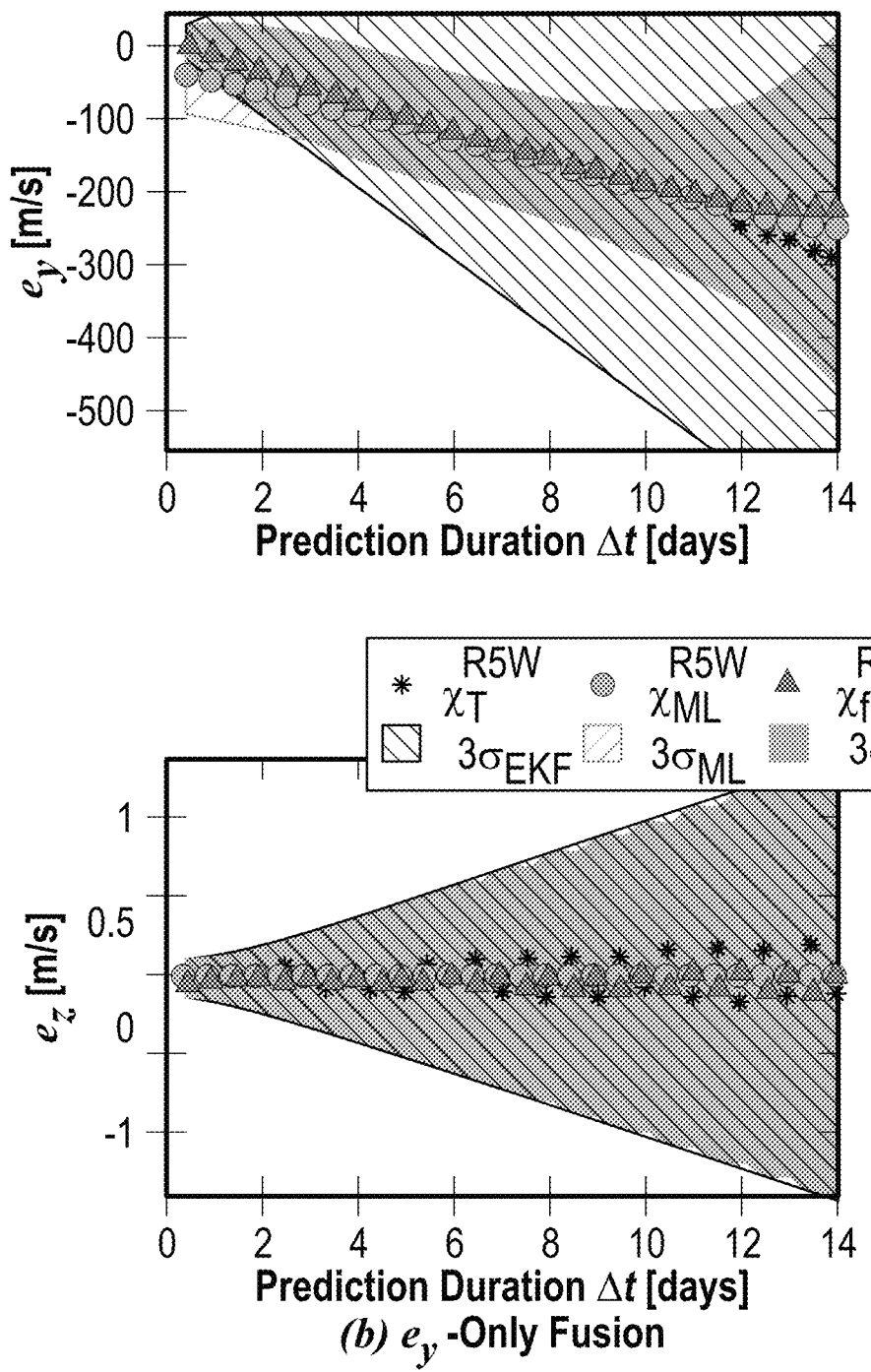
Figure 13:
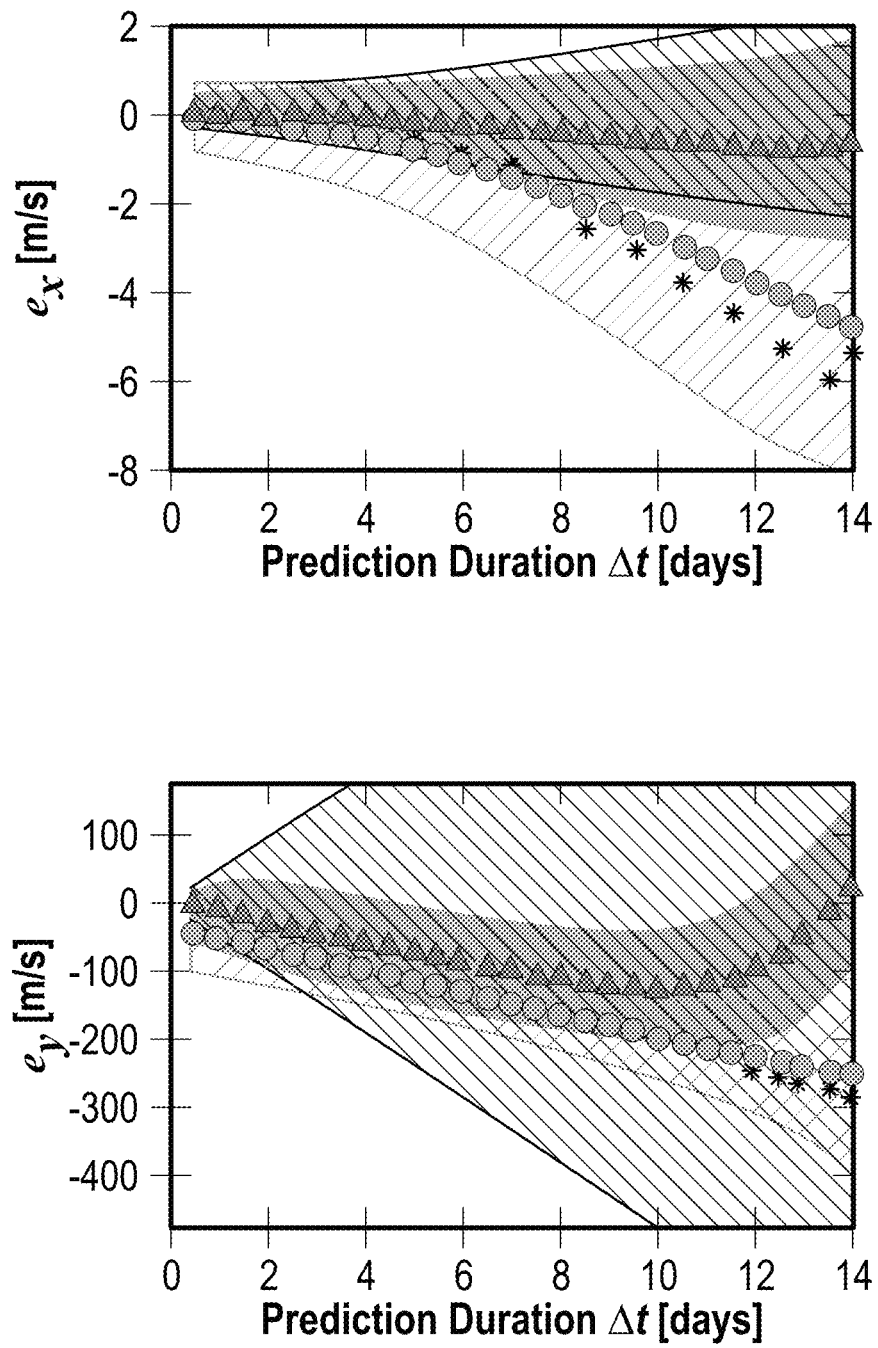
Figure 13:
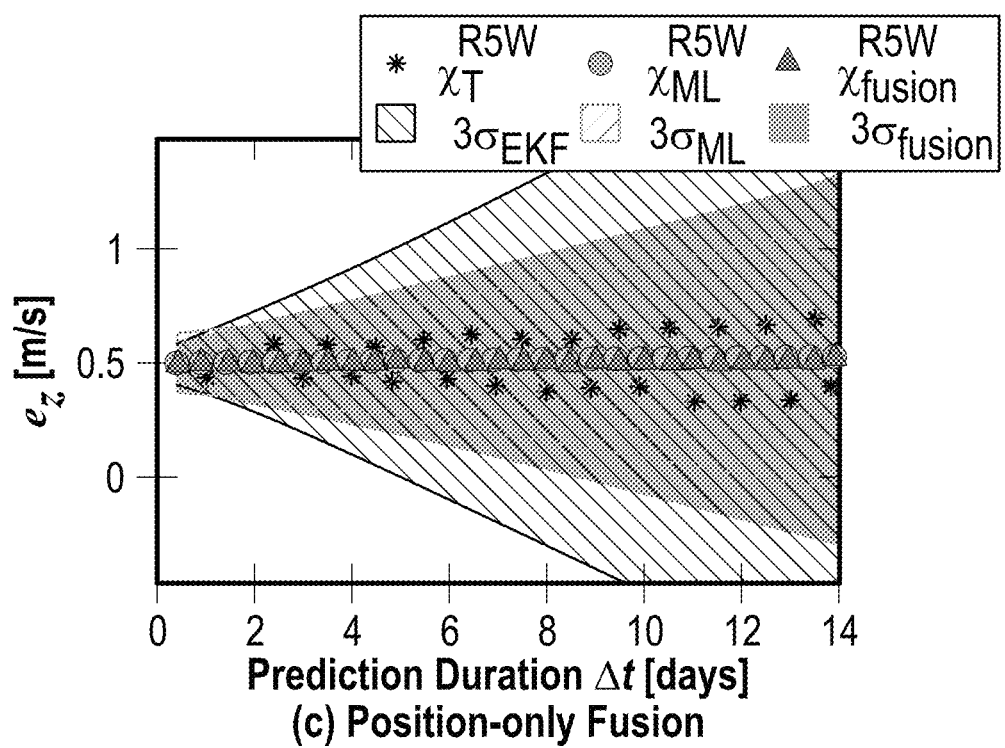

FIG. 13 illustrates an application of an illustrative methodology of orbital prediction error and uncertainty reduction in accordance with one or more embodiments of the present disclosure.

FIG. 13 depicts an example of that the EKF performance of $e_x$ can hardly be improved where the EKF-predictions of $e_x$ are very bad and the ML-modifications have very large uncertainty. It is clear that the $e_y$-only fusion can improve the performance on itself, as shown in FIG. 13(b). But although the position-only fusion result can slightly improve the bad performance of EKF on $e_x$, as shown in FIG. 13(c) that the red ribbon has been slightly moved closer to the asterisks, the fusion can hardly provide any improvement with a practical significance. Meanwhile, since the fusion of $e_x$ shows a negative effect on the performance of $e_y$, as shown in FIG. 13(a), the red ribbon for $e_y$ in FIG. 13(c) is also deviated, leading to a worse performance than the $e_y$-only fusion result.

Figure 14:
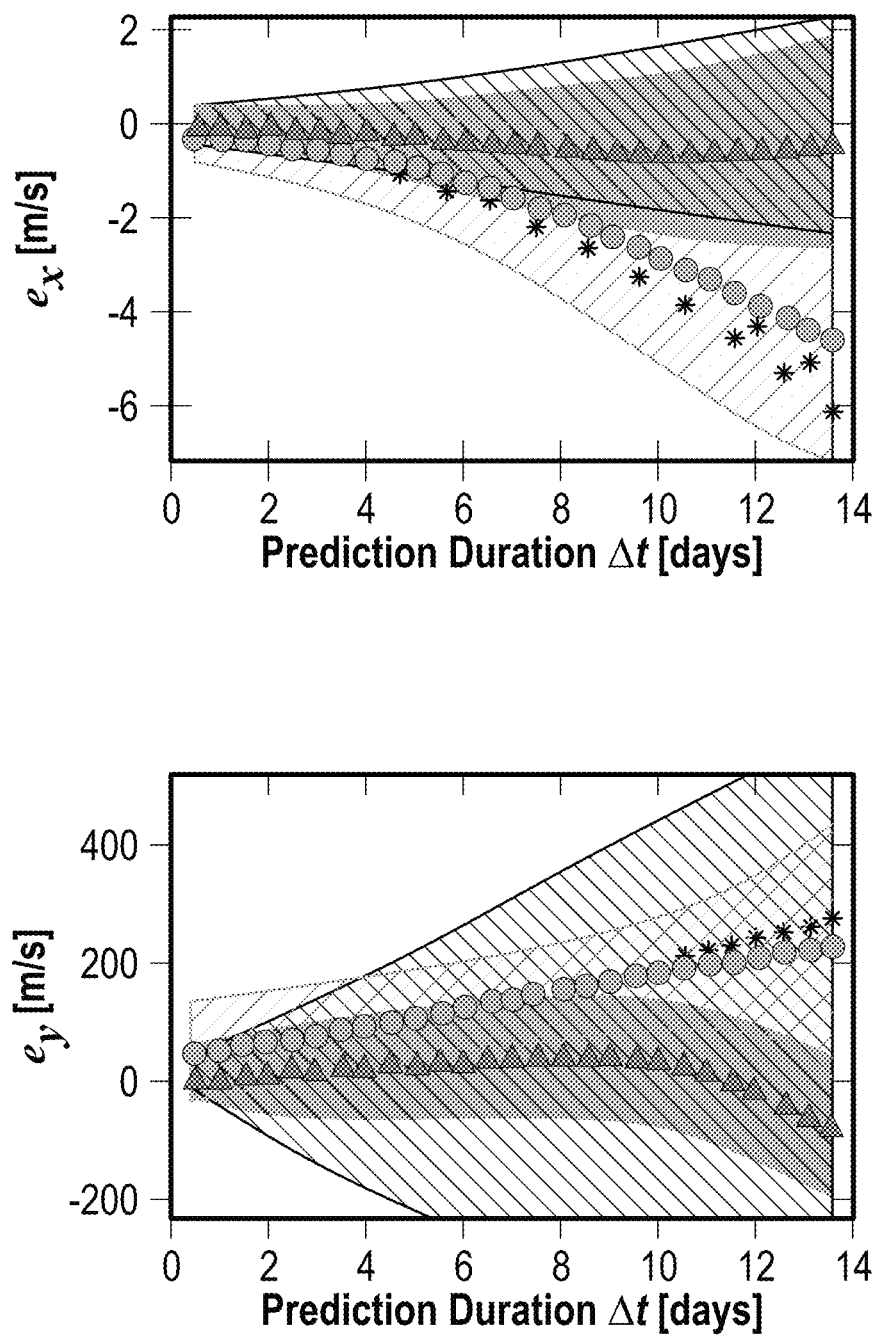
Figure 14:
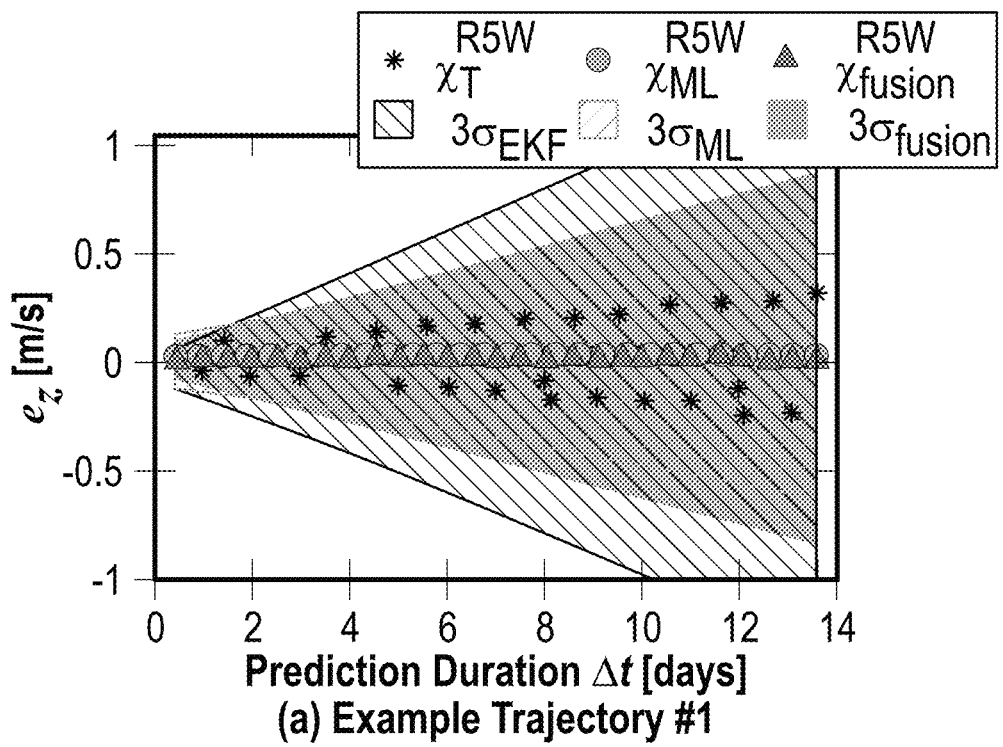
Figure 14:
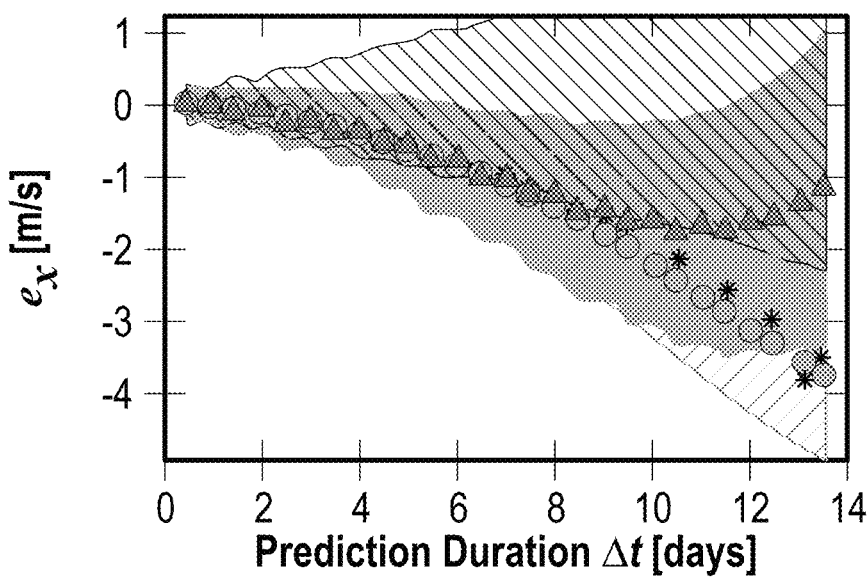
Figure 14:
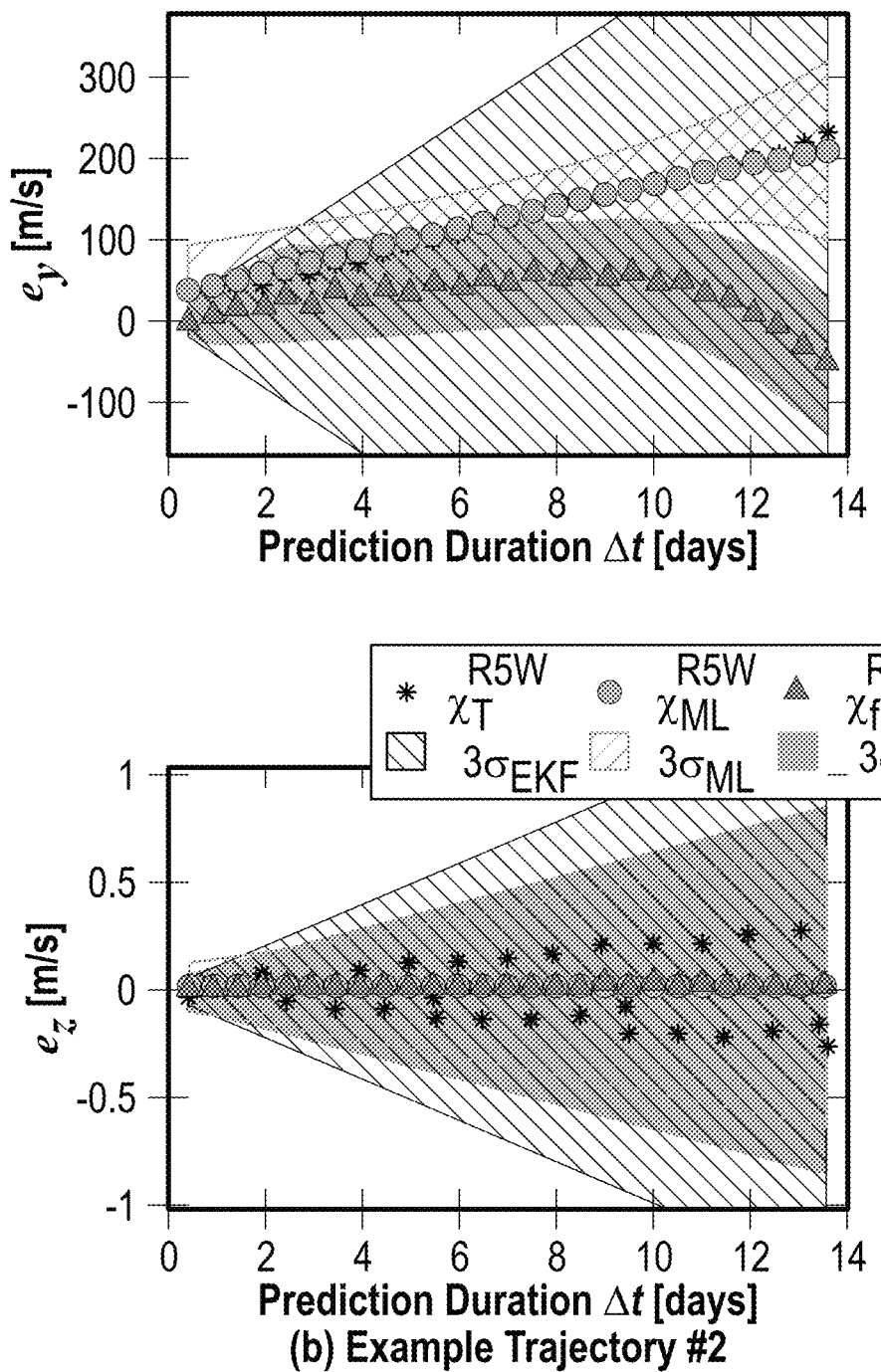

FIG. 14 illustrates an application of an illustrative methodology of orbital prediction error and uncertainty reduction in accordance with one or more embodiments of the present disclosure.

FIG. 14 shows an example where the EKF-predictions shows some improvement on $e_x$ but with the undesired cost of a very bad fusion result on $e_y$.

Figure 15:
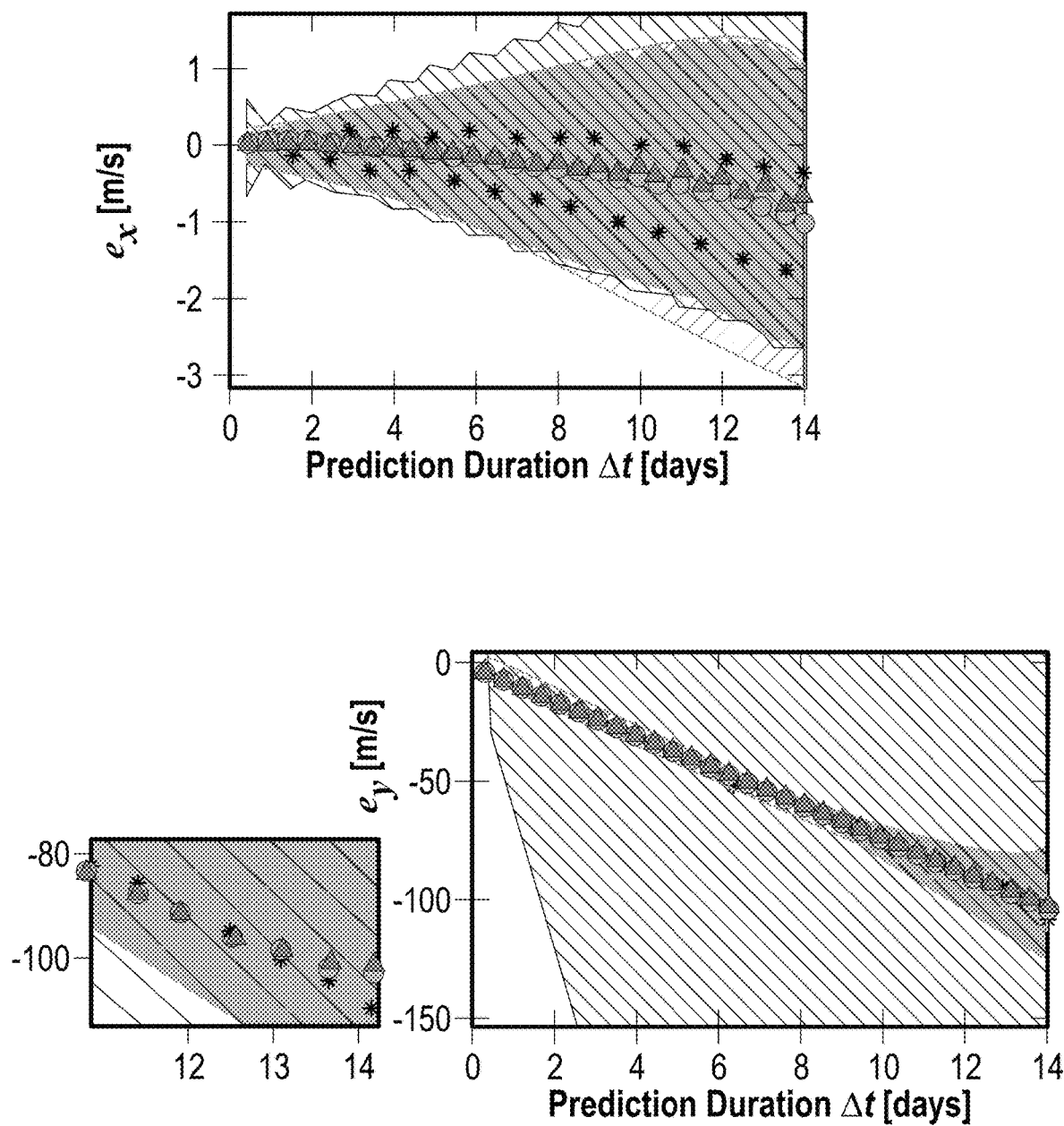
Figure 15:
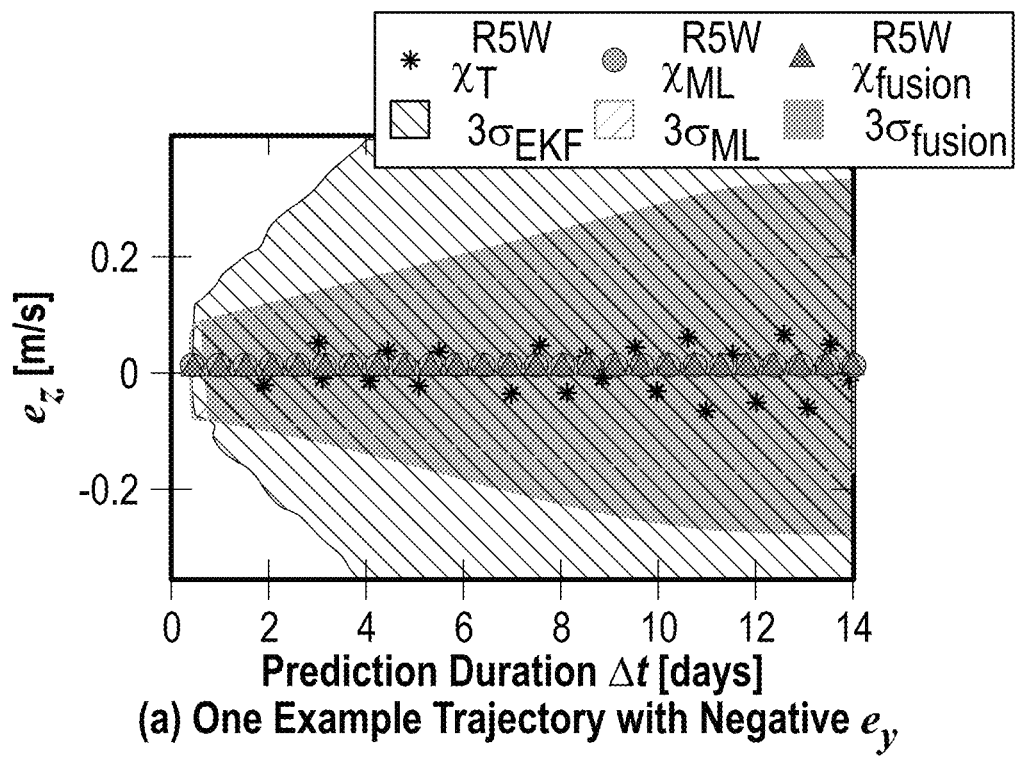
Figure 15:
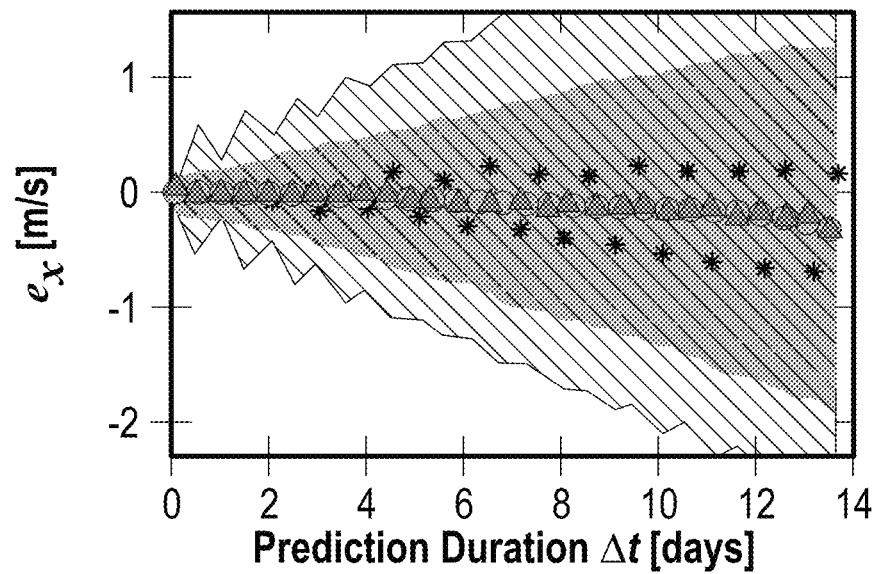
Figure 15:
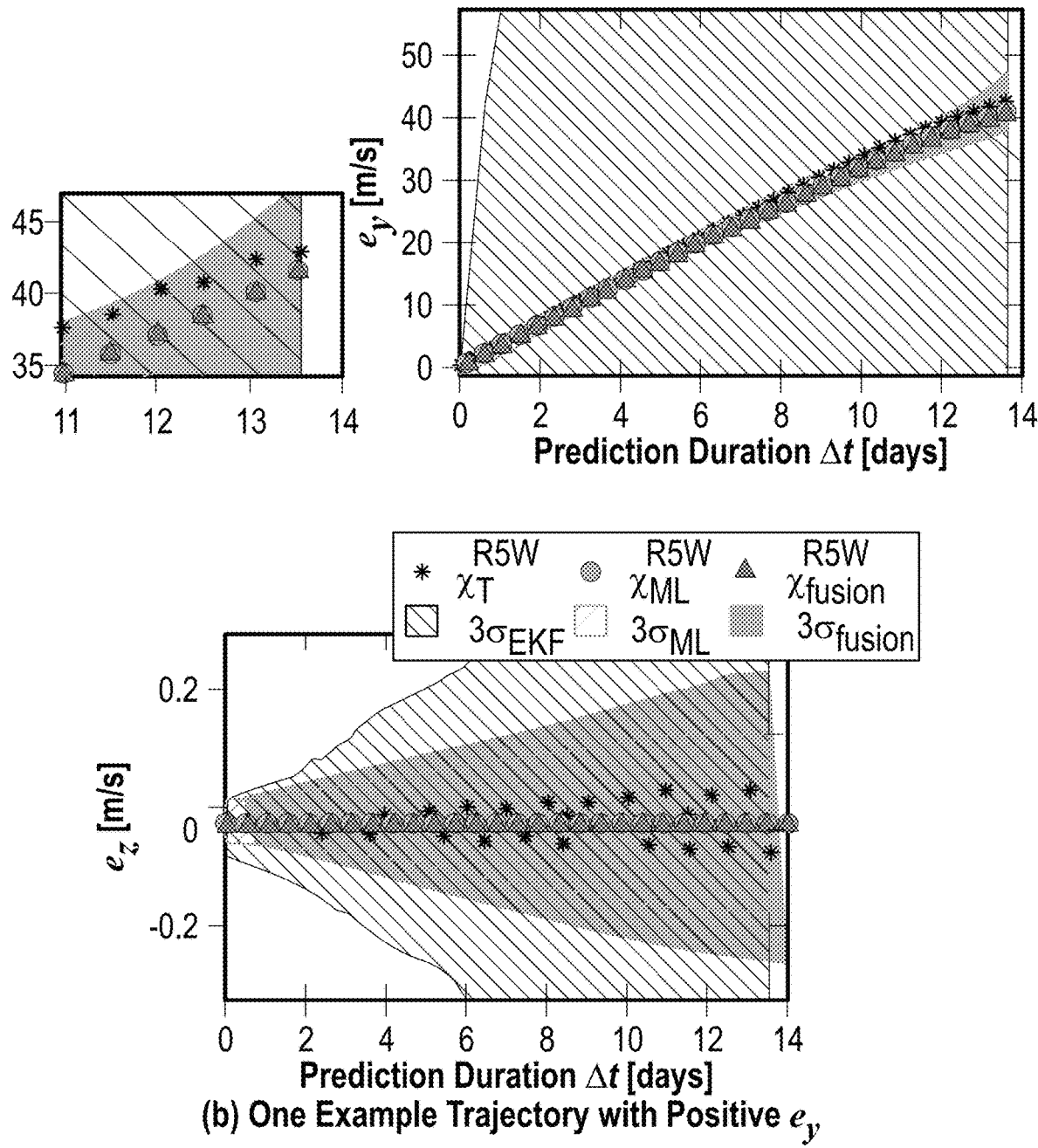
Figure 15:
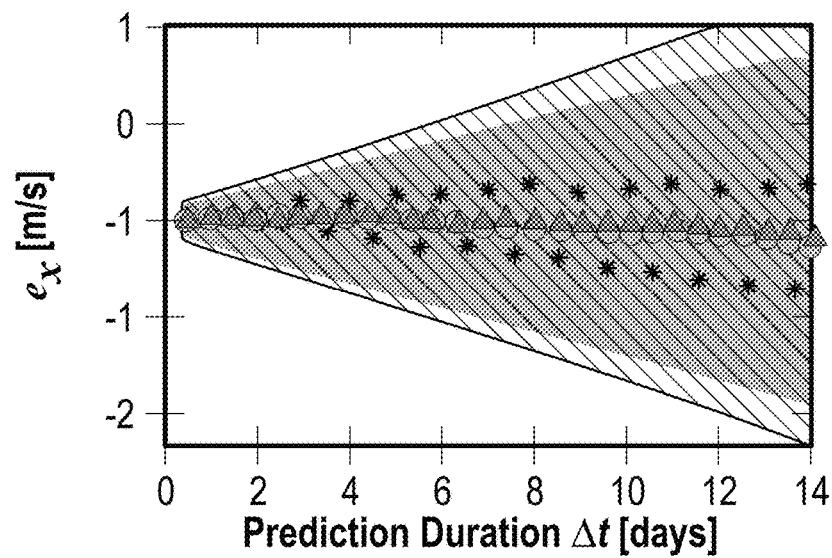
Figure 15:
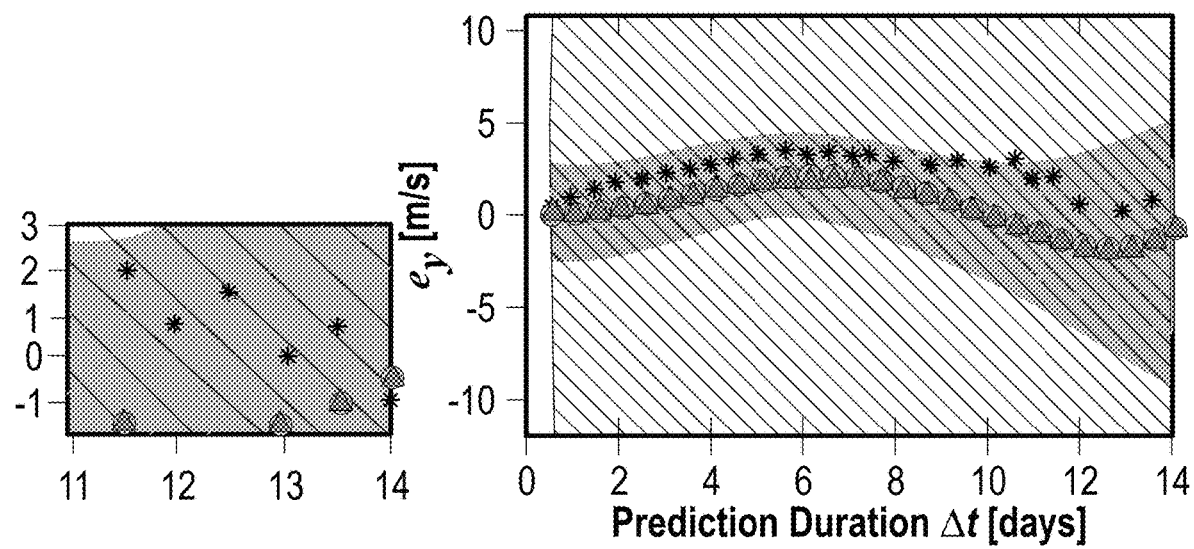
Figure 15:
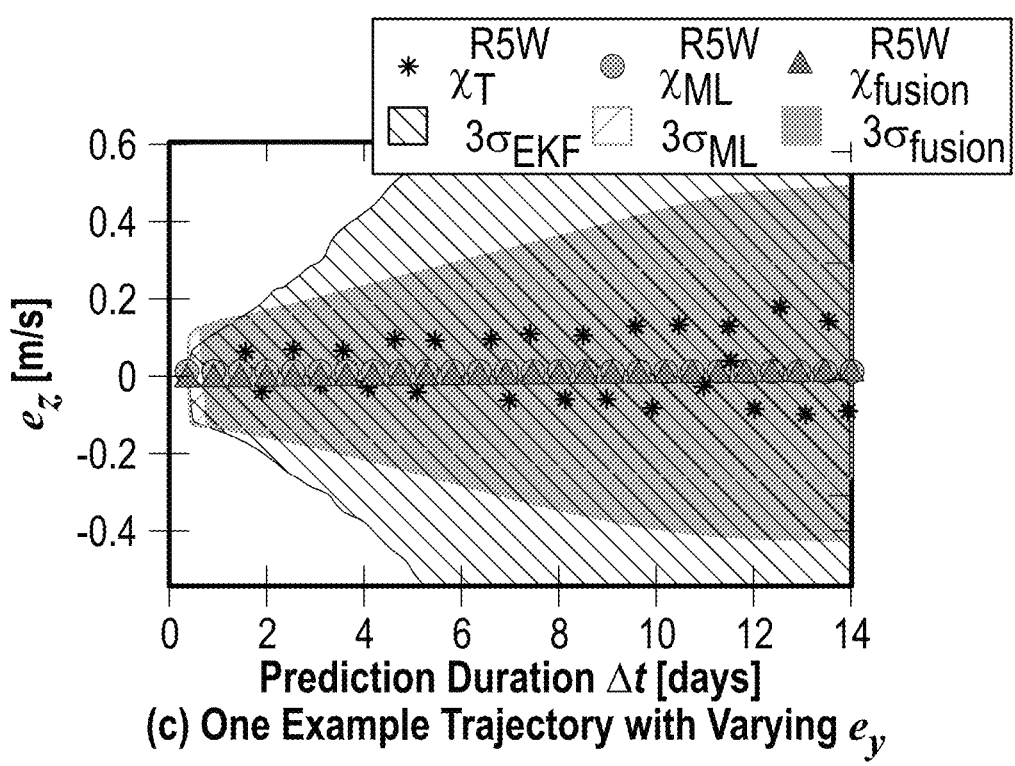

FIG. 15 illustrates an application of an illustrative methodology of orbital prediction error and uncertainty reduction in accordance with one or more embodiments of the present disclosure.

FIG. 15 depicts validation of the models and fusion results against an additional RSO. The additional RSO is based on LARETS, whose initial orbital state is extracted from the two-line element set:

1 27944U 03042F 18246.50353587 −0.00000051 00000-0-81033-6 0 9991

2 27944 98.0375 15.2582 0011429 310.4899 49.5307 14.63172440797557

FIG. 15 demonstrates three typical example trajectories. In general, both the EKF-prediction and the ML-modification is good, and they lead to a good fusion result with smaller orbit prediction uncertainty (the red ribbon is narrower than the black hatching). Particularly, the phenomenon in FIG. 15(c) is worth special interests, where the true value of $e_y$ is not monotonous with respect to $\Delta t$ and the trained GP model generates a too small $3\sigma_{ML}$-boundary. However, the fusion result provides a larger uncertainty region after considering the $3\sigma_{EKF}$-boundary.

Figure 16:
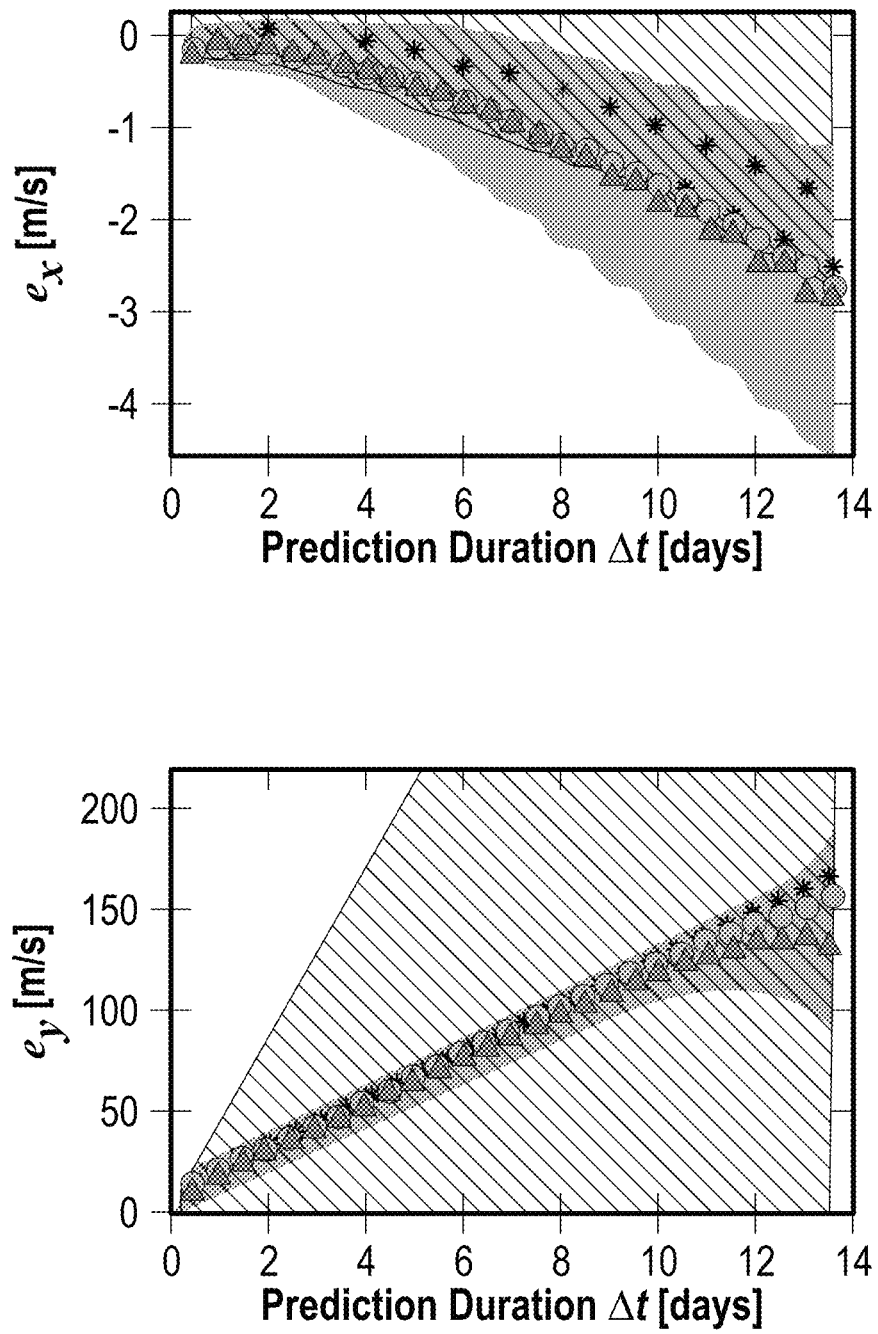
Figure 16:
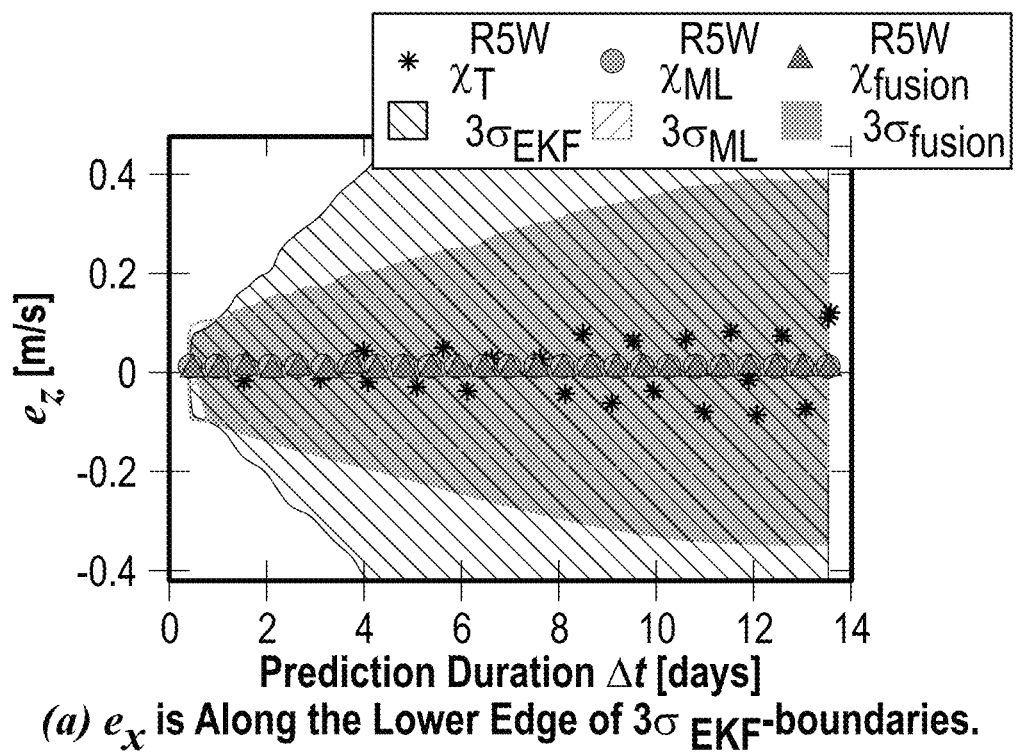
Figure 16:
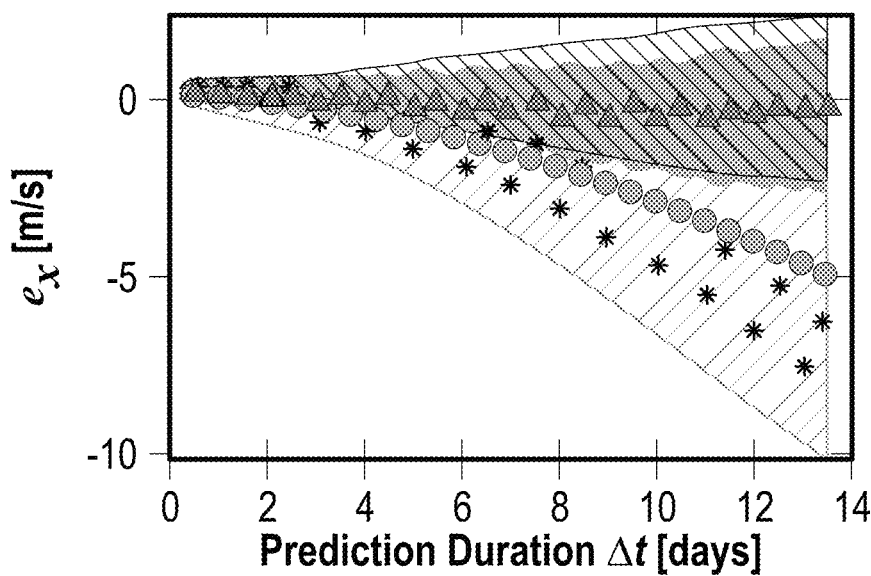
Figure 16:
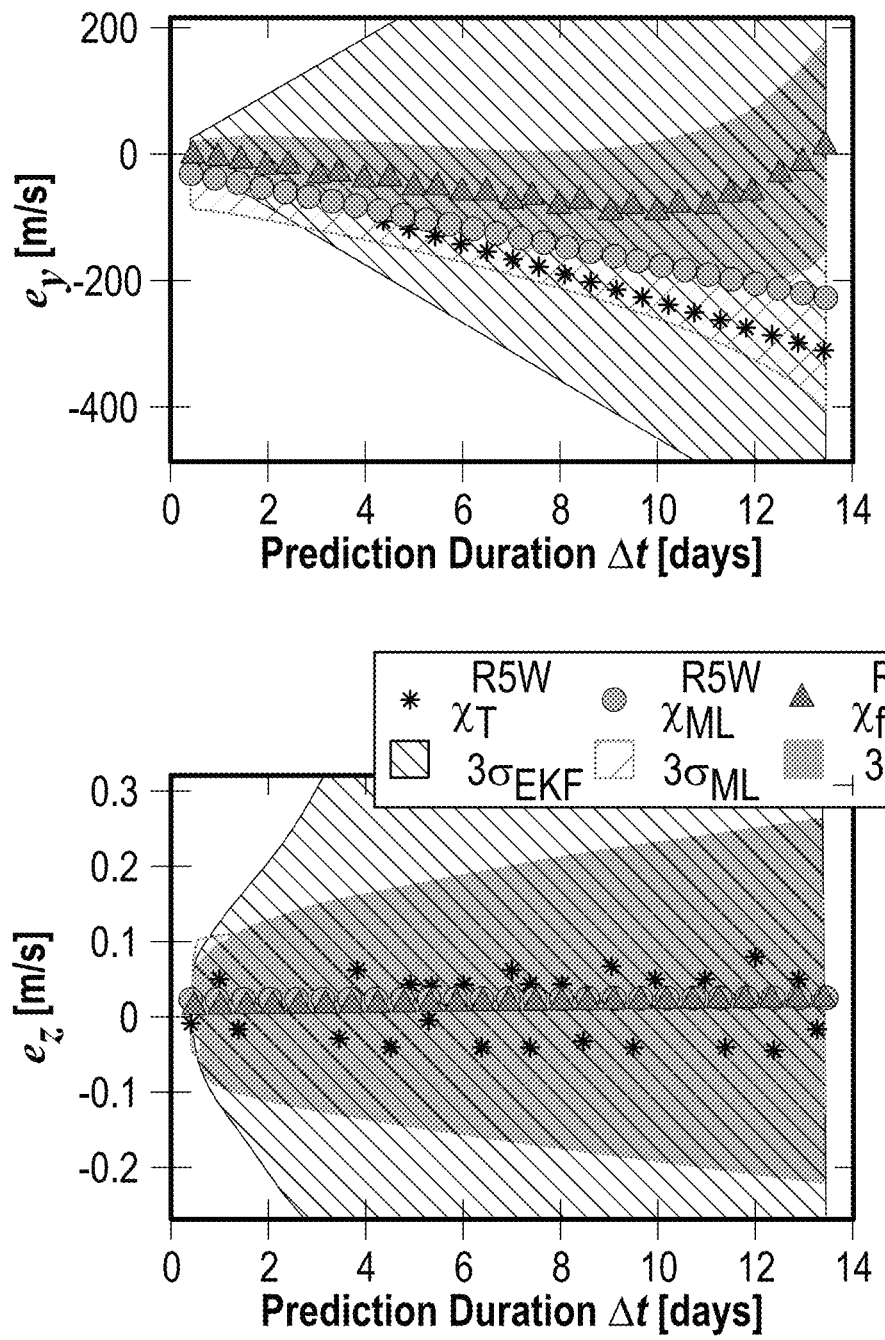
Figure 16:
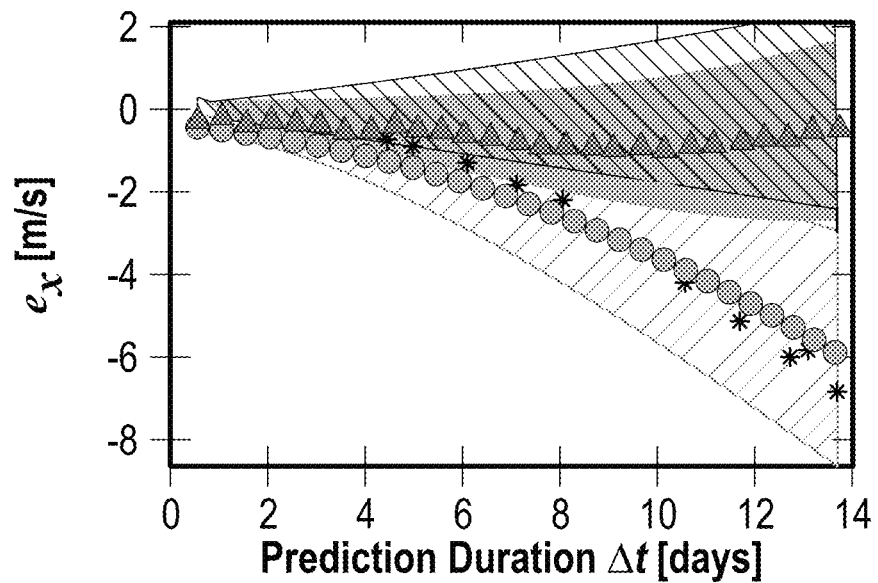
Figure 16:
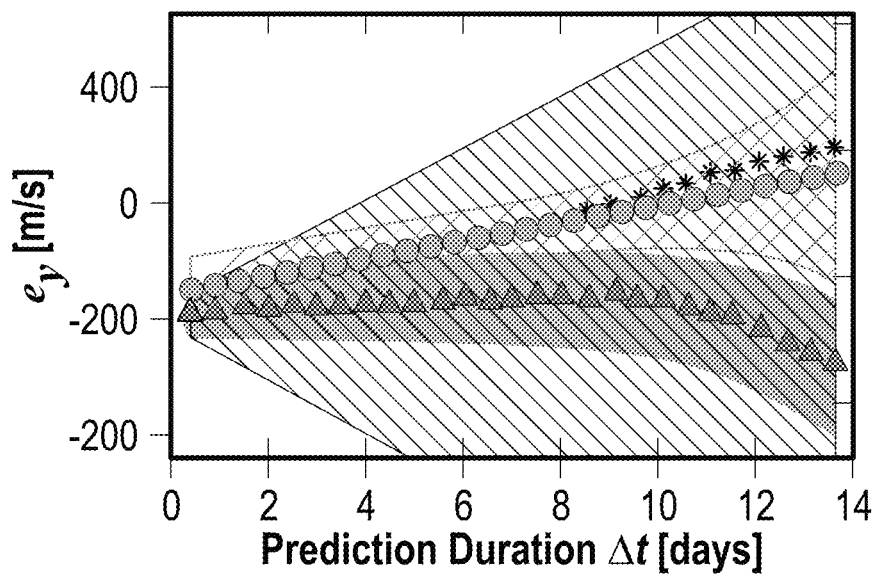
Figure 16:
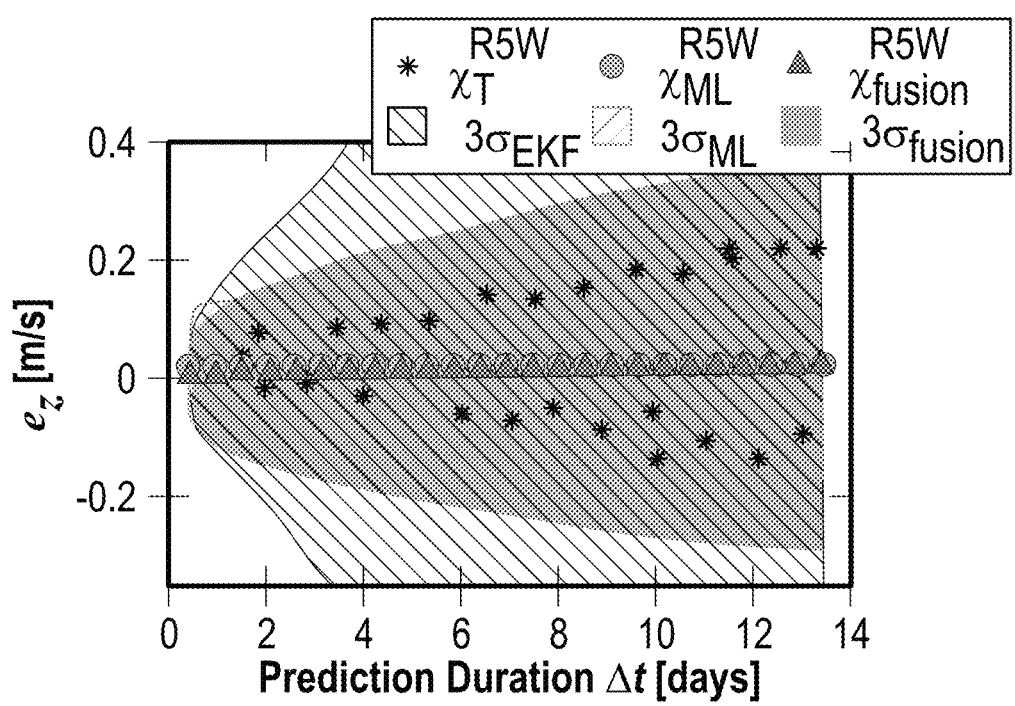

FIG. 16 illustrates an application of an illustrative methodology of orbital prediction error and uncertainty reduction in accordance with one or more embodiments of the present disclosure.

FIG. 16 demonstrates, the fusion result on another simulated RSO based on LARETS, whose initial orbital state is extracted from the two-line element set:

1 27944U 03042F 18246.50353587 −0.00000051 00000-0-81033-6 0 9991

2 27944 98.0375 15.2582 0011429 310.4899 49.5307 14.63172440797557

FIG. 16 depicts three example trajectories showing bad fusion results due to bad performance of EKF on ex, for the simulated RSO based on LARETS. Based on the results the proposed fusion strategy is not only limited to the RSO used to develop the whole procedure, but can also be extended to other RSOs. In addition, in some embodiments, the process noise is not re-turned for the new RSO based on LARETS since it has a similar orbit to that of STELLA. Further improvement can be expected by choosing particular process noise coefficients and GP model parameters.

Figure 17:
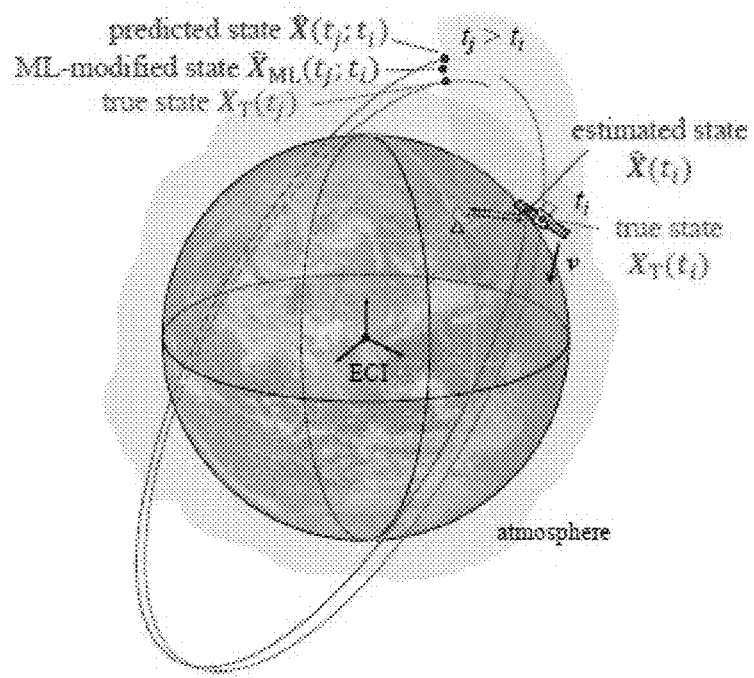

FIG. 17 illustrates an application of an illustrative methodology of orbital prediction error and uncertainty reduction in accordance with one or more embodiments of the present disclosure.

As shown in FIG. 17, the ML approach may directly generate an inference of the future orbit prediction error without orbit propagations.

Figure 18:
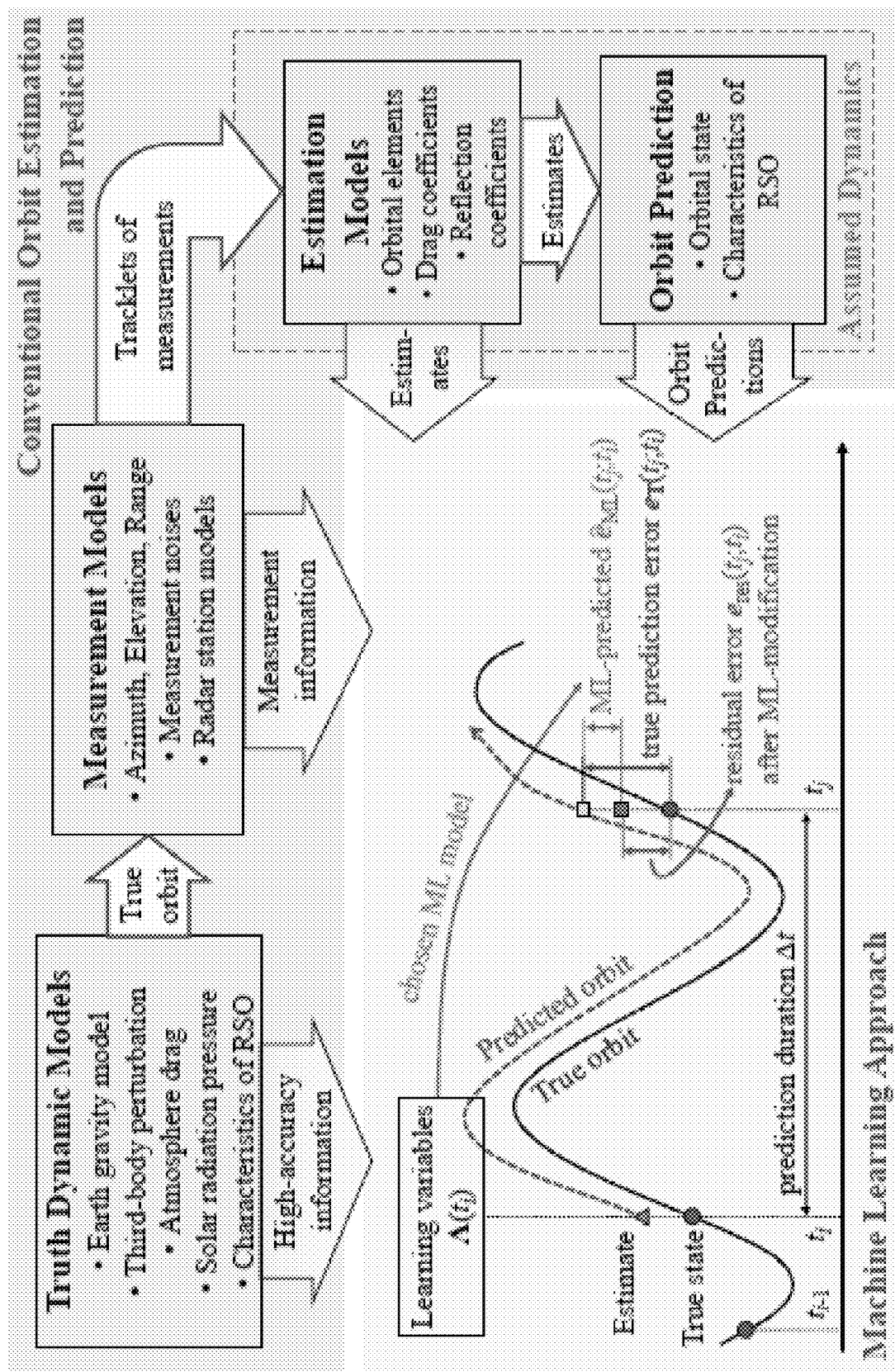

FIG. 18 illustrates a flowchart of an illustrative methodology of orbital prediction error and uncertainty reduction in accordance with one or more embodiments of the present disclosure.

FIG. 18 demonstrates aspects of an embodiment of the ML approach as well as the data structure. At the current epoch $t_i$, GP models will be trained to map the learning variables $\Lambda(t_i)$ to the orbit prediction error $\hat{e}_{ML}(t_j; t_i)$, which can be fused with the conventional orbit prediction $\hat{e}_{TLE}(t_j; t_i)$ based on the current estimate $\hat{e}_{TLE}(t_i)$. This process is designed to not involve propagation and not interference with the existing orbit estimation process. The key concept is the orbit prediction errors can be largely due to systematic errors, including the measurement system and the assumed model, or the estimation algorithm could identify consistent patterns in the historical data, which could be learned and mitigated.

Another advantage of the current ML approach lies its being an independent process to existing operations, as clearly shown in FIG. 18. In conjuncture analysis or observation scheduling, the ML-modified predictions can be either applied or not, without changing the running procedure. In other words, the ML approach works as a plug-in to the existing system and can be easily monitored, evaluated, and controlled.

Figure 19:
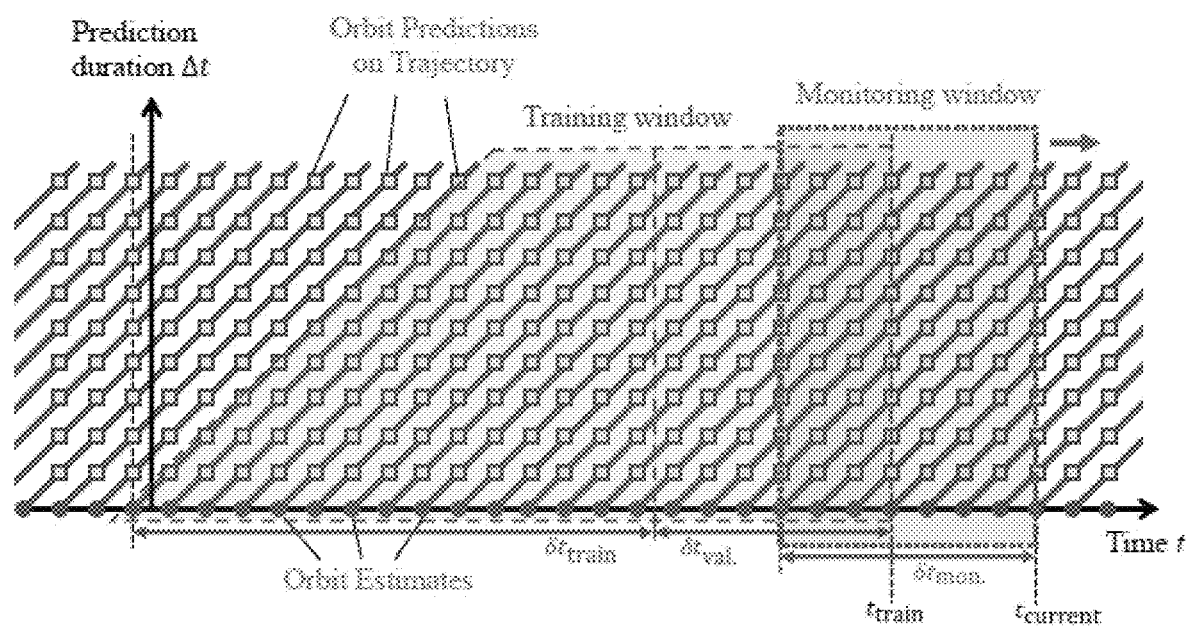

FIG. 19 illustrates an illustrative methodology for monitoring machine learning performance for orbital prediction error and uncertainty reduction in accordance with one or more embodiments of the present disclosure.

The overall process is illustrated in FIG. 19. The horizontal axis represents the time t. The vertical axis represents the forward orbit prediction duration $\Delta t$. Each dot on the t-axis represents an orbital estimate $\hat{e}_{TLE}(t_i)$ corresponding to the TLE set at $t_j$. The line starting from each dot represents a single trajectory based on the corresponding estimate $\hat{e}_{TLE}(t_j)$. Since $\hat{e}_{TLE}(t_j)$ is assumed to be the most accurate information at $t_j$, comparing all predictions based on previous estimates $\hat{e}_{TLE}(t_i)$ will generate a series of the orbit prediction error $e_T(t_i; t_j)$, which becomes the target variable for the ML approach.

In some embodiments, a "monitoring window" (M-window) may be defined as the time interval between $t_{current}-\delta t_{mon.}$ and $t_{current}$, as shown by the green rectangular frame in FIG. 19, where $\delta t_{mon.}$ is the width of the M-window. The data points, pairs of learning and training variables which fall inside the monitoring window will be used as a testing data of the trained ML models. The assumption is that, if the trained ML models have good performance in some testing data, they are likely to sustain that performance on another set of nearby data. In other words, the performance of the trained ML models on the testing data is assumed to be smoothly decreasing as the testing data in the monitoring window is moving away from the training data. Therefore, in some embodiments, the epoch when the trained ML models become unreliable may be identified.

Figure 20:
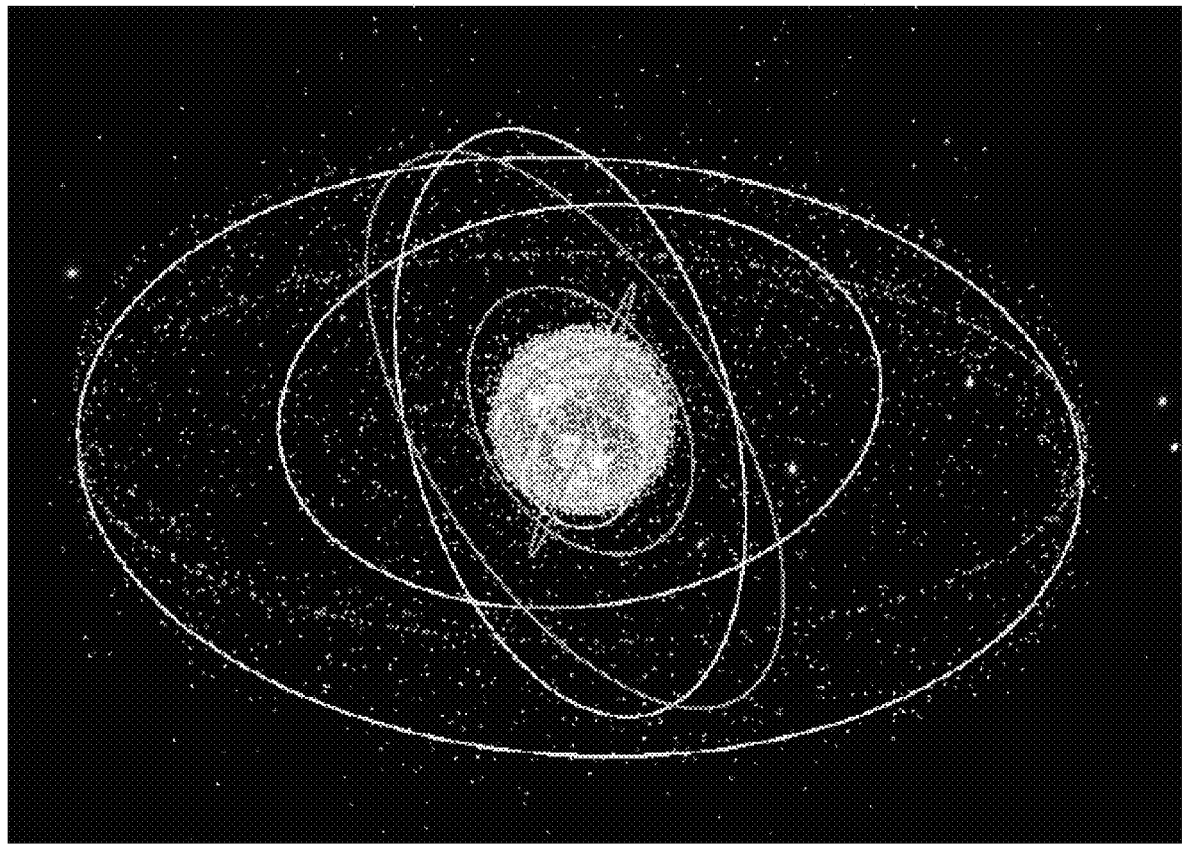

FIG. 20 illustrates a space object map for use with of an illustrative methodology of orbital prediction error and uncertainty reduction in accordance with one or more embodiments of the present disclosure.

There are 19,800 objects tracked in the TLE catalog recently where 2,429 objects are active and all others are nonoperative or debris. As shown in FIG. 20, RSOs (small dots) are not distributed evenly in the space and they are much more condensed on LEO. In some embodiments, only a small number is employed for training and testing, such as, e.g., 17 RSOs on different orbits, as represented by the orbits in FIG. 20, where the green orbits represent active RSOs and the orange orbits represent inactive RSOs or space debris. Their orbital information are summarized in Table 2 below.

For each RSO, all published TLE sets in 2018 are collected and used to generate training dataset for the ML approach. Our raw TLE sets are extracted from space-track.org and cleaned by removing replicated sets within a very short duration (<60 s). No further adjustments to the TEL sets have been implemented.

TABLE 2

Information about RSOs. TLE sets in 2018 are considered. ("LEO" indicates not "SSO")

| RSO No. | NORAD ID | Name | Orbit Type | TLE Sets Number | Altitude [km] |
|---|---|---|---|---|---|
| 1 | 27911 | LARETS | SSO | 1443 | 698 |
| 2 | 22824 | STELLA | SSO | 827 | 800 |
| 3 | 25260 | SPOT-4 | SSO | 1045 | 800 |
| 4 | 21836 | DMSP F11 DEB | SSO | 698 | 820 |
| 5 | 35871 | BLITS | SSO | 770 | 833 |
| 6 | 7646 | STARLETTE | LEO | 817 | 969 |
| 7 | 22076 | TOPEX | LEO | 642 | 1340 |
| 8 | 38077 | LARES | LEO | 722 | 1457 |
| 9 | 16908 | AJISAI | LEO | 837 | 1501 |
| 10 | 1328 | BEACON-C | LEO | 754 | 1129 |
| 11 | 22195 | LAGEOS-2 | MEO | 667 | 5795 |
| 12 | 8820 | LEGEOS-1 | MEO | 665 | 5850 |
| 13 | 19751 | ETALON-1 | MEO | 742 | 19133 |
| 14 | 20026 | ETALON-2 | MEO | 743 | 19129 |
| 15 | 25933 | GPS IIR-03 | MEO | 739 | 20140 |
| 16 | 11484 | WESTAR-3 | MEO | 423 | 35900 |
| 17 | 24285 | FAST | Elliptic | 688 | 350-4150 |

Figure 21:
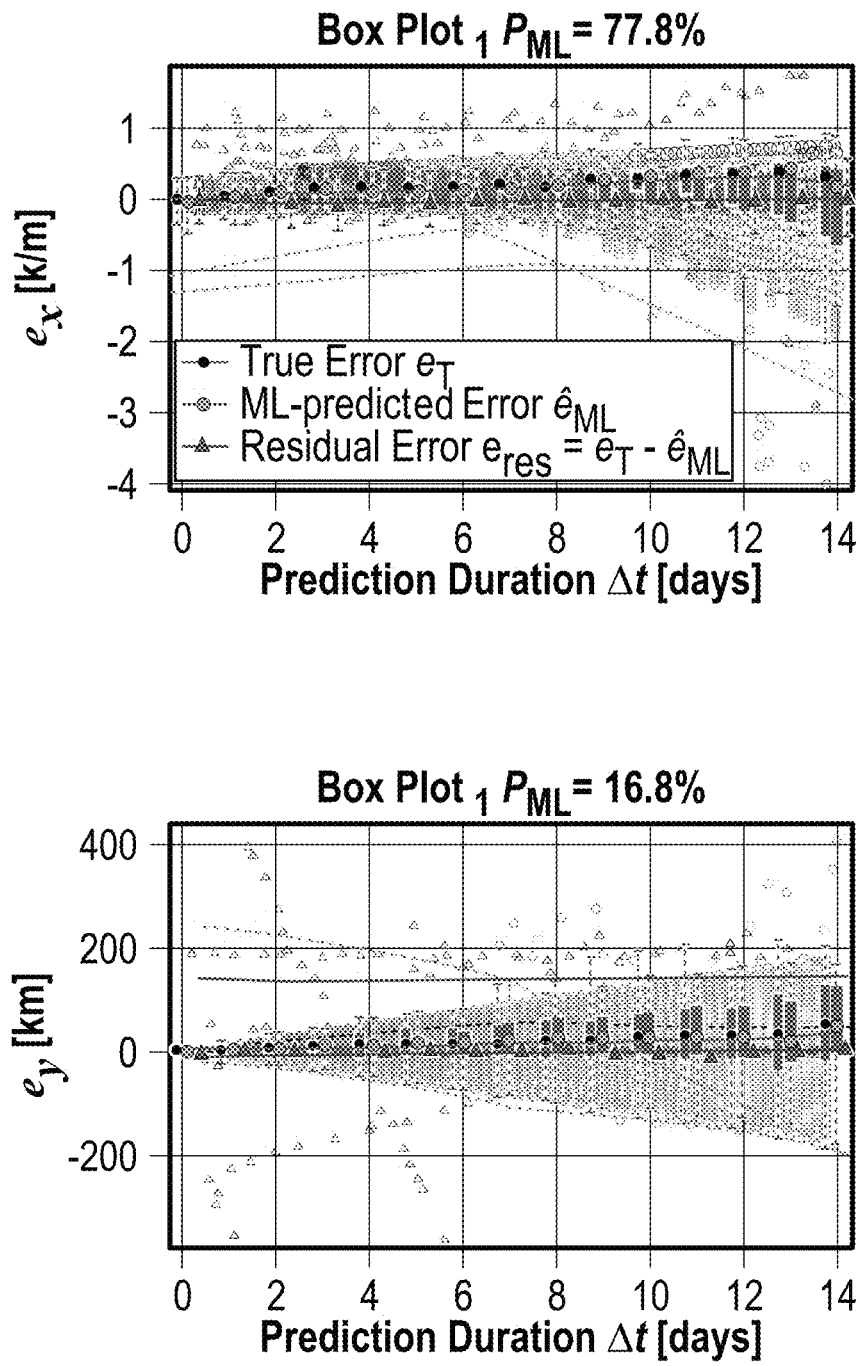
Figure 21:
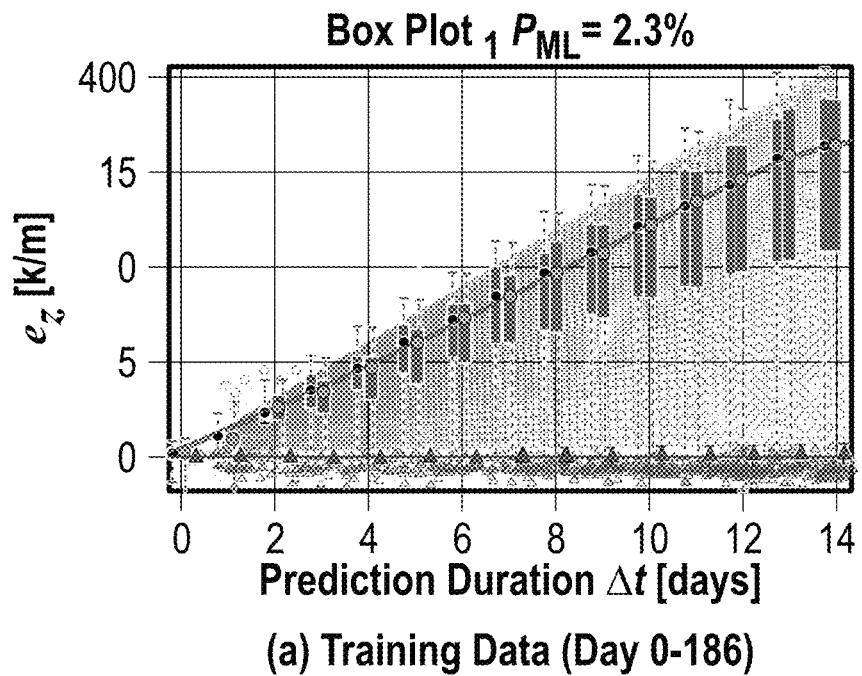
Figure 21:
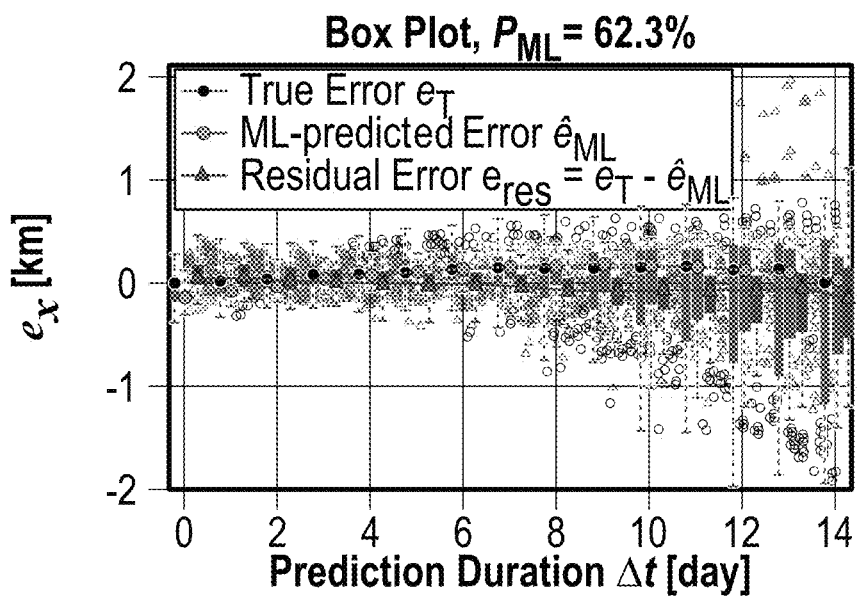
Figure 21:
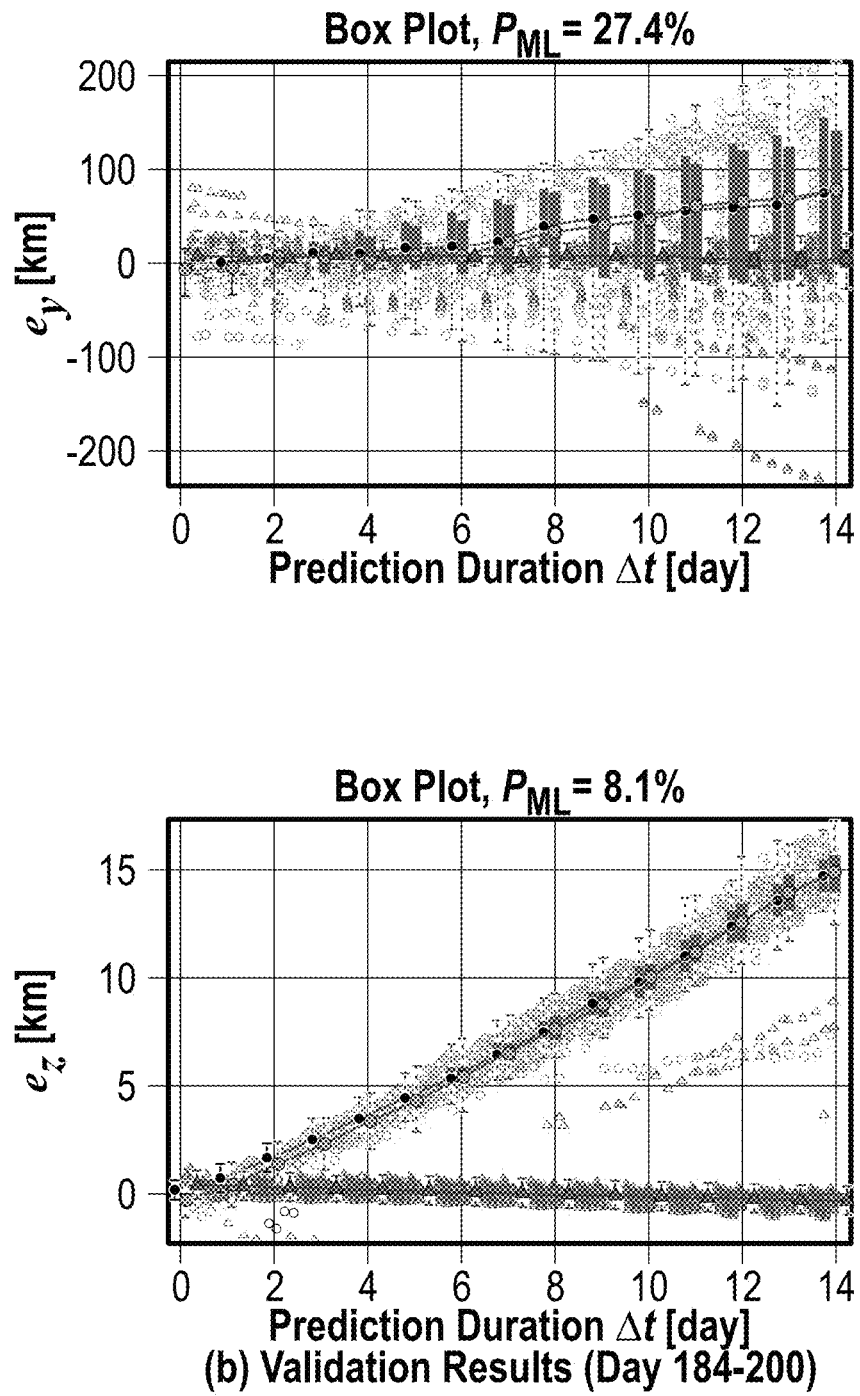
Figure 21:
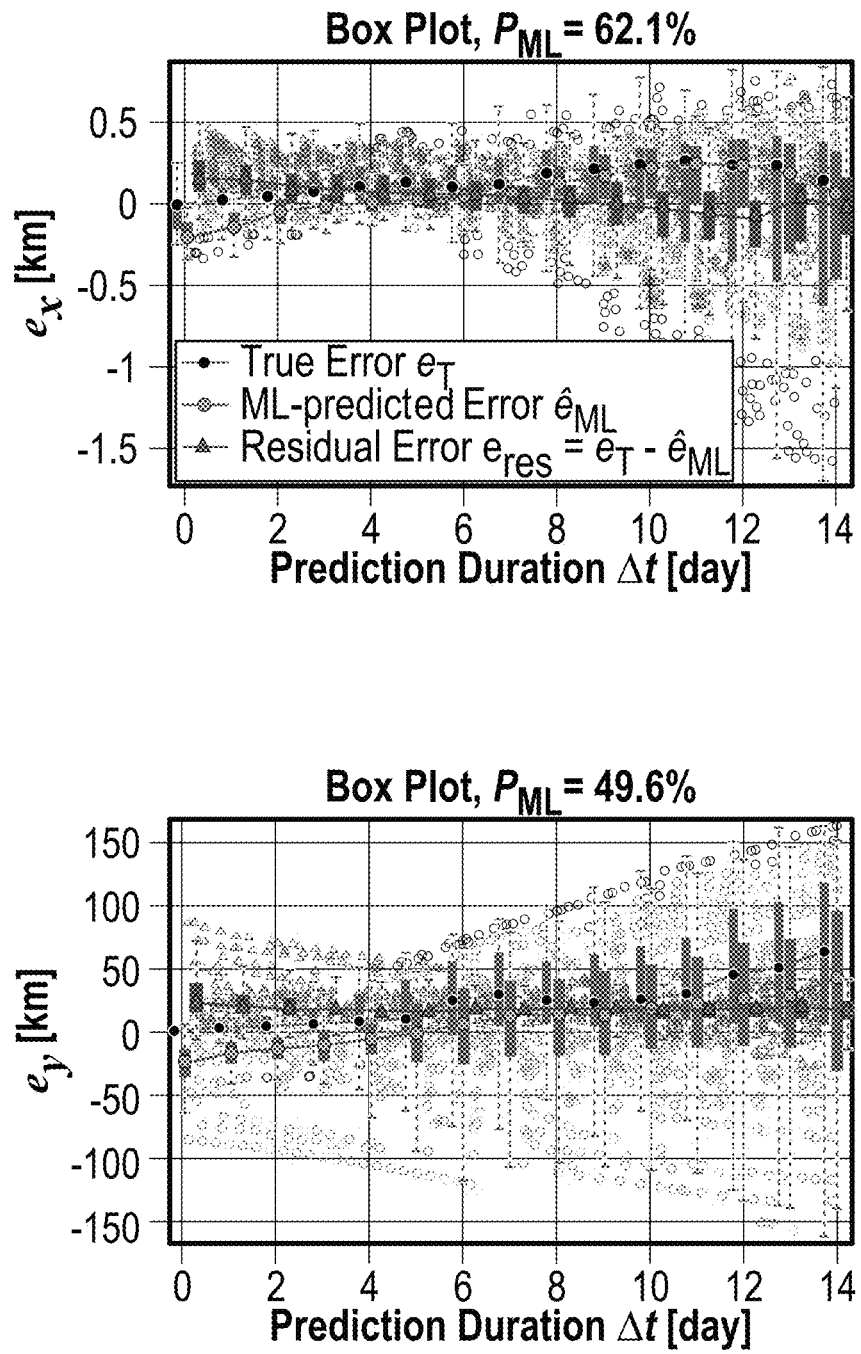
Figure 21:
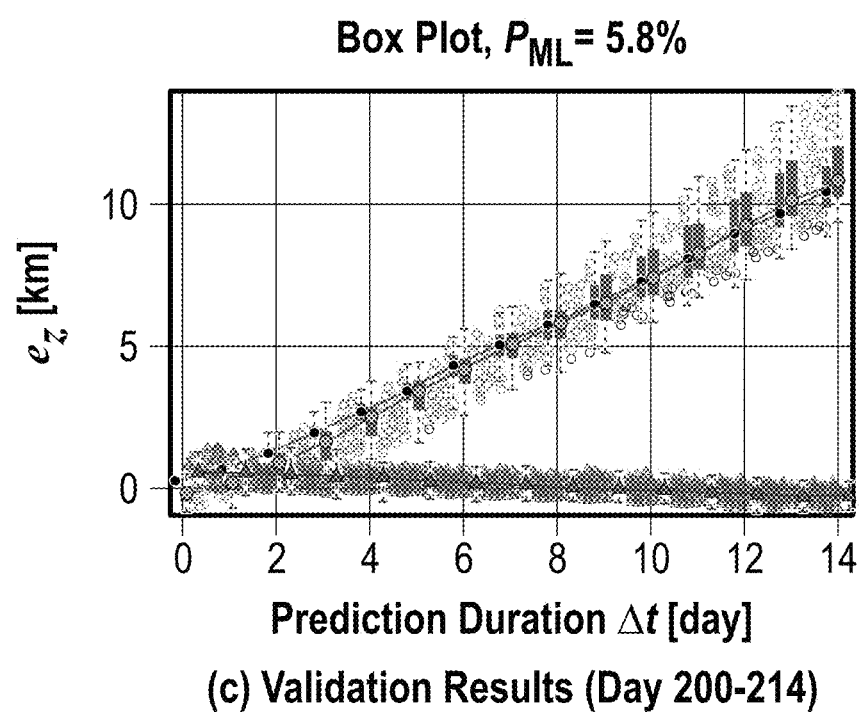

FIG. 21 illustrates an application of an illustrative methodology of orbital prediction error and uncertainty reduction using prediction monitoring in accordance with one or more embodiments of the present disclosure.

In some embodiments RSO-1 (NORAD ID 27944) is used as an example to check and explain the performance of the trained ML models on the training, validation, and testing data, respectively.

FIG. 21 depicts the performance on the three datasets side by side, where only the position components $e_x$, $e_y$, $e_z$ are displayed for brevity. The T-window is chosen from day 1 to day 200 in 2018. The M-window is chosen to be right after the T-window, day 100-214. In each boxplot, the gray boxes represent target errors $e_T$; the green boxes represent ML-inferred errors $\hat{e}_{res}$; and the red boxes represent residual errors $\hat{e}_{res}$ after applying the ML-modification. The underlying colorful dots represent the raw data of each corresponding value. The performance matrix $P_{ML}$ has been defined as the percentage of the total absolute residual error with respect to the total absolute true error. $P_{ML}(e_\xi)=0$ indicates the orbit prediction error of $e_\xi(e_x, e_y, \text{ or } e_z)$ has been completely compensated for after the ML-modification, while $P_{ML}(e_\xi)>100\%$ indicates that, on average, more errors have been introduced by the ML-modification As shown in FIG. 21, the testing data shows much similarity to the training data, indicating that the knowledge learned on the training data could be generalized onto the testing data in the future. While there appears to be many irregular and isolated data points in the training data (by looking at the scattering dots), however, due to their small amount and the robustness of the ML approach, these data have trivial effects on the testing results.

Figure 22:
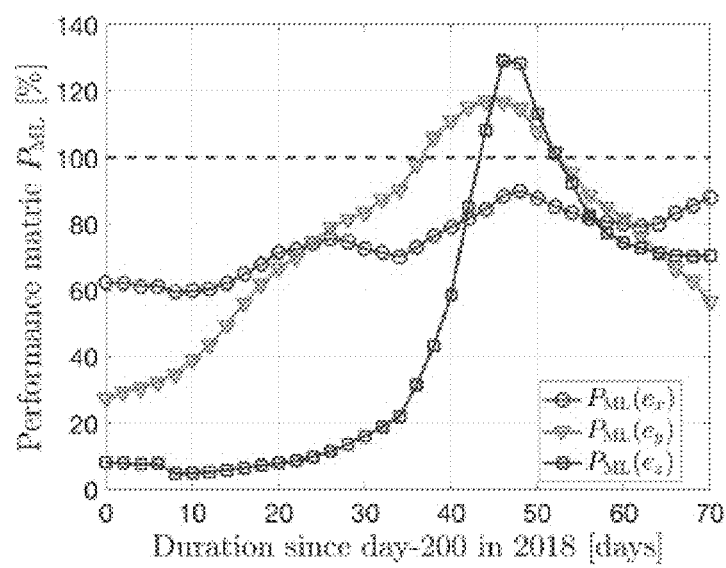

FIG. 22 illustrates an application of an illustrative methodology of orbital prediction error and uncertainty reduction using prediction monitoring in accordance with one or more embodiments of the present disclosure.

Still using RSO-1 as the example, the variation of the performance with respect to the lifetime of the models is demonstrated, i.e., the duration since the last T-window. The variation of $P_{ML}$ is summarized in FIG. 22.

Figure 23:
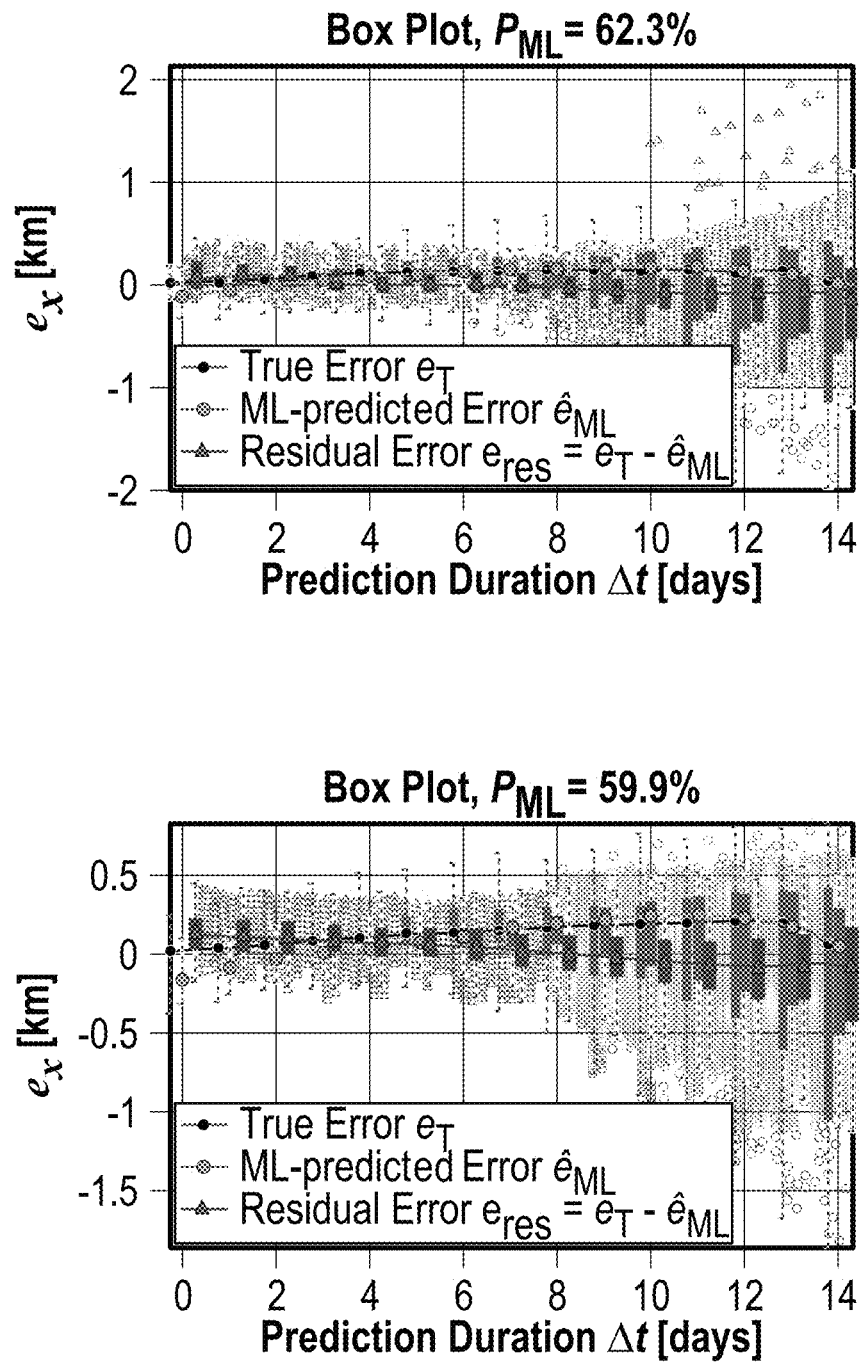
Figure 23:
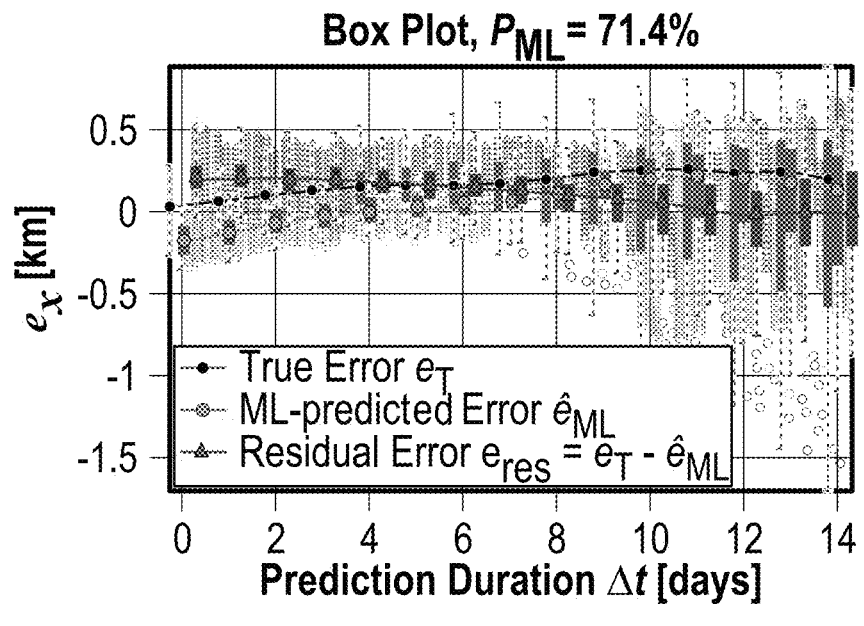
Figure 23:
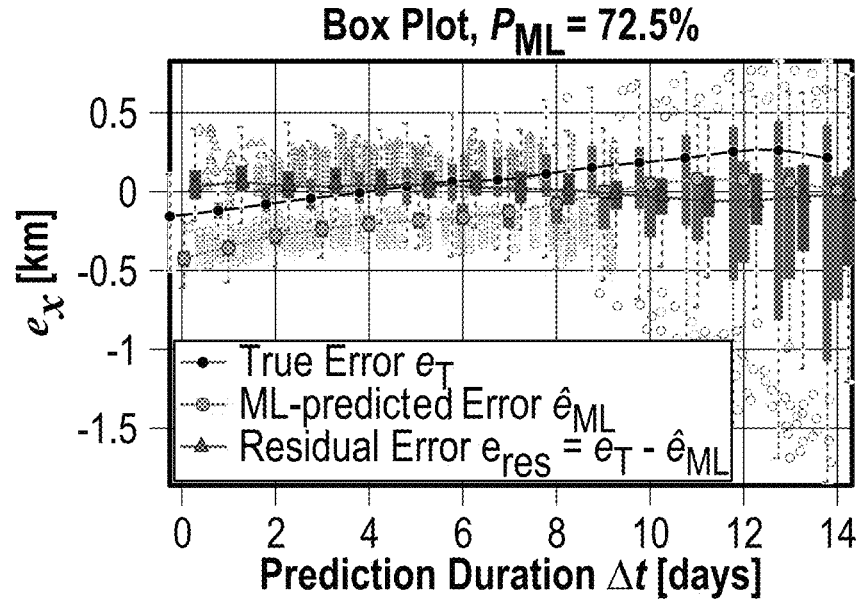
Figure 23:
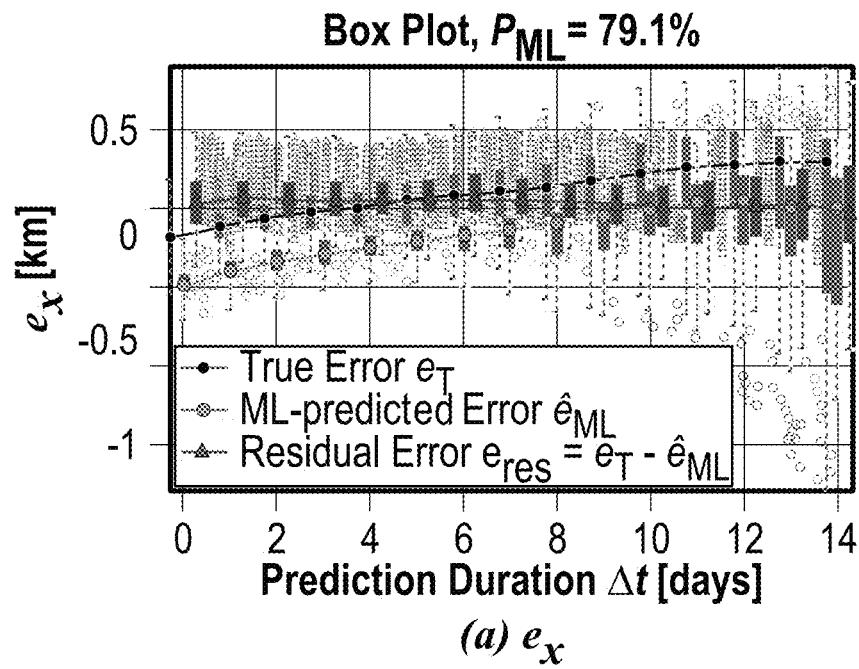
Figure 23:
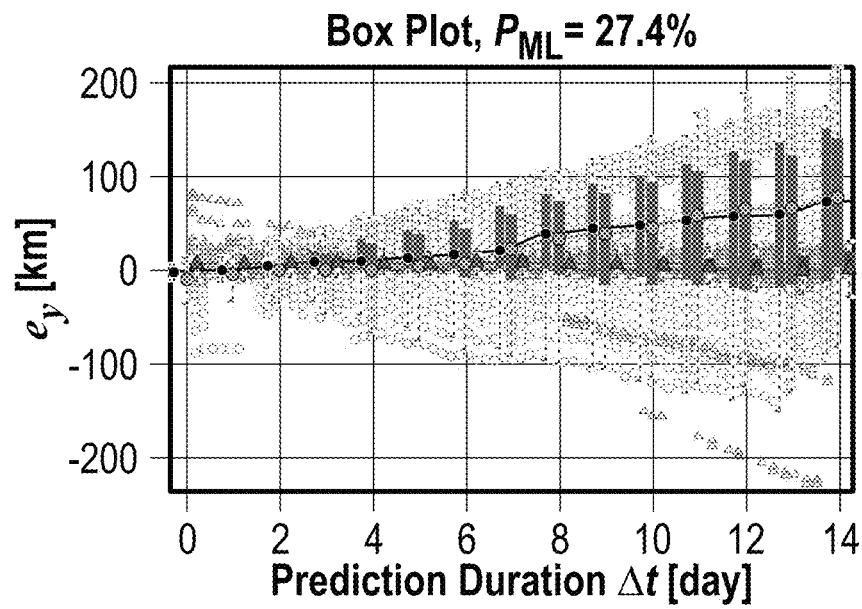
Figure 23:
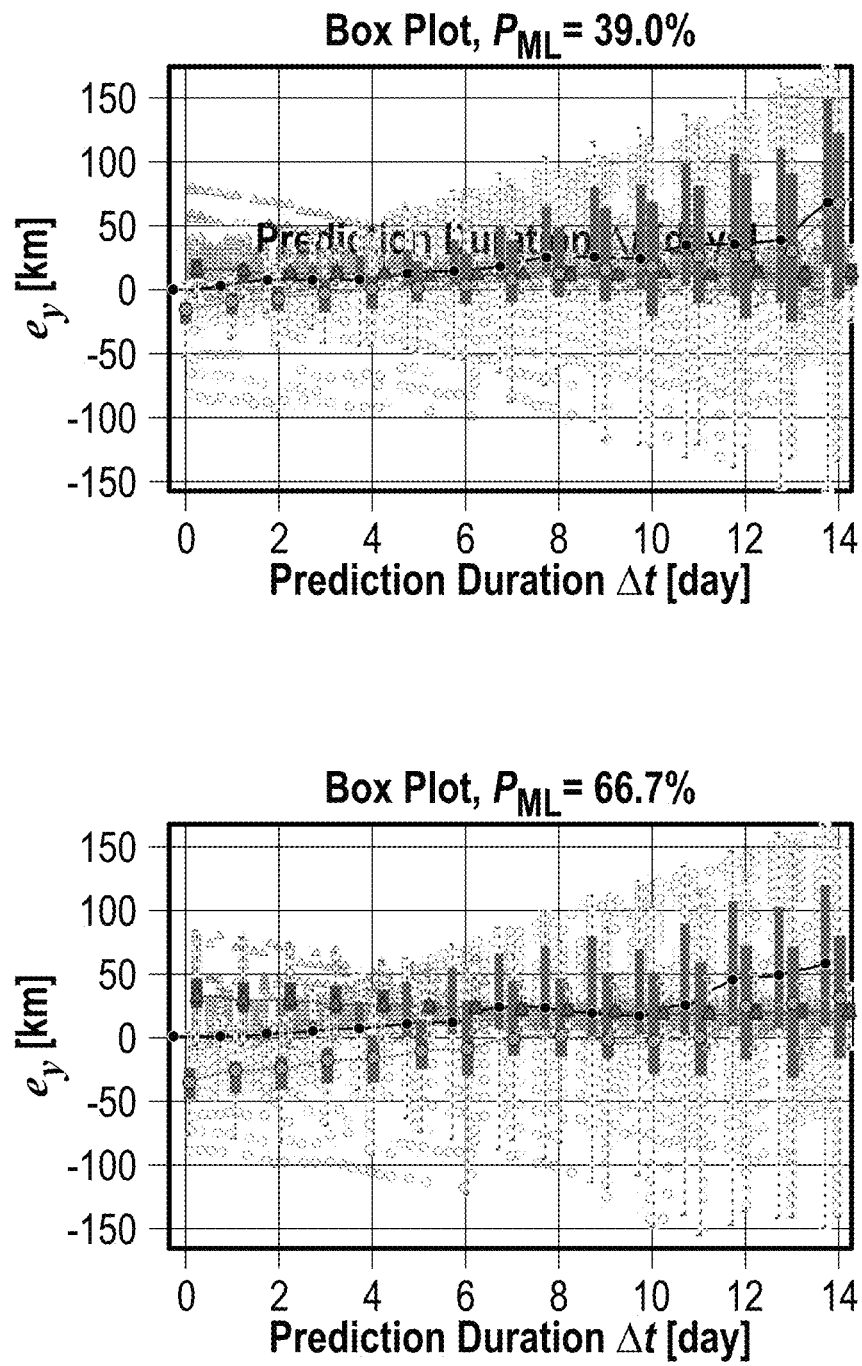
Figure 23:
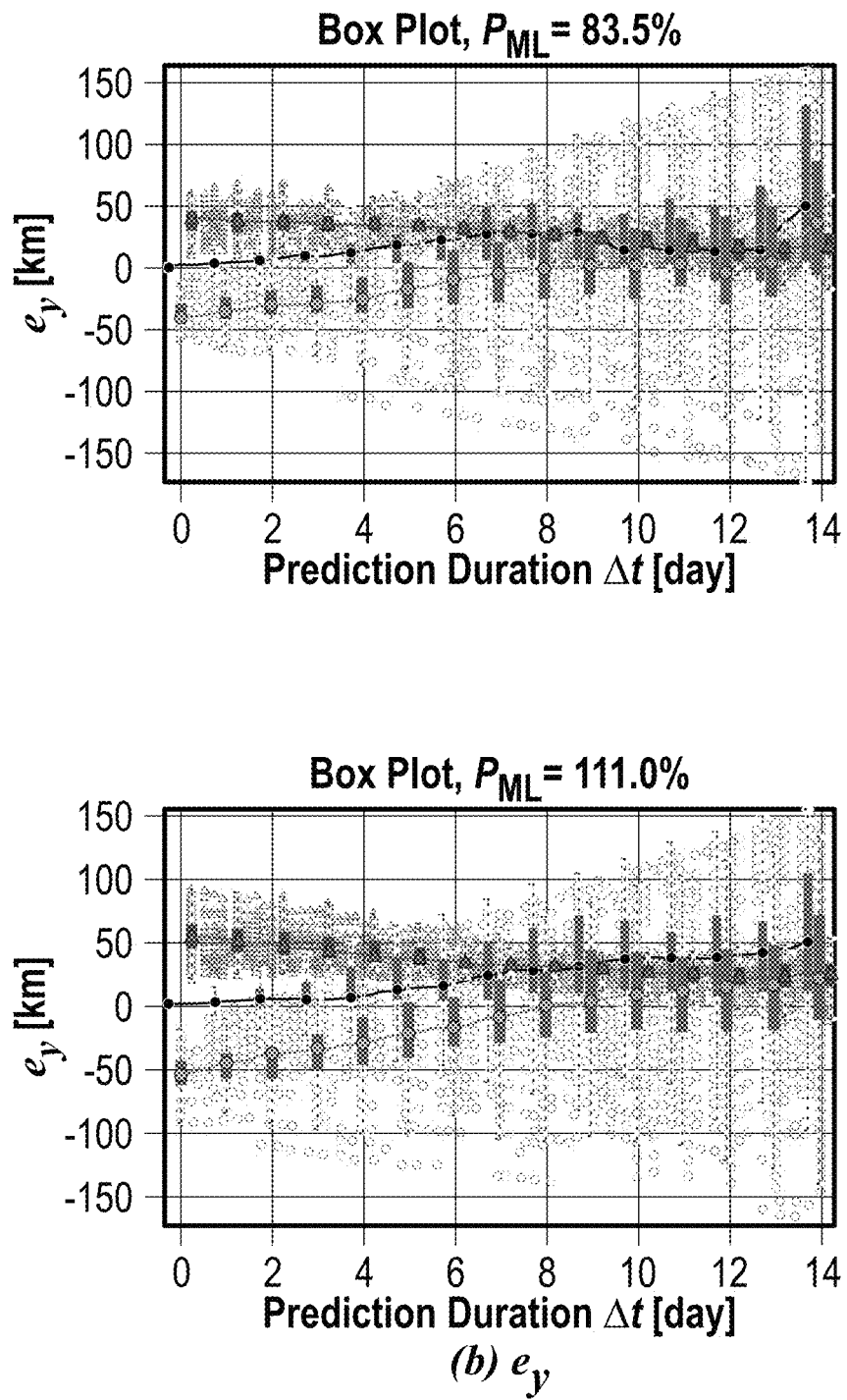
Figure 23:
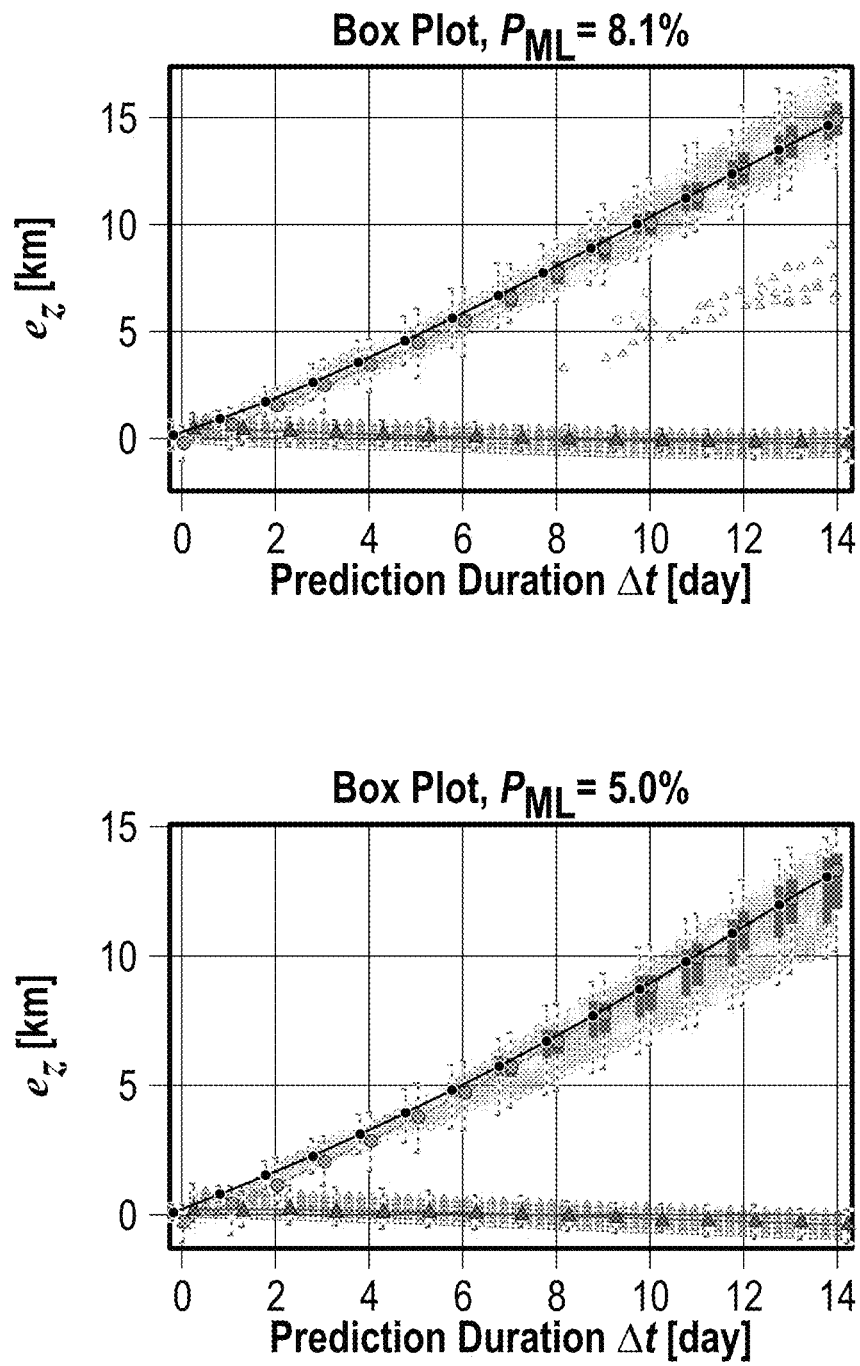
Figure 23:
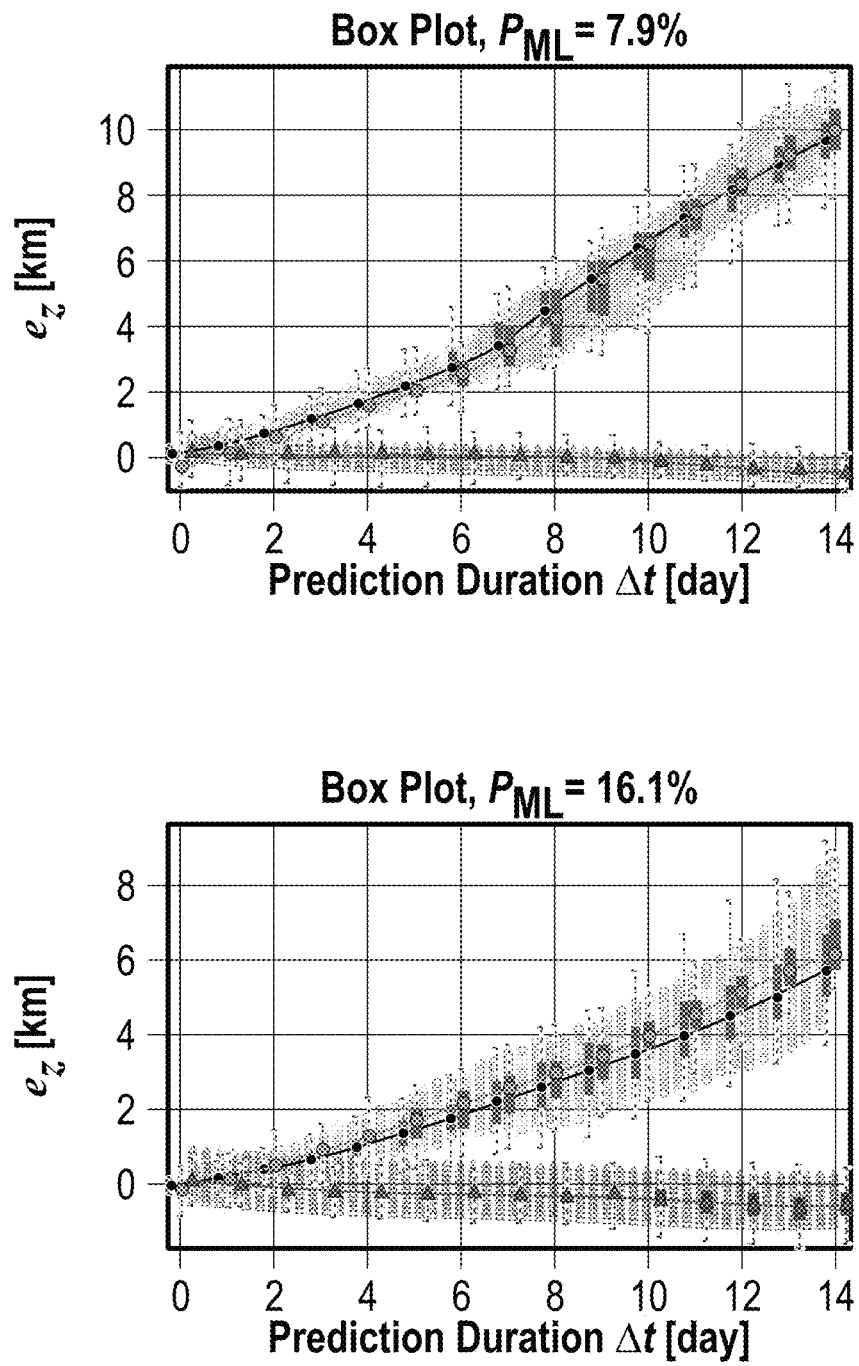
Figure 23:
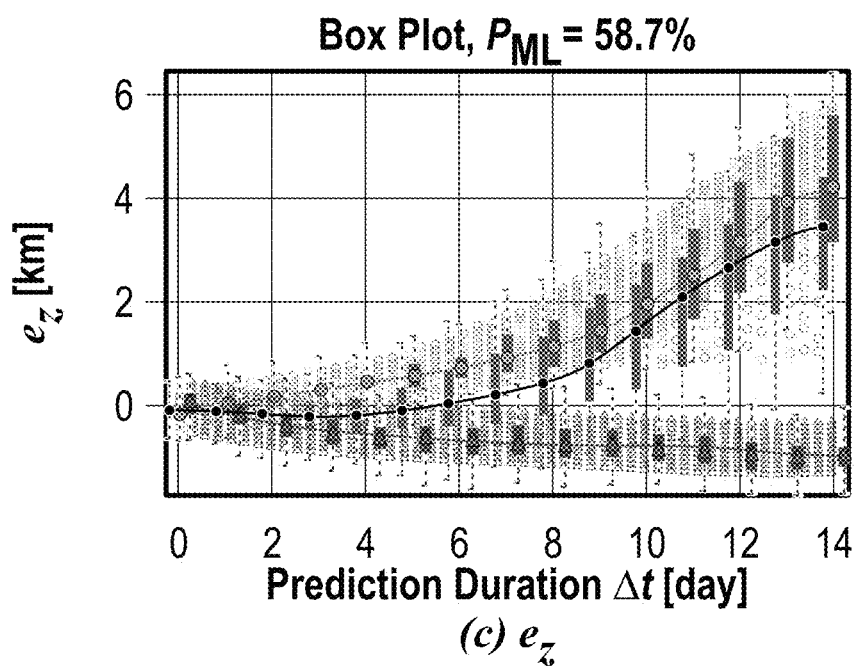

FIG. 23 illustrates an application of an illustrative methodology of orbital prediction error and uncertainty reduction using prediction monitoring in accordance with one or more embodiments of the present disclosure.

In some embodiments, the testing results corresponding the lifetime of 0, 10, 20, 30, 40 days are extracted and demonstrated in FIG. 23. As can be observed, all the green boxes are gradually deviating from the gray boxes as the lifetime grows. This reveals that the trained ML models are becoming less accurate, although they are still effective in all these cases.

For $e_y$, by observing the variation of the red boxes, the long-time ($\Delta t > 10$ days) performance remains consistent, but the short-time ($\Delta t < 6$ days) performance has changed. This phenomenon implies that the ML models have actually learned different knowledge, among which some are more general and are valid for a longer time.

Figure 24:
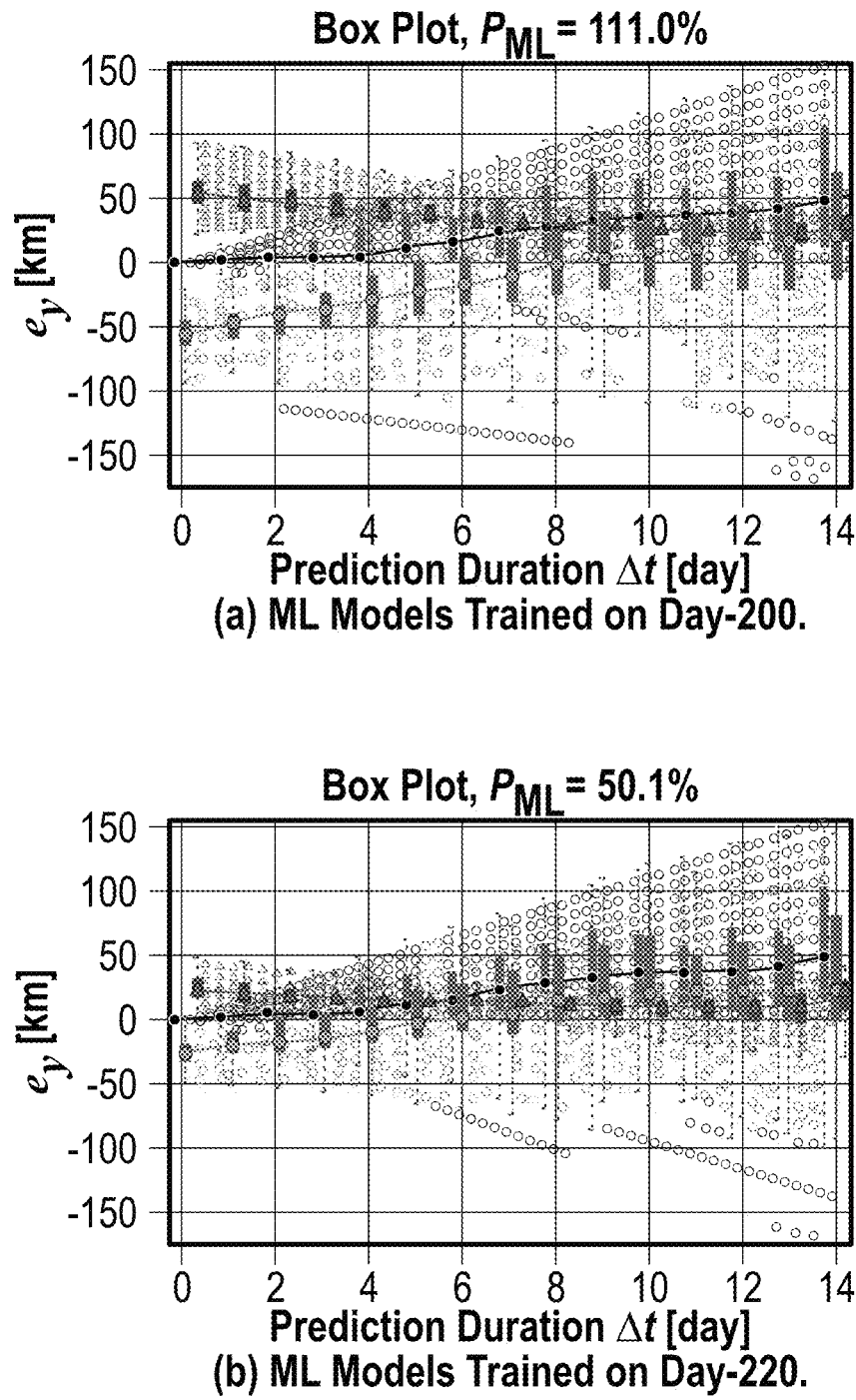
Figure 24:
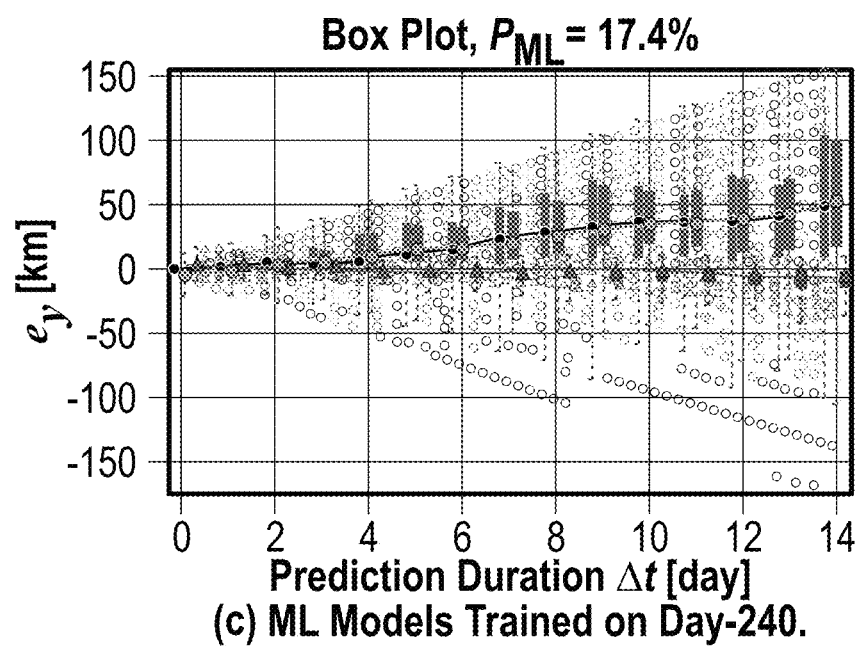

FIG. 24 illustrates an application of an illustrative methodology of orbital prediction error and uncertainty reduction using prediction monitoring in accordance with one or more embodiments of the present disclosure.

Since the ML models are data-driven, it is not surprising to observe the decrease in performance as the lifetime increases. In some embodiments, the RSO-1 is used as the example. The models are initially trained on day-200. Then, according to the criteria, the models are retrained on day-220 and day-240 for comparison. Using the same testing data in the M-window of day 240-254, the testing performance are summarized in FIG. 24, where only $e_y$ is demonstrated for clarity. As can been observed, the first model already has a lifetime of 40 days and its $P_{ML}$ is much greater than 100%; the second model is younger and gets a better metrics $P_{ML}$ of 50%; the third model is the youngest one and its performance is obviously the best, with $P_{ML}$ equals 17.4%. This comparison demonstrates that the retraining can significantly improve the performance of old ML models.

Figure 25:
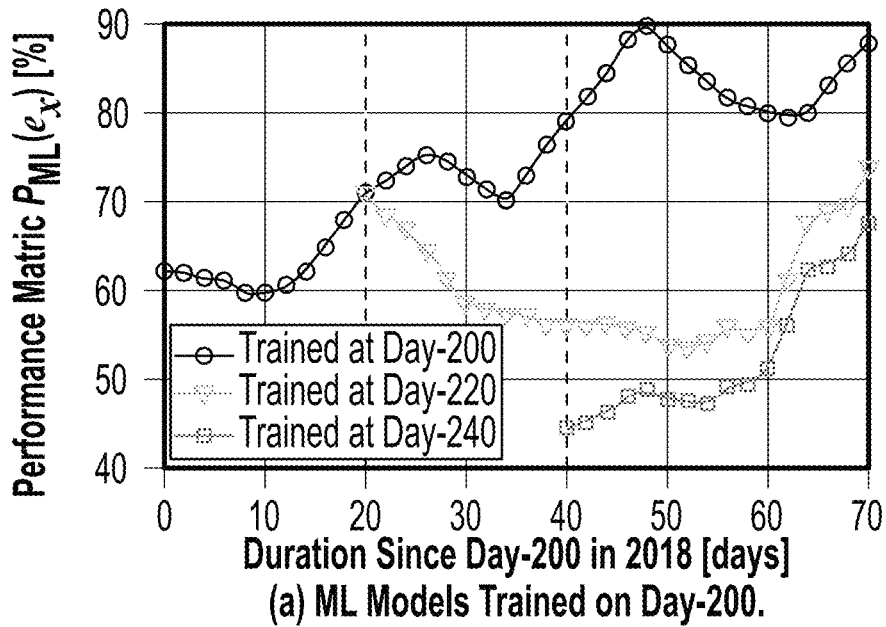
Figure 25:
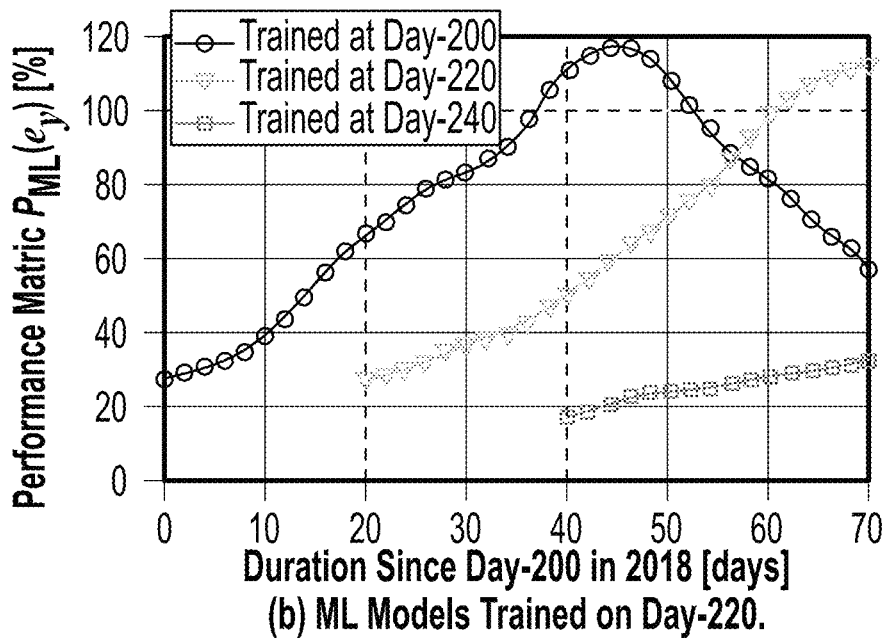
Figure 25:
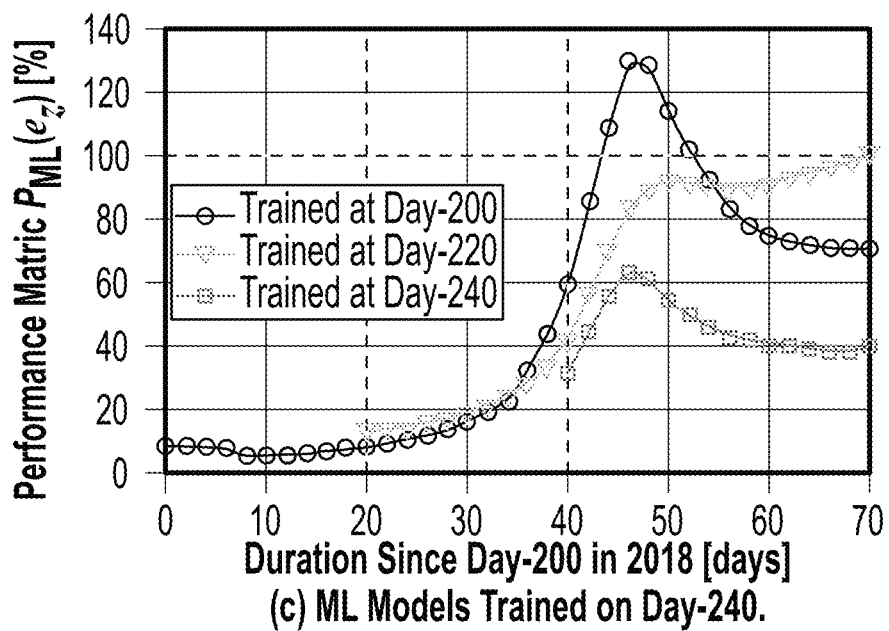

FIG. 25 illustrates an application of an illustrative methodology of orbital prediction error and uncertainty reduction using prediction monitoring in accordance with one or more embodiments of the present disclosure.

Since the ML models are data-driven, it is not surprising to observe the decrease in performance as the lifetime increases. In some embodiments, the RSO-1 is used as the example. The models are initially trained on day-200. Then, according to the criteria, the models are retrained on day-220 and day-240 for comparison.

FIG. 25 further demonstrate the variation curves of $P_{ML}$ with respect to lifetime for four sets of ML models re-trained at different epochs. It is clear that the newer curve is always under the older curve before the next re-training is triggered. This reveals that the re-training not only improves the performance for specific epochs shown in FIG. 24, but also improves all the following performance until next re-training.

Figure 26:
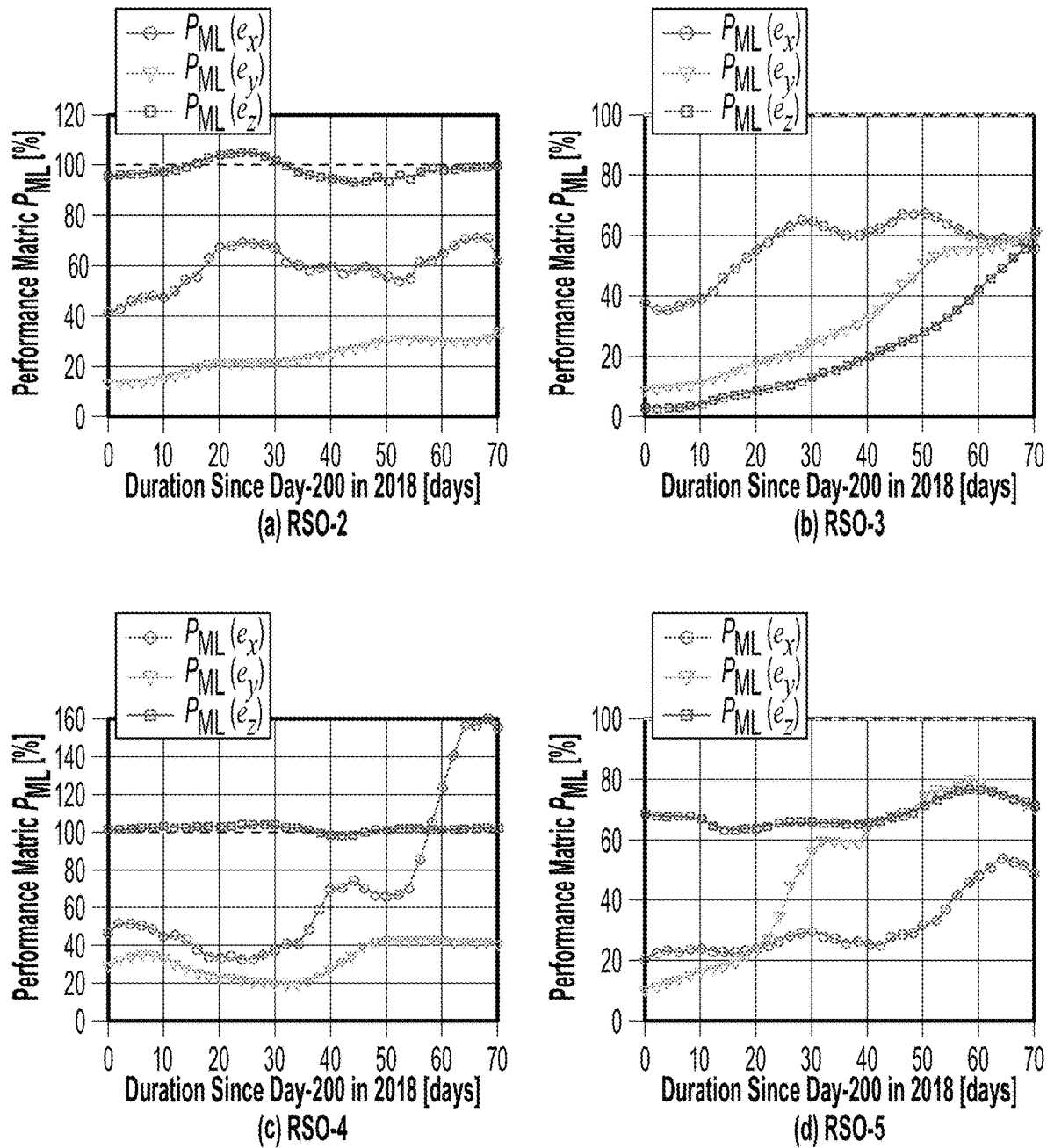

FIG. 26 illustrates an application of an illustrative methodology of orbital prediction error and uncertainty reduction using prediction monitoring in accordance with one or more embodiments of the present disclosure.

FIG. 26 depicts a variation of $P_{ML}$ with respect to the lifetime of trained ML models for RSOs on SSO. Since SSO is a relatively stable orbit and the forces along the orbit will not change greatly from revolution to revolution, a more steady performance of the ML models is expected. For RSO-2, $P_{ML}(e_z)$ is always around 100% without increasing dramatically, indicating that $e_z$ has no relation to the designed learning variables but the ML models will not introduce additional errors. For RSO-3, 4, and 5, all their performance is varying on a small scale at the first 20-30 days, indicating that the trained ML models are valid for roughly one month. After that, the performance changes significantly (RSO-4 and 5) or non-monotonously (RSO-3 and 4).

Figure 27:
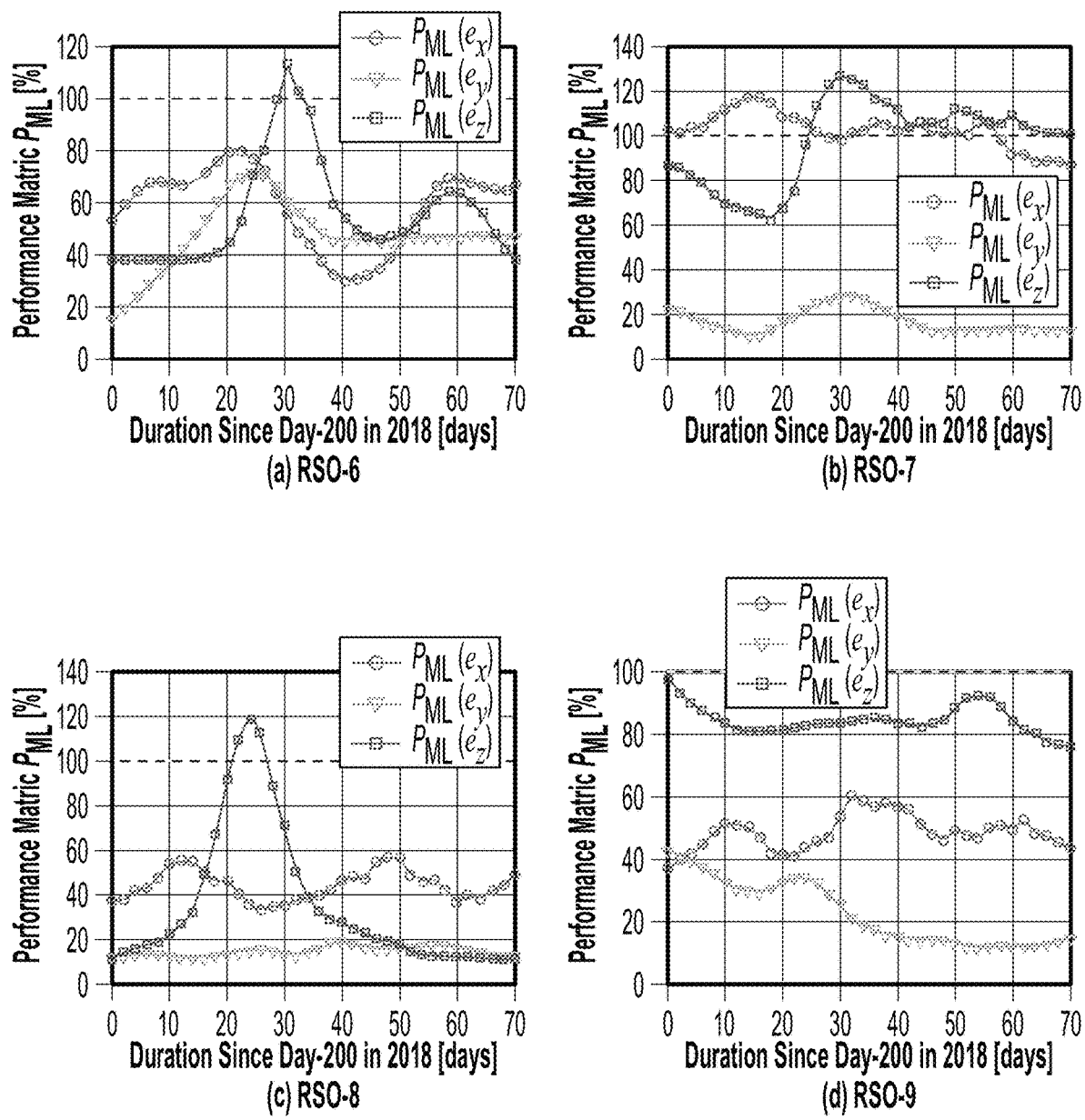
Figure 27:
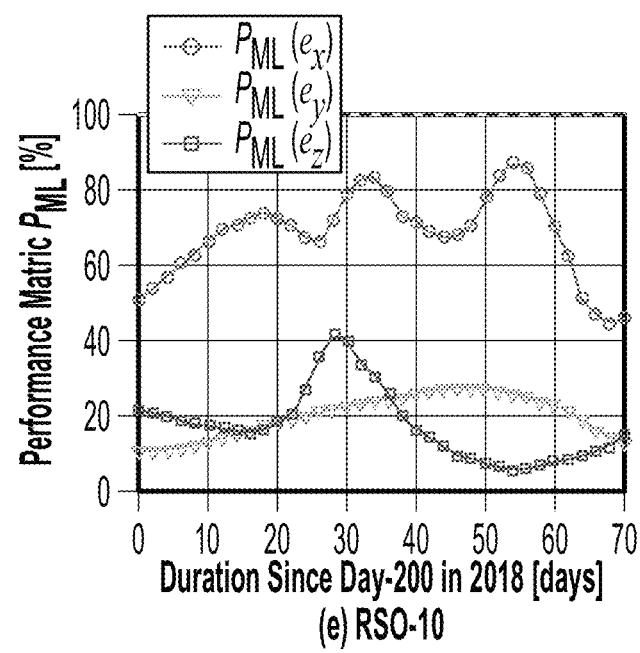

FIG. 27 illustrates an application of an illustrative methodology of orbital prediction error and uncertainty reduction using prediction monitoring in accordance with one or more embodiments of the present disclosure.

FIG. 27 depicts a variation of $P_{ML}$ with respect to the lifetime of trained ML models for other RSOs on LEO. As shown, the behaviors are more complicated than the situation on SSO, because the LEO object is usually processing at a pace different to the Earth's rotation motion and the forces can change dramatically from one revolution to another. However, for all the RSOs, the performance on $e_y$ is either in steady state or reaching a steady state after some time, which indicates the trained ML models for $e_y$ is effective. For other two components $e_x$ and $e_z$, the performance fluctuates but seldom exceeds 100%. In some embodiments, the sudden arise of $P_{ML}(e_z)$ occurs at around the same time for all the RSOs except RSO-9, which is very possibly related to some common environment change such as an unusual solar activity.

Figure 28:
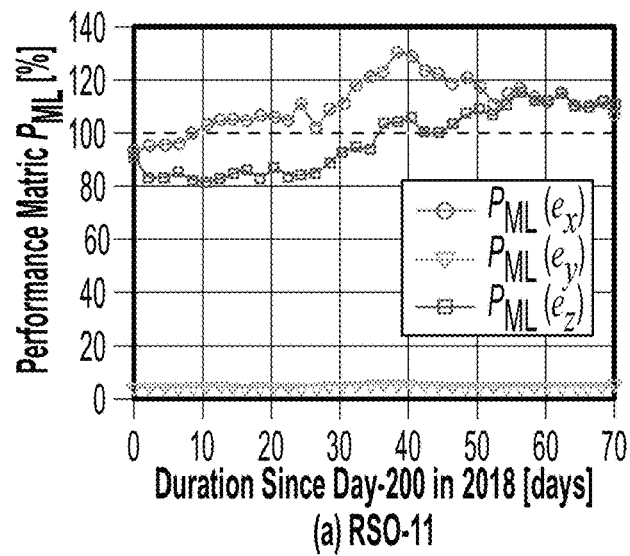
Figure 28:
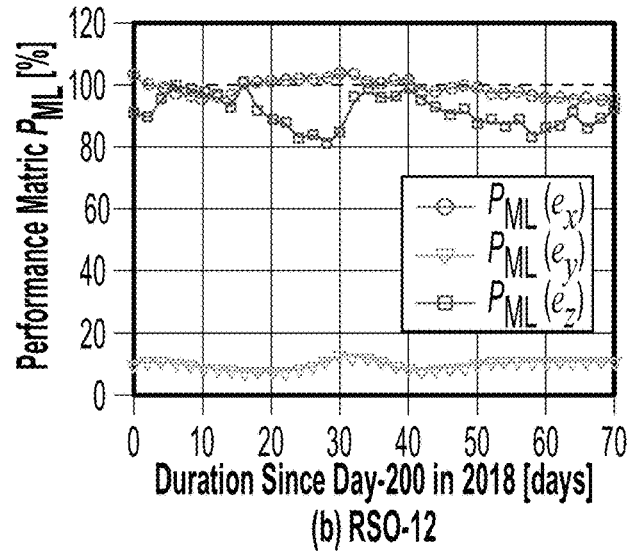
Figure 28:
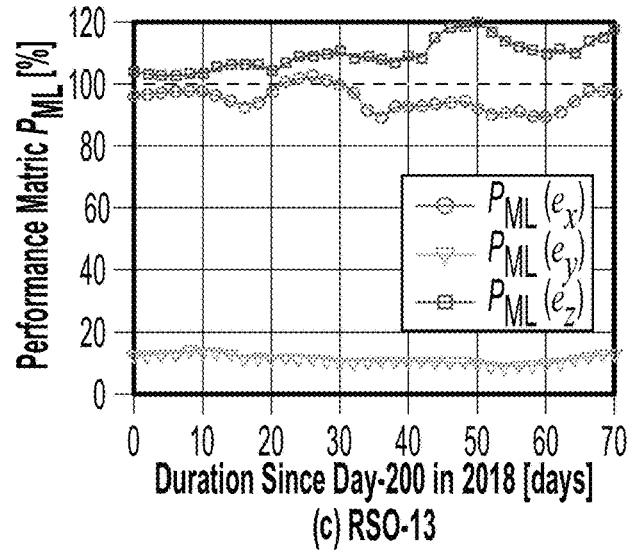
Figure 28:
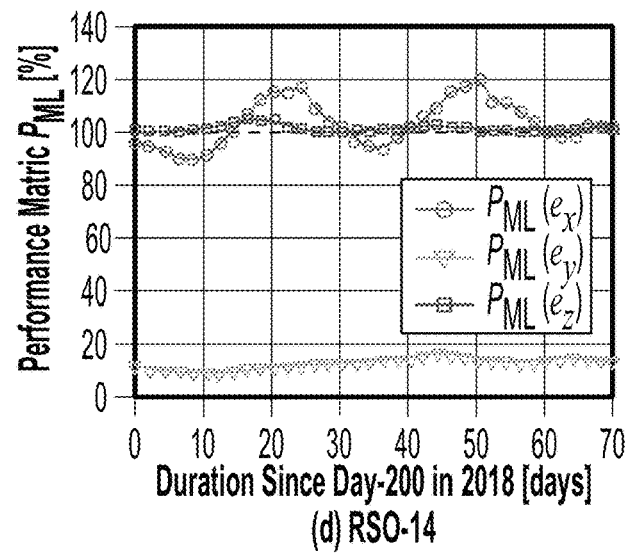
Figure 28:
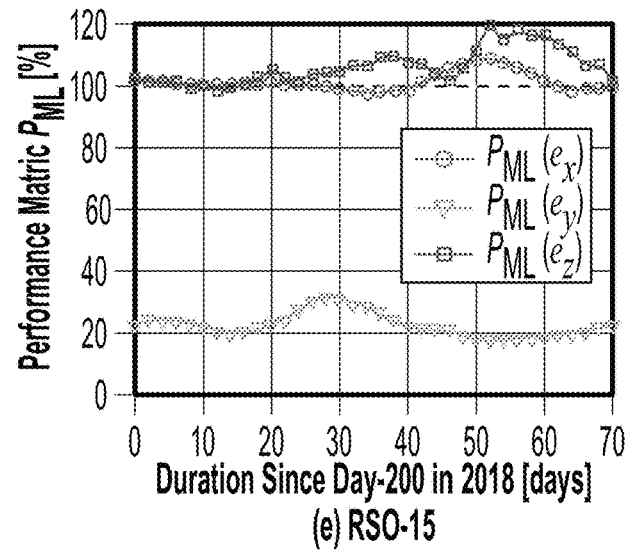
Figure 28:
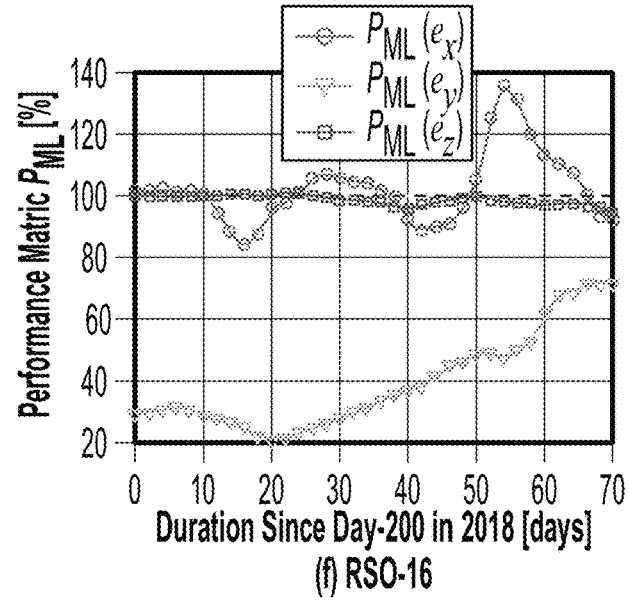

FIG. 28 illustrates an application of an illustrative methodology of orbital prediction error and uncertainty reduction using prediction monitoring in accordance with one or more embodiments of the present disclosure.

FIG. 28 depicts a variation of $P_{ML}$ with respect to the lifetime of trained ML models for other RSOs on MEO, where the atmosphere drag is negligible and the main error sources include the inaccurate estimation of the area-to-mass ratio, RSO shape, or reflection coefficients. The performance on $e_x$ and $e_z$ are always around 100% and seldom exceed 120%. In some embodiments, according to the criteria, the ML-modification $_{ê\,ML}(e_x)$ and $_{ê\,ML}(e_z)$ should not be applied to the orbit predictions. However, the performance on $e_y$ is considerably effective and stable, except that of RSO-16 has gently increased with the lifetime of ML models. For these studied MEOs, the re-training of ML models would seldom be triggered. These results demonstrate the improvements of the monitoring system where, without a properly designed monitoring system, the ML models might have to be retrained every time a new TLE set is available. But according to our results, the ML models could last for as long as 70 days and the re-training will not significantly improve predictions of those orbits with known poor performance.

Figure 29:
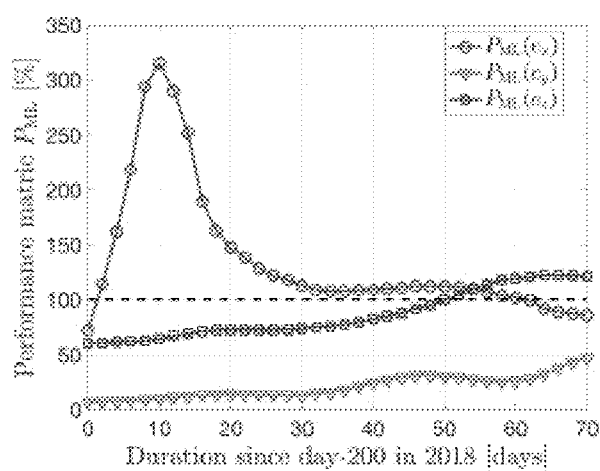

FIG. 29 illustrates an application of an illustrative methodology of orbital prediction error and uncertainty reduction using prediction monitoring in accordance with one or more embodiments of the present disclosure.

FIG. 29 depicts a variation of $P_{ML}$ with respect to the lifetime of trained ML models for RSO-17, which is highly elliptic where RSO-7 has an orbit with a perigee of 350 km and apogee of 4150 km. On such an elliptic orbit, the orbital phase (for example, true anomaly) may have a great effect on the orbit prediction error. If the estimate is made around the perigee, a small velocity estimation error will have great effect on the position prediction for a state around the apogee. Similarly, a small position estimation error around the apogee will greatly affect the accuracy at the perigee. In general, the orbit prediction for RSOs on an elliptic orbit will also be affected by the orbital phase of the estimate. In FIG. 29, the result of a special case RSO is demonstrated, whose orbit is highly elliptic. Although in the ML approach of some embodiments, the designed learning and target variables do not include any explicit information about the orbital phase, the ML approach is effective on RSO-7 and the performance is good and stable, especially for $e_y$ component. In the future, it is worth systematically studying more RSOs on elliptic orbits.

Figure 30:
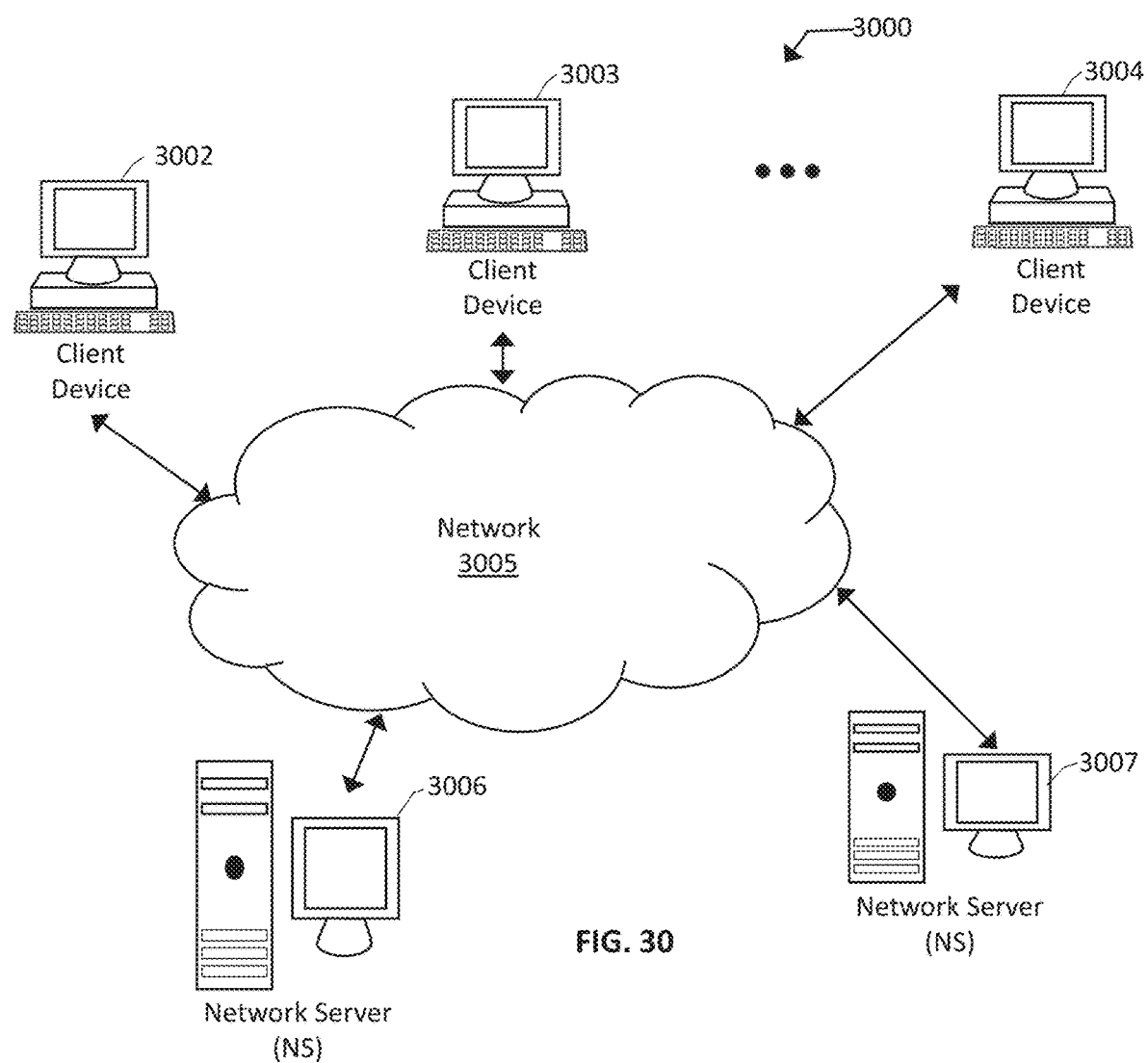

FIG. 30 depicts a block diagram of an exemplary computer-based system/platform 3000 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 3000 may be configured to manage a large number of members and/or concurrent transactions, as detailed herein. In some embodiments, the exemplary computer-based system/platform 3000 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 30, members 3002-3004 (e.g., clients) of the exemplary computer-based system/platform 3000 may include virtually any computing device capable of receiving and sending a message over a network (e.g., cloud network), such as network 3005, to and from another computing device, such as servers 3006 and 3007, each other, and the like. In some embodiments, the member devices 3002-3004 may be personal computers, multiprocessor systems, microprocessor-based or programmable consumer electronics, network PCs, and the like. In some embodiments, one or more member devices within member devices 3002-3004 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 3002-3004 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 3002-3004 may include may run one or more applications, such as Internet browsers, mobile applications, voice calls, video games, videoconferencing, and email, among others. In some embodiments, one or more member devices within member devices 3002-3004 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 3002-3004 may be specifically programmed by either Java, .Net, QT, C, C++ and/or other suitable programming language. In some embodiments, one or more member devices within member devices 3002-3004 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 3005 may provide network access, data transport and/or other services to any computing device coupled to it. In some embodiments, the exemplary network 3005 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 3005 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 3005 may include and implement, as an alternative or in conjunction with one or more of the above, a WiMAX architecture defined by the WiMAX forum. In some embodiments and, optionally, in combination of any embodiment described above or below, the exemplary network 3005 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 3005 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 3005 may also include mass storage, such as network attached storage (NAS), a storage area network (SAN), a content delivery network (CDN) or other forms of computer or machine readable media.

In some embodiments, the exemplary server 3006 or the exemplary server 3007 may be a web server (or a series of servers) running a network operating system, examples of which may include but are not limited to Microsoft Windows Server, Novell NetWare, or Linux. In some embodiments, the exemplary server 3006 or the exemplary server 3007 may be used for and/or provide cloud and/or network computing. Although not shown in FIG. 30, in some embodiments, the exemplary server 3006 or the exemplary server 3007 may have connections to external systems like email, SMS messaging, text messaging, ad content providers, etc. Any of the features of the exemplary server 3006 may be also implemented in the exemplary server 3007 and vice versa.

In some embodiments, one or more of the exemplary servers 3006 and 3007 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 3001-3004.

In some embodiments and, optionally, in combination of any embodiment described above or below, for example, one or more exemplary computing member devices 3002-3004, the exemplary server 3006, and/or the exemplary server 3007 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 31:
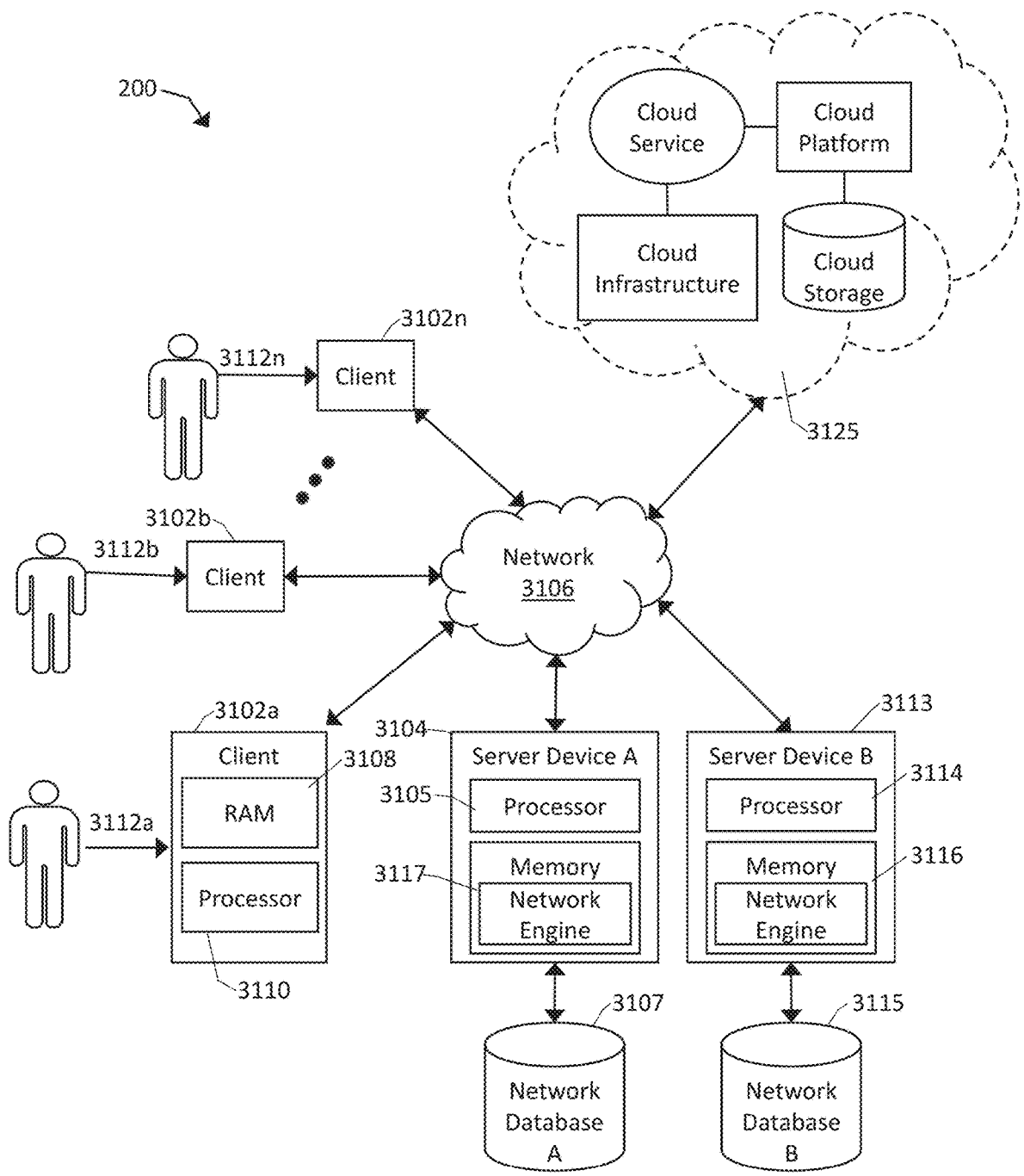

FIG. 31 depicts a block diagram of another exemplary computer-based system/platform 3100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 3102a, 3102b thru 3102n shown each at least includes a computer-readable medium, such as a random-access memory (RAM) 3108 coupled to a processor 3110 or FLASH memory. In some embodiments, the processor 3110 may execute computer-executable program instructions stored in memory 3108. In some embodiments, the processor 3110 may include a microprocessor, an ASIC, and/or a state machine. In some embodiments, the processor 3110 may include, or may be in communication with, media, for example computer-readable media, which stores instructions that, when executed by the processor 3110, may cause the processor 3110 to perform one or more steps described herein. In some embodiments, examples of computer-readable media may include, but are not limited to, an electronic, optical, magnetic, or other storage or transmission device capable of providing a processor, such as the processor 3110 of member computing device 3102a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 3102a through 3102n may also comprise a number of external or internal devices such as a mouse, a CD-ROM, DVD, a physical or virtual keyboard, a display, or other input or output devices. In some embodiments, examples of member computing devices 3102a through 3102n (e.g., clients) may be any type of processor-based platforms that are connected to a network 3106 such as, without limitation, personal computers, digital assistants, personal digital assistants, smart phones, pagers, digital tablets, laptop computers, Internet appliances, and other processor-based devices. In some embodiments, member computing devices 3102a through 3102n may be specifically programmed with one or more application programs in accordance with one or more principles/methodologies detailed herein. In some embodiments, member computing devices 3102a through 3102n may operate on any operating system capable of supporting a browser or browser-enabled application, such as Microsoft™, Windows™, and/or Linux. In some embodiments, member computing devices 3102a through 3102n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 3102a through 3102n, users, 3112a through 3102n, may communicate over the exemplary network 3106 with each other and/or with other systems and/or devices coupled to the network 3106. As shown in FIG. 31, exemplary server devices 3104 and 3113 may be also coupled to the network 3106. In some embodiments, one or more member computing devices 3102a through 3102n may be mobile clients.

In some embodiments, at least one database of exemplary databases 3107 and 3115 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 32:
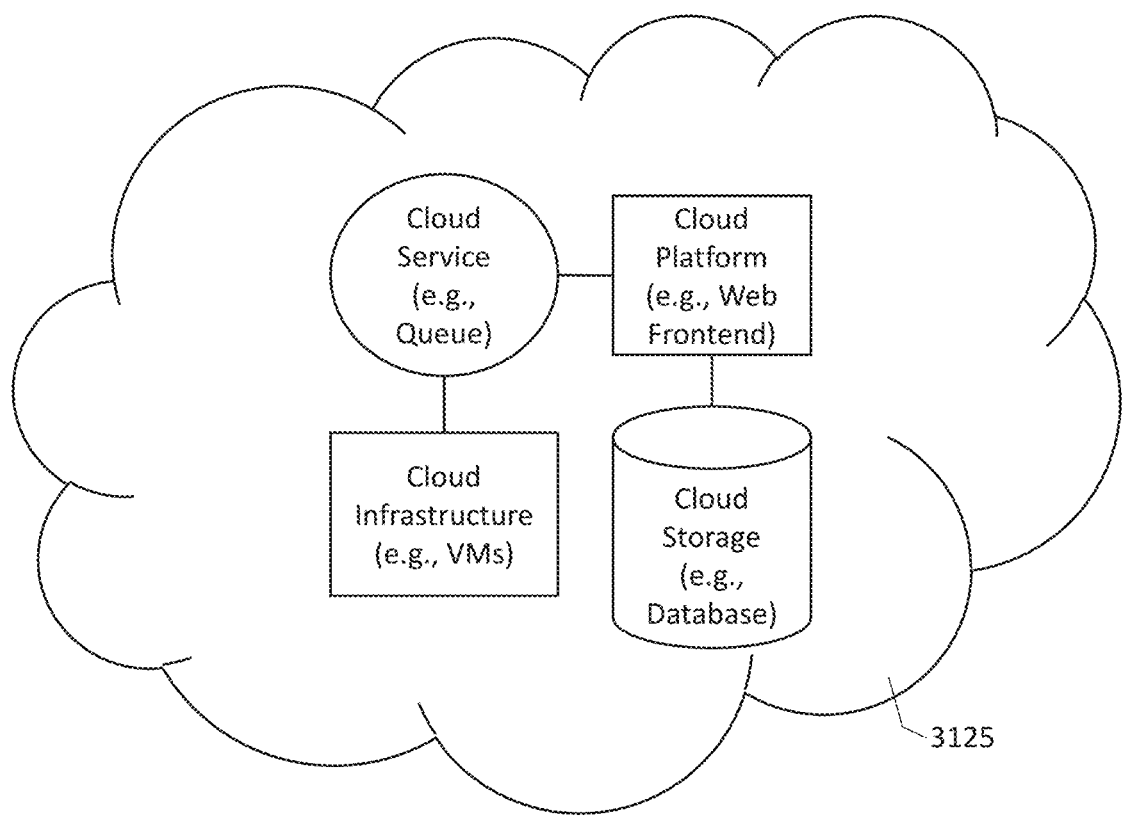
Figure 33:
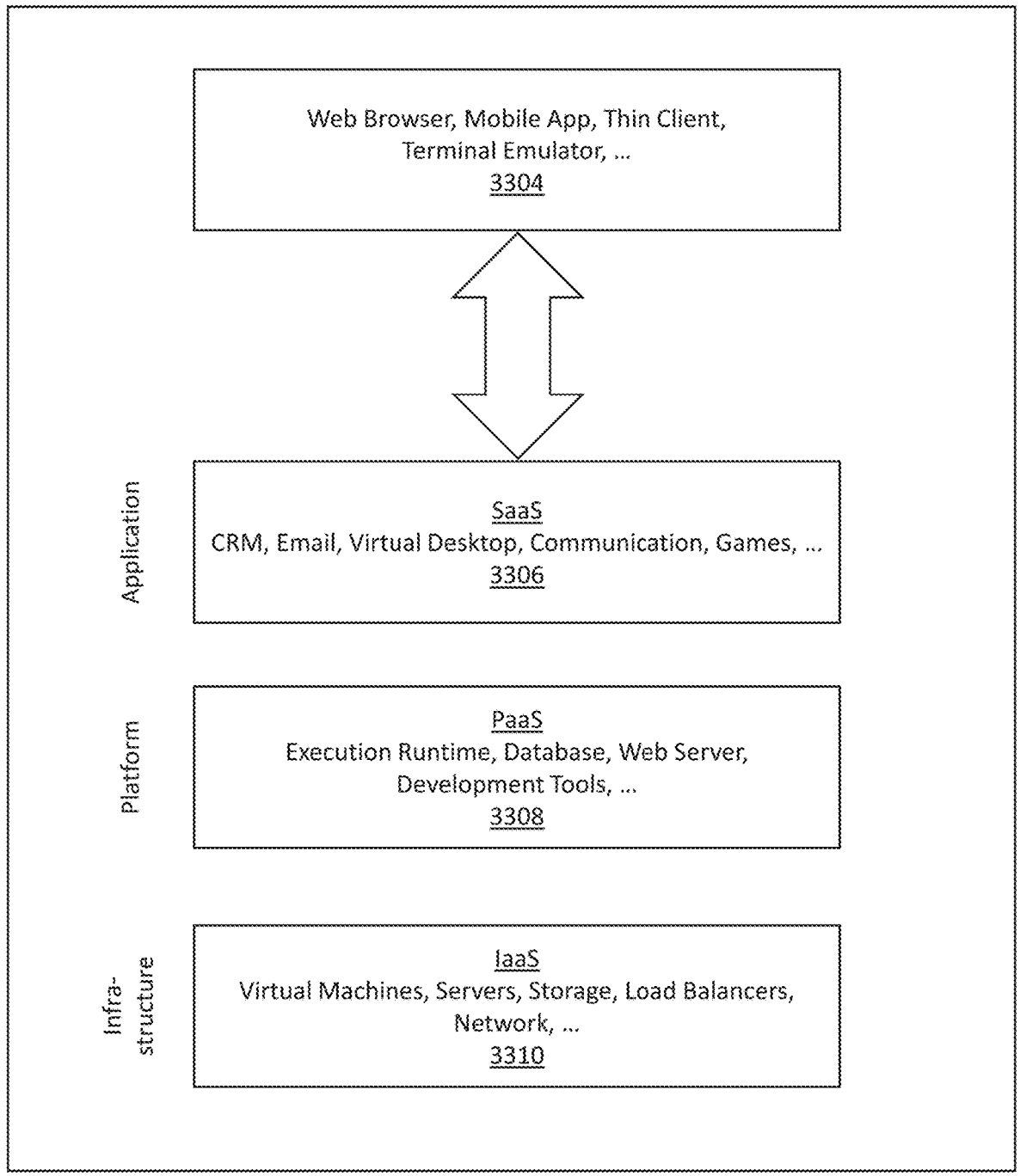

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (Saas). FIGS. 32 and 33 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method, comprising:
  receiving, by at least one processor, an object state dataset comprising at least one object state data item representing a trajectory state associated with the object;
  determining, by the at least one processor, a future epoch trajectory associated with each object state data item in the object state dataset using an iterative physics algorithm;
  utilizing, by the at least one processor, a trajectory error prediction machine learning model to predict a respective trajectory error for each respective future epoch trajectory determined for each respective object state data item in the object state dataset;

wherein the trajectory error prediction machine learning model is trained by predicting a training trajectory error for each at least one historical object state data in a historical epoch object state dataset to learn correlations between state and trajectory error based on trajectory parameters;

determining, by the at least one processor, a respective updated future epoch trajectory for each respective future epoch trajectory based on the associated respective trajectory error; and causing to display, by the at least one processor, at least one trajectory notification associated with at least one future epoch trajectory on a screen of a user computing device associated with a user.

2. A system, comprising:
an object state database to collect an object state dataset comprising at least one object state data item representing a trajectory state associated with the object; and
a Monitored Machine Learning (MML) database comprising at least one processor;
wherein the at least one processor is configured to execute instructions stored in a non-tangible storage medium, the instructions comprising:
receiving the object state dataset from the object state database;
determining a future epoch trajectory associated with each object state data item in the object state dataset using an iterative physics algorithm;
utilizing a trajectory error prediction machine learning model to predict a respective trajectory error for each respective future epoch trajectory determined for each respective object state data item in the object state dataset;
wherein the trajectory error prediction machine learning model is trained by predicting a training trajectory error for each at least one historical object state data in a historical epoch object state dataset to learn correlations between state and trajectory error based on trajectory parameters;
determining a respective updated future epoch trajectory for each respective future epoch trajectory based on the associated respective trajectory error; and
causing to display at least one trajectory notification associated with at least one future epoch trajectory on a screen of a user computing device associated with a user.

3. The methods and systems as recited in clauses 1 and/or 2, wherein the trajectory error comprises an error term and an uncertainty term.

4. The methods and systems as recited in clause 3, further comprising:
fusing, by the at least one processor, a respective machine learning state and its corresponding covariance associated with each respective trajectory error with a respective future epoch trajectory state and its corresponding covariance;
wherein the respective future epoch trajectory state and its corresponding covariance are generated using Kalman filter-related methods; and
determining, by the at least one processor, a respective state and its corresponding uncertainty associated the respective updated future epoch trajectory.

5. The methods and systems as recited in clause 4, further comprising re-training the trajectory error prediction machine learning model with a new object state dataset based on monitoring the respective uncertainty of each respective updated future epoch trajectory, a respective precision of each respective updated future epoch trajectory, or both.

6. The methods and systems as recited in clause 4, further comprising:
determining, by the at least one processor, a respective pseudo-innovation of each respective future epoch trajectory based at least on each respective trajectory error;
determining, by the at least one processor, a respective pseudo-innovation covariance associated with each respective pseudo-innovation based at least in part on a respective machine learning covariance;
determining, by the at least one processor, a respective gain associated with each respective fusion of each respective trajectory error with each respective future epoch trajectory based at least in part on a respective pseudo-measurement matrix associated with each respective pseudo-innovation covariance; and
determining, by the at least one processor, each respective future epoch trajectory based at least in part on each respective gain.

6. The methods and systems as recited in clauses 1 and/or 2 and/or 4, further comprising re-training the trajectory error prediction machine learning model using training data comprising a moving window of testing object state data items in the object state dataset.

7. The methods and systems as recited in clauses 1 and/or 2, wherein the trajectory error prediction machine learning model comprises Gaussian Processes.

8. The methods and systems as recited in clauses 1 and/or 2, wherein the trajectory error prediction machine learning model comprises at least one model associated with each respective at least one object state data item.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:
1. A method, comprising:
receiving, by at least one processor, an object state dataset comprising at least one object state data item representing at least one object state associated with the object;
wherein the at least one object state comprises at least one trajectory of the object in an orbital frame of reference;
determining, by the at least one processor, a future trajectory associated with each object state data item in the object state dataset using an iterative physics-based algorithm;
utilizing, by the at least one processor, a trajectory error prediction machine learning model to output at least one respective trajectory error measurement for a respective trajectory error for each respective future trajectory determined for each respective object state data item in the object state dataset;

wherein the trajectory error prediction machine learning model is trained using a known trajectory error paired with each historical object state data in a historical epoch object state dataset to learn correlations between state and trajectory error based on trajectory parameters;

wherein each historical object state data comprises a historical two-line element (TLE) associated with a particular object;

determining, by the at least one processor, a respective pseudo-measurement associated with the respective trajectory error for each respective future trajectory based at least in part on the respective trajectory error for each respective future trajectory;

wherein the respective pseudo-measurement represents the respective trajectory error as a physical measurement in the orbital frame of reference;

determining, by the at least one processor, a respective pseudo-measurement noise associated with a trajectory error covariance based at least in part on the respective pseudo-measurement representative of the respective trajectory error for each respective future trajectory;

wherein the respective pseudo-measurement noise represents a physical noise measurement of the trajectory error in the orbital frame of reference;

determining, by the at least one processor, a fusion of the respective pseudo-measurement and the respective pseudo-measurement noise into the future trajectory to generate a respective modification to each respective future trajectory for each respective future trajectory based on the respective pseudo-measurement and the respective pseudo-measurement noise of the respective trajectory error for each respective future trajectory; and causing to display, by the at least one processor, at least one trajectory notification associated with at least one future trajectory on a screen of a user computing device associated with a user.

2. The method as recited in claim 1, wherein the trajectory error comprises an error term and an uncertainty term.

3. The method as recited in claim 2, further comprising:
fusing, by the at least one processor, the respective pseudo-measurement and the respective pseudo-measurement noise associated with each respective trajectory error with a respective future trajectory state and its corresponding covariance;
wherein the respective future trajectory state and its corresponding covariance are generated using Kalman filter-related methods; and
determining, by the at least one processor, a respective state and its corresponding uncertainty associated the respective future trajectory.

4. The method as recited in claim 3, further comprising re-training the trajectory error prediction machine learning model with a new object state dataset based on monitoring the respective uncertainty of each respective updated future trajectory, a respective precision of each respective updated future trajectory, or both.

5. The method as recited in claim 3, further comprising:
determining, by the at least one processor, a respective pseudo-innovation of each respective future trajectory based at least on each respective trajectory error;
determining, by the at least one processor, a respective pseudo-innovation covariance associated with each respective pseudo-innovation based at least in part on a respective machine learning covariance;

determining, by the at least one processor, a respective gain associated with each respective fusion of each respective trajectory error with each respective future trajectory based at least in part on a respective pseudo-measurement matrix associated with each respective pseudo-innovation covariance; and determining, by the at least one processor, each respective future trajectory based at least in part on each respective gain.

6. The method as recited in claim 1, further comprising re-training the trajectory error prediction machine learning model using training data comprising a moving window of testing object state data items in the object state dataset.

7. The method as recited in claim 1, wherein the trajectory error prediction machine learning model comprises Gaussian Processes.

8. The method as recited in claim 1, wherein the trajectory error prediction machine learning model comprises at least one model associated with each respective at least one object state data item.

9. The method as recited in claim 1, wherein the iterative physics-based algorithm comprises extended Kalman filtering.

10. The method as recited in claim 1, further comprising:
determining, by the at least one processor, a future collision with an object based at least in part on the at least one future trajectory; and
causing to display, by the at least one processor, a collision alert associated with the future collision on the screen of the user computing device associated with the user.

11. A system, comprising:
an object state database to collect an object state dataset comprising at least one object state data item representing at least one object state associated with the object;
wherein the at least one object state comprises at least one trajectory of the object in an orbital frame of reference; and
a Monitored Machine Learning (MML) database comprising at least one processor;
wherein the at least one processor is configured to execute instructions stored in a non-tangible storage medium, the instructions comprising:
receiving the object state dataset from the object state database;
determining a future trajectory associated with each object state data item in the object state dataset using an iterative physics-based algorithm;
utilizing a trajectory error prediction machine learning model to output at least one respective trajectory error measurement for a respective trajectory error for each respective future trajectory determined for each respective object state data item in the object state dataset;
wherein the trajectory error prediction machine learning model is trained a known trajectory error paired with each historical object state data in a historical epoch object state dataset to learn correlations between state and trajectory error based on trajectory parameters;
wherein each historical object state data comprises a historical two-line element (TLE) associated with a particular object;
determining a respective pseudo-measurement associated with the respective trajectory error for each respective future trajectory based at least in part on the respective trajectory error for each respective future trajectory;
    wherein the respective pseudo-measurement represents the respective trajectory error as a physical measurement in the orbital frame of reference;
determining a respective pseudo-measurement noise associated with a respective trajectory error covariance based at least in part on the respective pseudo-measurement representative of the respective trajectory error for each respective future trajectory;
    wherein the respective pseudo-measurement noise represents a physical noise measurement of the trajectory error in the orbital frame of reference;
determining a fusion of the respective pseudo-measurement and the respective pseudo-measurement noise into the future trajectory to generate a respective modification to each respective future trajectory for each respective future trajectory based on the respective pseudo-measurement and the respective pseudo-measurement noise of the respective trajectory error for each respective future trajectory; and
causing to display at least one trajectory notification associated with at least one future trajectory on a screen of a user computing device associated with a user.

12. The system as recited in claim 11, wherein the trajectory error comprises an error term and an uncertainty term.

13. The system as recited in claim 12, wherein the at least one processor is further configured to execute instructions further comprising:
    fusing, by the at least one processor, the respective pseudo-measurement and the respective pseudo-measurement noise associated with each respective trajectory error with a respective future trajectory state and its corresponding covariance;
        wherein the respective future trajectory state and its corresponding covariance are generated using Kalman filter-related methods; and
    determining, by the at least one processor, a respective state and its corresponding uncertainty associated the respective future trajectory.

14. The system as recited in claim 13, wherein the at least one processor is further configured to execute instructions further comprising re-training the trajectory error prediction machine learning model with a new object state dataset based on monitoring the respective uncertainty of each respective updated future trajectory, a respective precision of each respective updated future trajectory, or both.

15. The system as recited in claim 13, wherein the at least one processor is further configured to execute instructions further comprising:
    determining a respective pseudo-innovation of each respective future trajectory based at least on each respective trajectory error;
    determining a respective pseudo-innovation covariance associated with each respective pseudo-innovation based at least in part on a respective machine learning covariance;
    determining a respective gain associated with each respective fusion of each respective trajectory error with each respective future trajectory based at least in part on a respective pseudo-measurement matrix associated with each respective pseudo-innovation covariance; and
    determining each respective future trajectory based at least in part on each respective gain.

16. The system as recited in claim 11, wherein the at least one processor is further configured to execute instructions further comprising re-training the trajectory error prediction machine learning model using training data comprising a moving window of testing object state data items in the object state dataset.

17. The system as recited in claim 11, wherein the trajectory error prediction machine learning model comprises Gaussian Processes.

18. The system as recited in claim 11, wherein the trajectory error prediction machine learning model comprises at least one model associated with each respective at least one object state data item.

19. The system as recited in claim 11, wherein the iterative physics-based algorithm comprises extended Kalman filtering.

20. The system as recited in claim 11, wherein the at least one processor is further configured to execute instructions further comprising:
    determining a future collision with an object based at least in part on the at least one future trajectory; and
    causing to display a collision alert associated with the future collision on the screen of the user computing device associated with the user.

* * * * *